US012709132B2

(12) United States Patent
Brock et al.

(10) Patent No.: US 12,709,132 B2
(45) Date of Patent: Aug. 18, 2026

(54) THERMAL MANAGEMENT SYSTEM

(71) Applicant: Stant USA Corp., Connersville, IN (US)

(72) Inventors: Michael S. Brock, Connersville, IN (US); George J. Mitri, Connersville, IN (US); Joshua L. Rude, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 41 days.

(21) Appl. No.: 18/614,578

(22) Filed: Mar. 22, 2024

(65) Prior Publication Data

US 2024/0317017 A1 Sep. 26, 2024

Related U.S. Application Data

(60) Provisional application No. 63/454,610, filed on Mar. 24, 2023.

(51) Int. Cl.
*B60H 1/00* (2006.01)
*B60K 1/00* (2006.01)
*B60K 11/02* (2006.01)

(52) U.S. Cl.
CPC ..... *B60H 1/00571* (2013.01); *B60H 1/00278* (2013.01); *B60H 1/00392* (2013.01); *B60K 11/02* (2013.01); *B60K 2001/003* (2013.01); *B60K 2001/005* (2013.01); *B60K 2001/006* (2013.01); *B60Y 2410/10* (2013.01); *Y02E 60/10* (2013.01)

(58) Field of Classification Search
CPC ............ B60H 1/00571; B60H 1/00278; B60H 1/00392; B60K 11/02; B60K 2001/003; B60K 2001/005; B60K 2001/006; B60Y 2410/10; Y02E 60/10
See application file for complete search history.

(56) References Cited

U.S. PATENT DOCUMENTS

| | | | |
|---|---|---|---|
| 3,251,408 | A | 5/1966 | Watson et al. |
| 3,927,693 | A | 12/1975 | Johnston |
| 4,429,717 | A | 2/1984 | Montgomery |
| 5,431,189 | A | 7/1995 | Jones |
| 5,529,758 | A | 6/1996 | Houston |
| 6,186,174 | B1 | 2/2001 | Yurchision et al. |
| 6,245,233 | B1 | 6/2001 | Lu |

(Continued)

FOREIGN PATENT DOCUMENTS

| | | | |
|---|---|---|---|
| CN | 204610957 | U | 9/2015 |
| CN | 106090315 | A | 11/2016 |

(Continued)

OTHER PUBLICATIONS

Extended EP Search Report mailed Jan. 7, 2025 and issued in connection with European Patent Appln. No. 24165439.1.

*Primary Examiner* — Ljiljana V. Ciric
(74) *Attorney, Agent, or Firm* — Barnes & Thornburg

(57) ABSTRACT

A thermal management system is adapted for use in a vehicle to control the heating and/or cooling of the components of the vehicle. The thermal management system includes a plurality of fluid circuits and an integrated coolant controller. The integrated coolant controller is configured to control a flow of coolant fluid through the different fluid circuits.

28 Claims, 28 Drawing Sheets

(56) References Cited

U.S. PATENT DOCUMENTS 6,347,644 B1 2/2002 Channell
8,336,319 B2 * 12/2012 Johnston ................ B60K 11/04 62/434
8,375,990 B2 2/2013 Veros
8,402,776 B2 3/2013 Johnston et al.
8,448,696 B2 5/2013 Johnston et al.
8,931,299 B2 * 1/2015 Major ................ B60H 1/00885 62/244
9,777,469 B2 10/2017 Wang
10,183,549 B2 * 1/2019 Koberstein ........ B60H 1/00385
10,343,487 B2 * 7/2019 Koberstein ........ B60H 1/32284
10,344,877 B2 7/2019 Roche et al.
10,665,908 B2 5/2020 Krull et al.
10,851,901 B2 12/2020 Liberman et al.
10,967,702 B2 4/2021 Mancini et al.
11,065,936 B2 * 7/2021 Gonze ................ B60H 1/00385
11,084,404 B2 8/2021 Gupta et al.
11,085,356 B2 * 8/2021 Mendez Abrego .... B60K 11/02
11,168,797 B2 11/2021 Dragojlov et al.
11,247,529 B2 2/2022 Zhou et al.
11,383,578 B2 7/2022 Huang et al.
11,576,284 B2 2/2023 Kim et al.
11,614,024 B2 * 3/2023 Jeong ..................... F01P 11/029 62/503
11,884,127 B2 * 1/2024 Jeong ...................... B60L 58/26
12,049,119 B2 * 7/2024 Park .......................... B60L 1/02
12,151,539 B2 * 11/2024 Calderone ............ B60H 1/3223
12,362,563 B2 * 7/2025 Ziminsky .................. H02J 3/46
2006/0118066 A1 6/2006 Martins
2006/0231146 A1 10/2006 Lillback
2008/0223464 A1 9/2008 Merrell
2009/0205346 A1 * 8/2009 Major ................ B60H 1/00885 62/118
2010/0319796 A1 12/2010 Whitaker
2014/0053931 A1 2/2014 Whitaker
2014/0090414 A1 4/2014 Mclane et al.
2015/0354716 A1 12/2015 Morein
2017/0089474 A1 3/2017 Zhan et al.
2017/0373359 A1 * 12/2017 Krull ................... H01M 10/613
2018/0312035 A1 * 11/2018 Koberstein ........ B60H 1/00899
2019/0039440 A1 2/2019 Calderone
2019/0061470 A1 * 2/2019 Koberstein ........ B60H 1/00392
2019/0070924 A1 * 3/2019 Mancini ............. B60H 1/32281
2020/0011437 A1 1/2020 Lin et al.
2020/0047591 A1 * 2/2020 He ..................... B60H 1/32284
2020/0353811 A1 * 11/2020 Wolf ........................ B60K 1/00
2020/0408134 A1 * 12/2020 Asano ...................... F01P 11/08
2021/0188043 A1 * 6/2021 Smith .................. B60H 1/3204
2021/0331554 A1 * 10/2021 Mancini ............. B60H 1/00278
2022/0146003 A1 5/2022 Yu et al.
2022/0348051 A1 * 11/2022 Chen ................... H01M 10/659
2022/0388374 A1 * 12/2022 Calderone ............... F25B 41/40
2022/0390026 A1 12/2022 Chapman
2023/0001761 A1 * 1/2023 Park .................. H01M 8/04074
2023/0373350 A1 * 11/2023 Farhat ................. H01M 10/625
2024/0317017 A1 * 9/2024 Brock .................... B60K 11/02
2024/0399838 A1 * 12/2024 Calderone ............ B60H 1/3223
2025/0020226 A1 * 1/2025 Ishii ...................... F16K 27/065
2025/0020229 A1 * 1/2025 Ishii ........................ F16K 11/22
2025/0170313 A1 * 5/2025 Scarpaci ................. A61M 1/28
2025/0187399 A1 * 6/2025 Li ...................... B60H 1/00485
2025/0220865 A1 * 7/2025 Ishii ....................... B60K 11/02
2025/0222760 A1 * 7/2025 Ishii ................... H05K 7/20263
2025/0286376 A1 * 9/2025 Ziminsky .................. H02J 3/14
2025/0301613 A1 * 9/2025 Miyoshi ............. B60H 1/00885

FOREIGN PATENT DOCUMENTS

CN 107893865 A 4/2018
CN 112606676 A 4/2021
CN 112682541 A 4/2021
CN 214743520 U 11/2021
CN 214946603 U 11/2021
CN 214999563 U 12/2021
CN 215059741 U 12/2021
CN 215950468 U 3/2022
CN 114688306 A 7/2022
CN 217207877 U 8/2022
CN 217539713 U 10/2022
CN 114635991 B 3/2023
CN 220102162 U 11/2023
CN 221780053 U 9/2024
DE 10153222 B4 7/2012
DE 202014102795 U1 6/2014
DE 102016219983 A1 * 9/2017 .............. F01P 11/00
DE 102021101096 A1 7/2022
EP 4086563 A1 11/2022
JP H1144369 A 2/1999
JP 2002022041 A 1/2002
JP 2017180445 A * 10/2017 ............ F01P 11/029
KR 102755907 B1 * 1/2025 .............. F01P 7/165
WO 2022057588 A1 3/2022

* cited by examiner 126
126A
THROTTLE BIASING ASSEMBLY
116
122
BIAS MEMBER COVER
BIAS MEMBER
120
128A
130A
130
128
THROTTLE VALVE ROTOR
92
92S
THROTTLE VALVE ROTOR SHAFT
92W
THROTTLE VALVE ROTOR WALL
92P
THROTTLE VALVE ROTOR PLATE 116
THROTTLE BIASING ASSEMBLY
122
BIAS MEMBER COVER
120
BIAS MEMBER
92
THROTTLE VALVE ROTOR
92S
THROTTLE VALVE ROTOR SHAFT
92W
THROTTLE VALVE ROTOR WALL
126
92O
130
130A
130S
130P
128A
128S
128P
128
92P
96A
THROTTLE VALVE ROTOR PLATE

| MODE | | LOOP 1 | LOOP 2 | LOOP 3 |
|---|---|---|---|---|
| A | SYSTEM COOLING (RADIATOR / BATTERY LOOP) | 1, 2 | 3, 6 | 7, 8 |
| B | SYSTEM HEATING | 1, 6 | 3, 2 | 7, 8 |
| C | BATTERY CONDITIONING | 1, 8 | 7, 2 | 3, 6 |
| D | SYSTEM COOLING (RADIATOR ONLY) | 1, 2 | 3, 8 | 7, 6 |

*FIG. 15*

THROTTLE VALVE ROTOR (THROTTLE CONFIGURATION)

THROTTLE VALVE ROTOR (SECOND POSITION)

THROTTLE VALVE ROTOR (FIRST POSITION)

THERMAL MANAGEMENT SYSTEM

PRIORITY CLAIM

This application claims priority to and the benefit of U.S. Provisional Patent Application No. 63/454,610, filed 24 Mar. 2023, the disclosure of which is now expressly incorporated herein by reference.

TECHNICAL FIELD

The present disclosure relates to thermal management systems, and particularly to thermal management systems for controlling the flow of heating and/or cooling fluid to in electric or hybrid vehicles.

BACKGROUND

Thermal management systems for electric vehicles may be used to heat or cool various components included in electric or hybrid vehicles. These thermal management systems may include multiple thermal fluid circuits that have different valves and hosing to carry the flow of cooling and/or heating fluid to the various components. However, there is a need to reduce the power needed to operate the thermal management system.

SUMMARY

The present disclosure provides a thermal management system adapted for use in a vehicle. The thermal management system comprises a plurality of fluid circuits and an integrated coolant controller. The plurality of fluid circuits each includes a conduit configured to conduct coolant fluid therethrough. The integrated coolant controller is configured to control a flow of coolant fluid through the different fluid circuits thereby controlling the heating and/or cooling of components on the vehicle.

In the illustrative embodiments, the integrated coolant controller comprises a coolant tank, a first pump, a multi-way valve, and a manifold. The coolant tank is formed to define a coolant reservoir configured to store the coolant fluid. The first pump is configured to pump the flow of the coolant fluid from the coolant tank through the plurality of fluid circuits. The multi-way valve is configured to control the flow of the coolant fluid through the plurality of fluid circuits. The manifold is coupled to each of the coolant tank, the first pump, and the multi-way valve to integrate the coolant tank, the first pump, and the multi-way valve so that each fluid circuit of the plurality of fluid circuits flows through the manifold to eliminate the need for piping between the coolant tank, the first pump, and the multi-way valve and to reduce the amount of power used by the first pump to supply the coolant fluid through the different fluid circuits.

In the illustrative embodiments, the manifold includes a manifold body shaped to define a plurality of fluid cavities and a plurality of pipes that each extend from the manifold body. The plurality of pipes each define a pipe passageway in fluid communication with one of the fluid cavities included in the plurality of fluid cavities and one conduit of the plurality of fluid circuits.

In the illustrative embodiments, the manifold is shaped to include a plurality of temperature sensor docks. The temperature sensor docks are each configured to receive a temperature sensor to mount the temperature sensor in fluid communication with one of the plurality of fluid cavities to measure the temperature of the flow of coolant fluid.

In the illustrative embodiments, the manifold includes a tank dock. The tank dock is configured to receive the coolant tank to mount the coolant tank on the manifold so that the coolant tank closes a top opening of the manifold and inlet and outlet ports included in the coolant tank align with tank ports on the manifold.

In the illustrative embodiments, the coolant tank is welded to the tank dock of the manifold. In the illustrative embodiments, the cool tank may be integrally formed with the manifold so that the coolant tank and the manifold are a single-piece component.

In the illustrative embodiments, the manifold includes a first pump dock. The first pump dock is configured to receive the first pump to mount the first pump on the manifold so that an inlet of the first pump is connected in fluid communication with the coolant reservoir of the coolant tank and an outlet of the first pump is connected in fluid communication with one of the plurality of fluid circuits.

In the illustrative embodiments, the manifold includes a valve dock. The valve dock is configured to receive the multi-way valve to mount the multi-way valve on the manifold so that a plurality of apertures included in the multi-way valve align with valve ports on the manifold. Each of the valve ports is in the fluid communication with one of the fluid cavities of the plurality of fluid cavities.

In the illustrative embodiments, the manifold comprises a tank dock, a first pump dock, and a valve dock. The tank dock is configured to receive the coolant tank to mount the coolant tank on the manifold so that the coolant tank closes a top opening of the manifold and inlet and outlet ports included in the coolant tank align with tank ports on the manifold. The first pump dock is configured to receive the first pump to mount the first pump on the manifold so that an inlet of the first pump is connected in fluid communication with the coolant reservoir of the coolant tank and an outlet of the first pump is connected in fluid communication with one of the plurality of fluid circuits. The valve dock is configured to receive the multi-way valve to mount the multi-way valve on the manifold so that a plurality of apertures included in the multi-way valve align with valve ports on the manifold.

In the illustrative embodiments, the thermal management system comprises a main fluid circuit, a radiator fluid circuit, and a battery fluid circuit. The main fluid circuit includes a main conduit configured to conduct coolant fluid therethrough and adapted to be in thermal communication with front and rear drives included in the vehicle to transfer heat between the front and rear drives and the coolant fluid. The radiator fluid circuit includes a radiator-circuit conduit configured to conduct the coolant fluid therethrough and adapted to be in thermal communication with a radiator included in the vehicle to transfer heat between the radiator and the coolant fluid. The battery fluid circuit includes battery-circuit conduit configured to conduct the coolant fluid therethrough and adapted to be in thermal communication with batteries included in the vehicle to transfer heat between the batteries and the coolant fluid and a heat exchanger in fluid communication with the battery-circuit conduit to transfer heat between the coolant fluid and a fluid in the heat exchanger.

In the illustrative embodiments, the integrated coolant controller comprises a first pump and a second pump. The first pump is configured to pump a flow of the coolant fluid from the coolant tank through the main fluid circuit. The second pump is configured to pump a flow of the coolant fluid through the battery fluid circuit. In the illustrative embodiments, the multi-way valve is configured to control the flow of the coolant fluid through the main fluid circuit, the radiator fluid circuit, and the battery fluid circuit.

In the illustrative embodiments, the manifold is coupled to each of the coolant tank, the first and second pumps, and the multi-way valve to integrate the coolant tank, the first and second pumps, and the multi-way valve. The manifold integrates the components together so that the main fluid circuit, the radiator fluid circuit, and the battery fluid circuit flow through the manifold to eliminate the need for piping between the coolant tank, the first and second pumps, and the multi-way valve and to reduce the amount of power used by the pumps to supply the coolant fluid through the different fluid circuits.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic view of an integrated coolant controller adapted for use in a thermal management system as shown in FIG. 2, to control the heating and/or cooling to various components in a vehicle, the integrated coolant controller including a coolant tank that defines a coolant reservoir, pumps configured to pump coolant fluid through the thermal management system, a multi-way valve configured to control the flow of coolant fluid to the different thermal fluid circuits of the thermal management system, and a manifold coupled to each of the coolant tank, the pumps, and the multi-way valve to integrate the components thereby eliminating unnecessary piping or hosing between the coolant tank, the pumps, and the multi-way valve and reducing the amount of power used by the pumps to supply the coolant fluid through the system;

FIG. 2 is a diagrammatic view of the thermal management system which includes the integrated coolant controller of FIG. 1 showing the integrated coolant controller supplies coolant fluid through the manifold to front and rear drives, a radiator, a chiller/heater for batteries of the vehicle, and other electronic components on the vehicle;

FIG. 3 is an exploded view of the integrated coolant controller of FIG. 1 showing the manifold includes, a battery pump dock configured to receive the battery pump to mount the battery pump on the manifold, a drive pump dock configured to receive the drive pump to mount the drive pump on the manifold, and a valve dock configured to mount the multi-way valve on the manifold so that apertures included in the multi-way valve as shown in FIG. 4 align with valve ports on the manifold;

FIG. 4 is an exploded view of the integrated coolant controller of FIG. 1 showing the manifold further includes a coolant tank dock configured to mount the coolant tank on the manifold so that the coolant tank closes a top opening of the manifold and inlet and outlet ports included in the coolant tank as shown in FIG. 3 align with tank ports on the manifold;

FIG. 5 is a perspective diagrammatic view of the integrated coolant controller of FIG. 1 with the coolant tank removed to show the tank ports on the manifold are configured to be in fluid communication with the coolant reservoir of the coolant tank when the coolant tank is mounted to the tank dock, and further showing the manifold includes a manifold body that defines a plurality of fluid cavities as shown in FIGS. 6 and 7 and different inlet and outlet pipes that extend from the manifold body and couple to different fluid circuits of the thermal management system to conduct coolant fluid from the fluid cavities to the different fluid circuit to control the temperature of the different components of the vehicle;

Figures 1, 2:
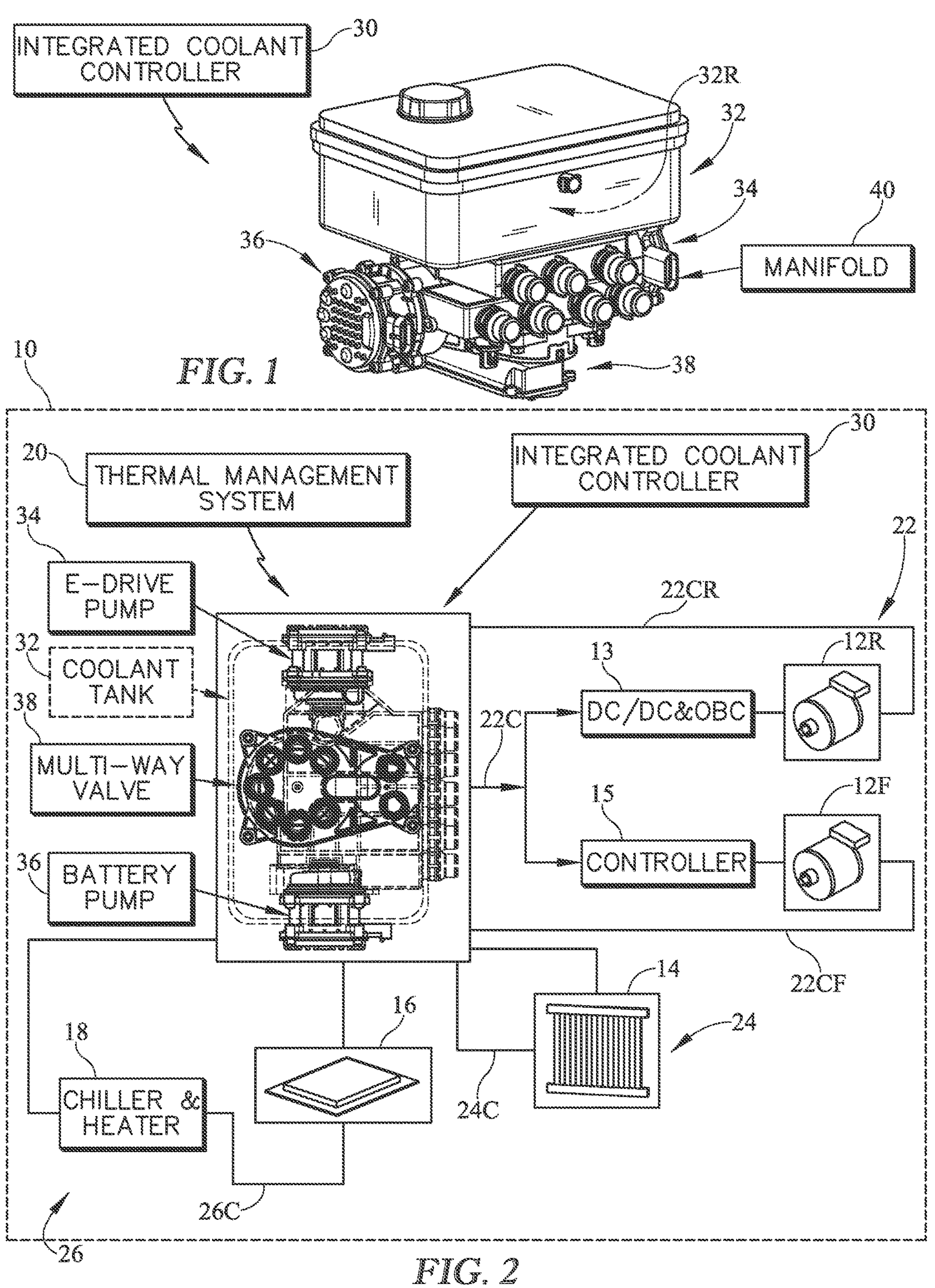
Figure 3:
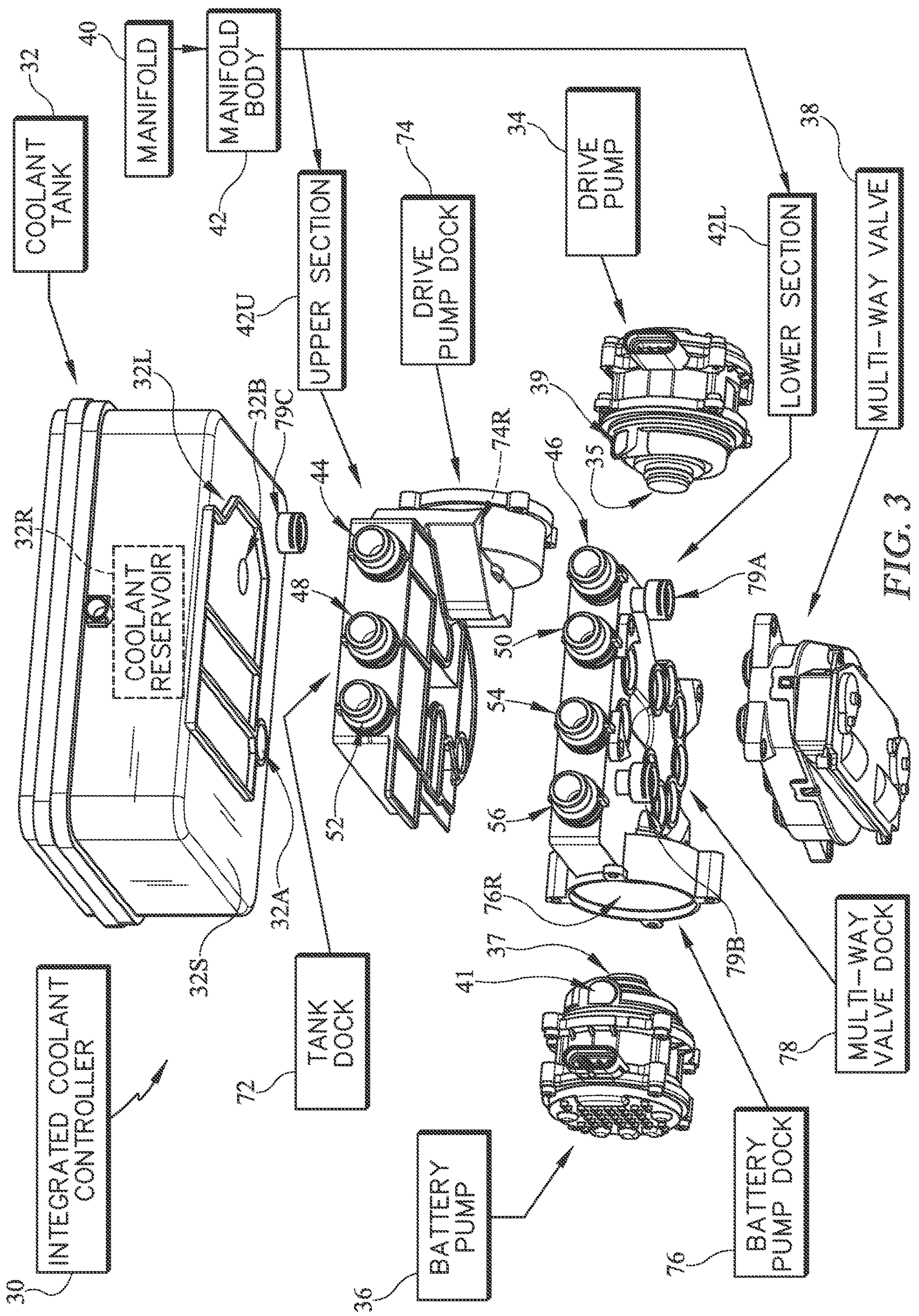
Figure 4:
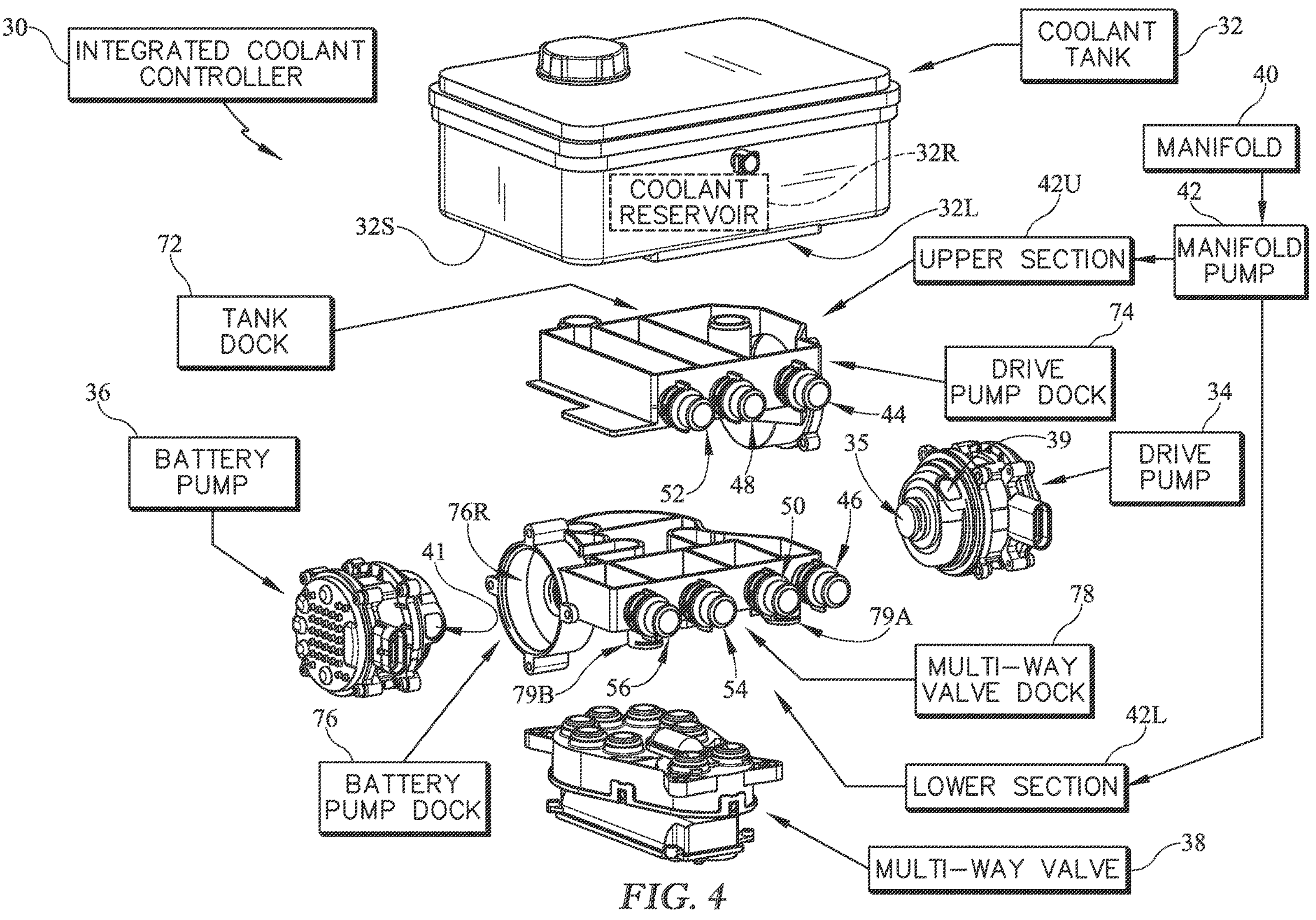
Figure 6:
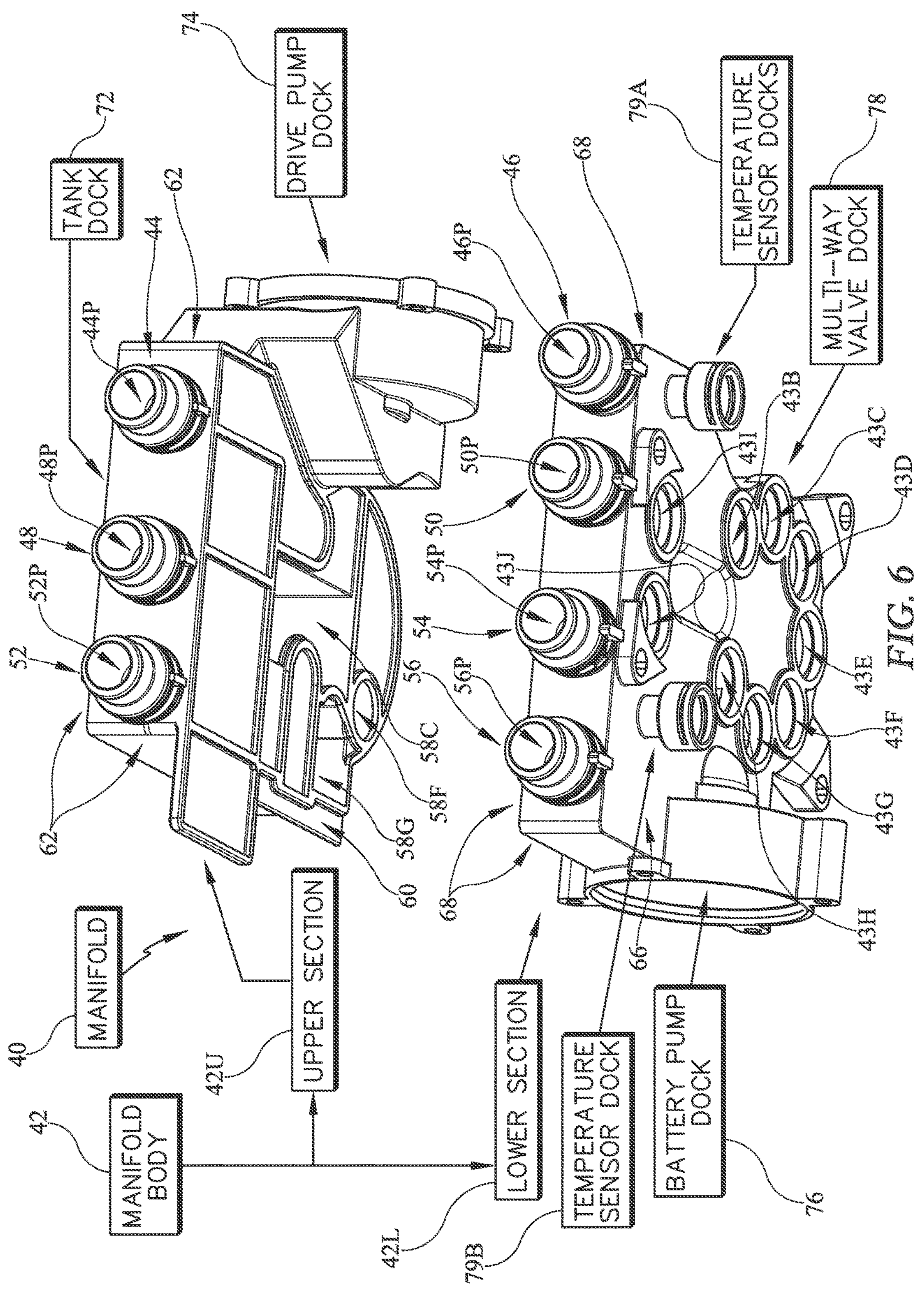
Figure 7:
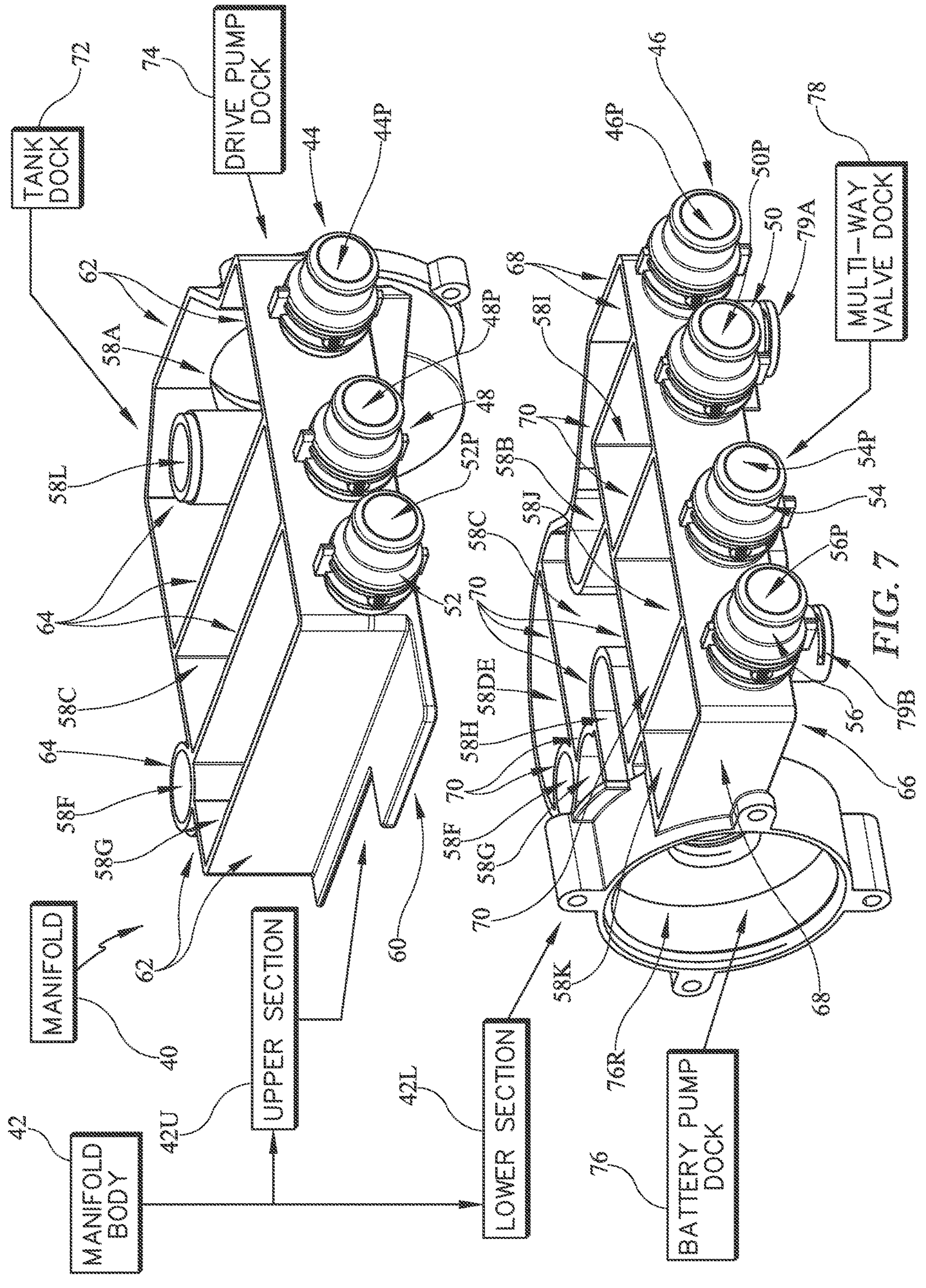
Figure 8:
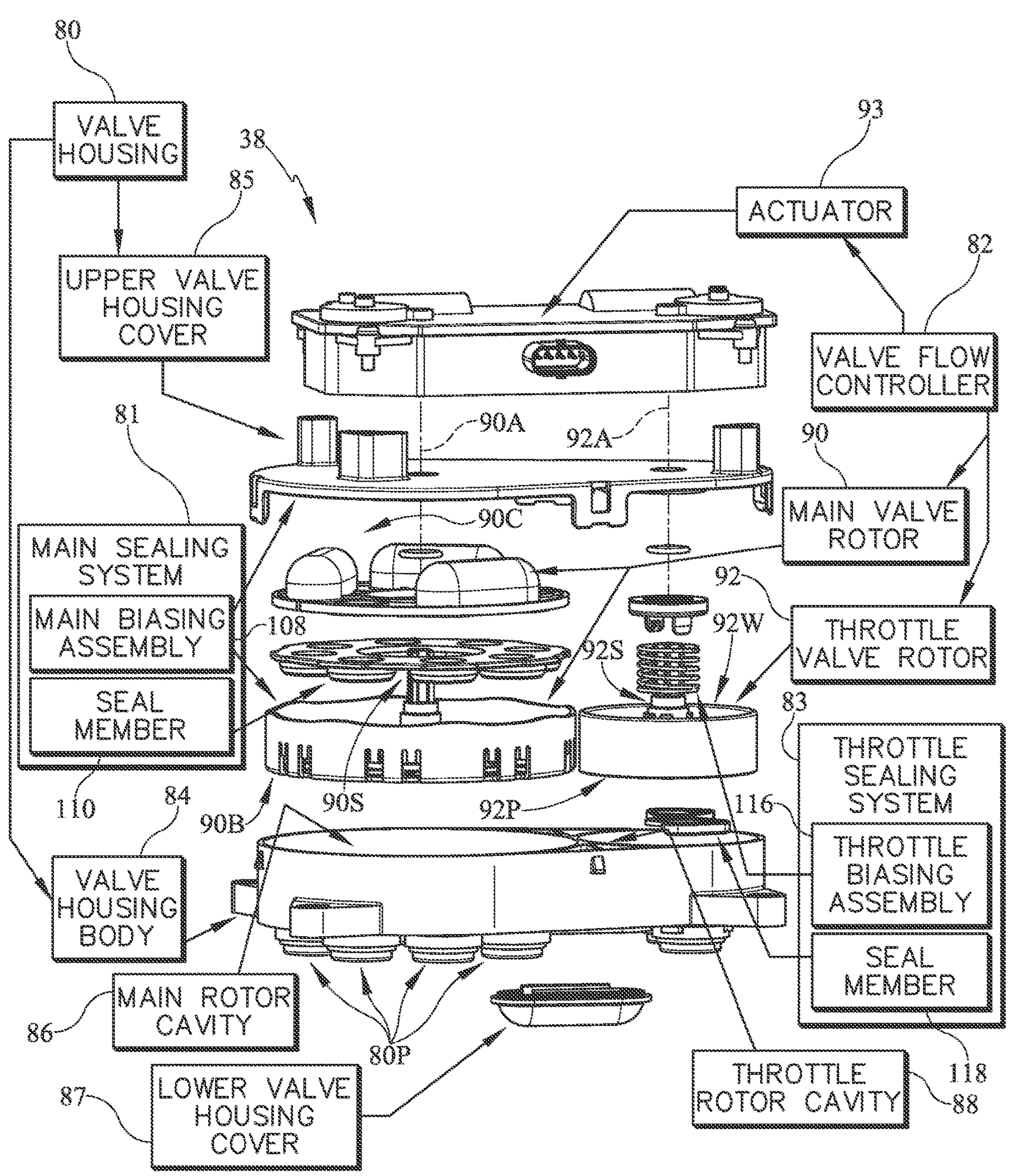
Figure 9:
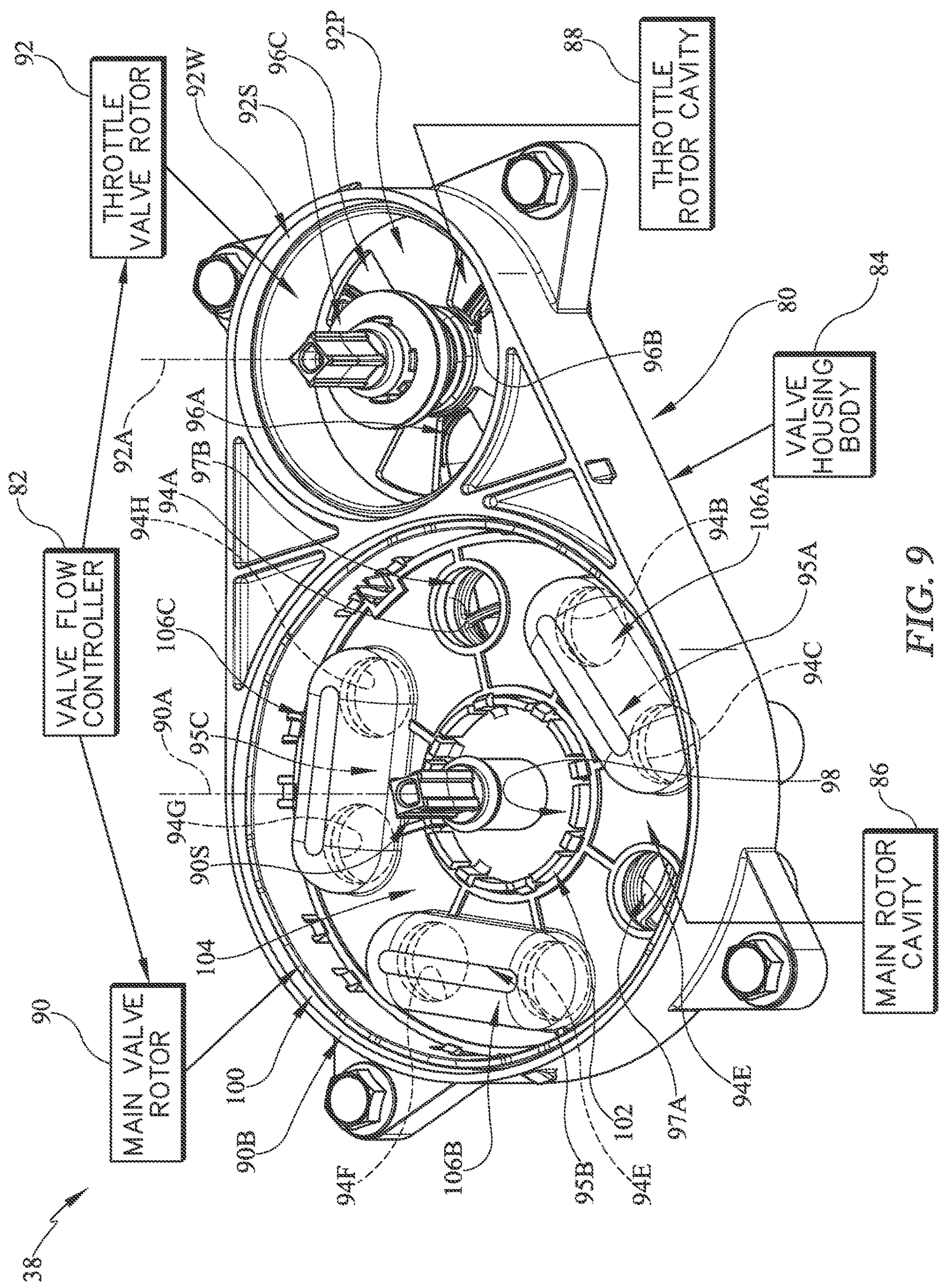
Figure 9A:
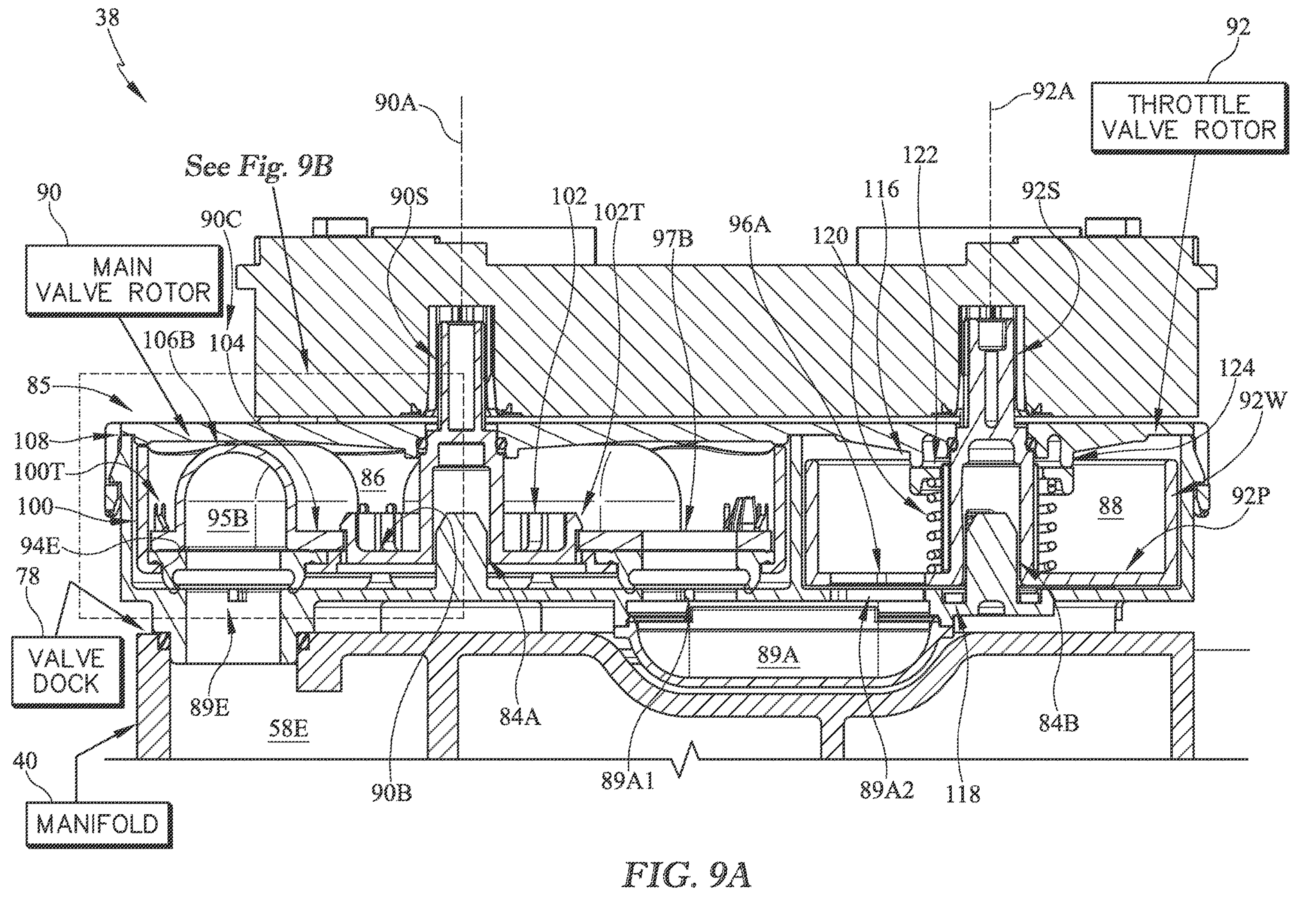
Figure 9B:
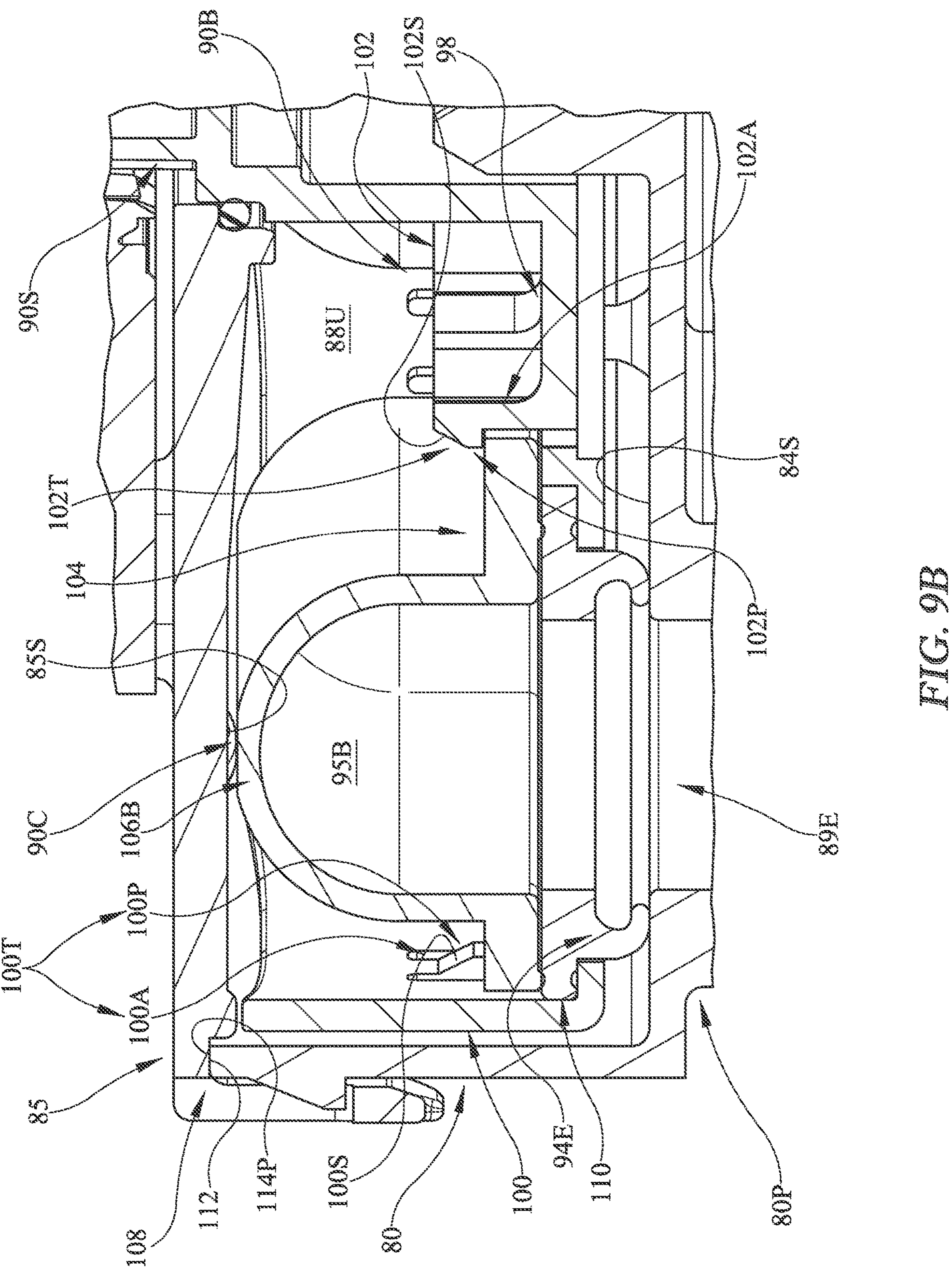
Figure 10:
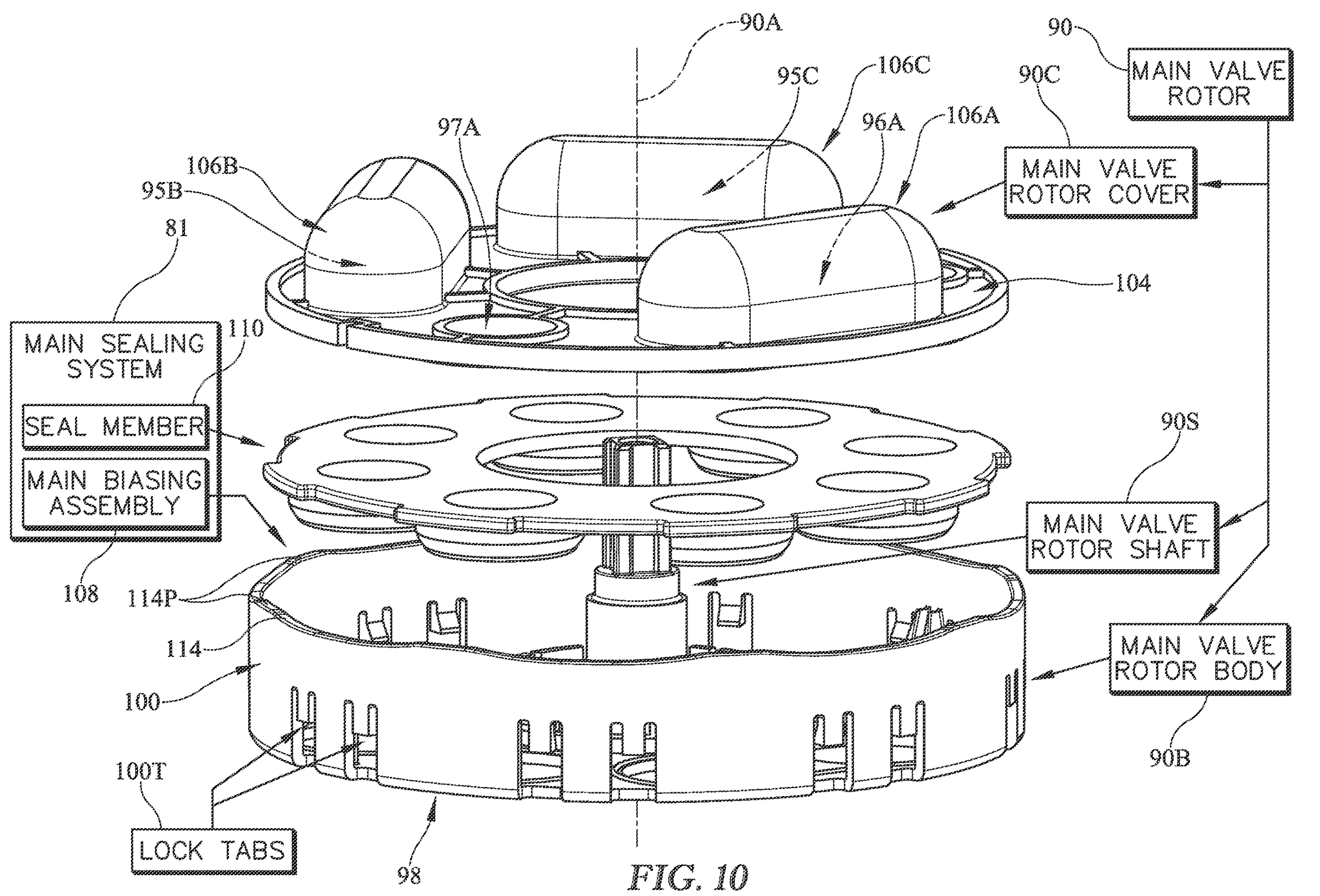
Figures 11, 12:
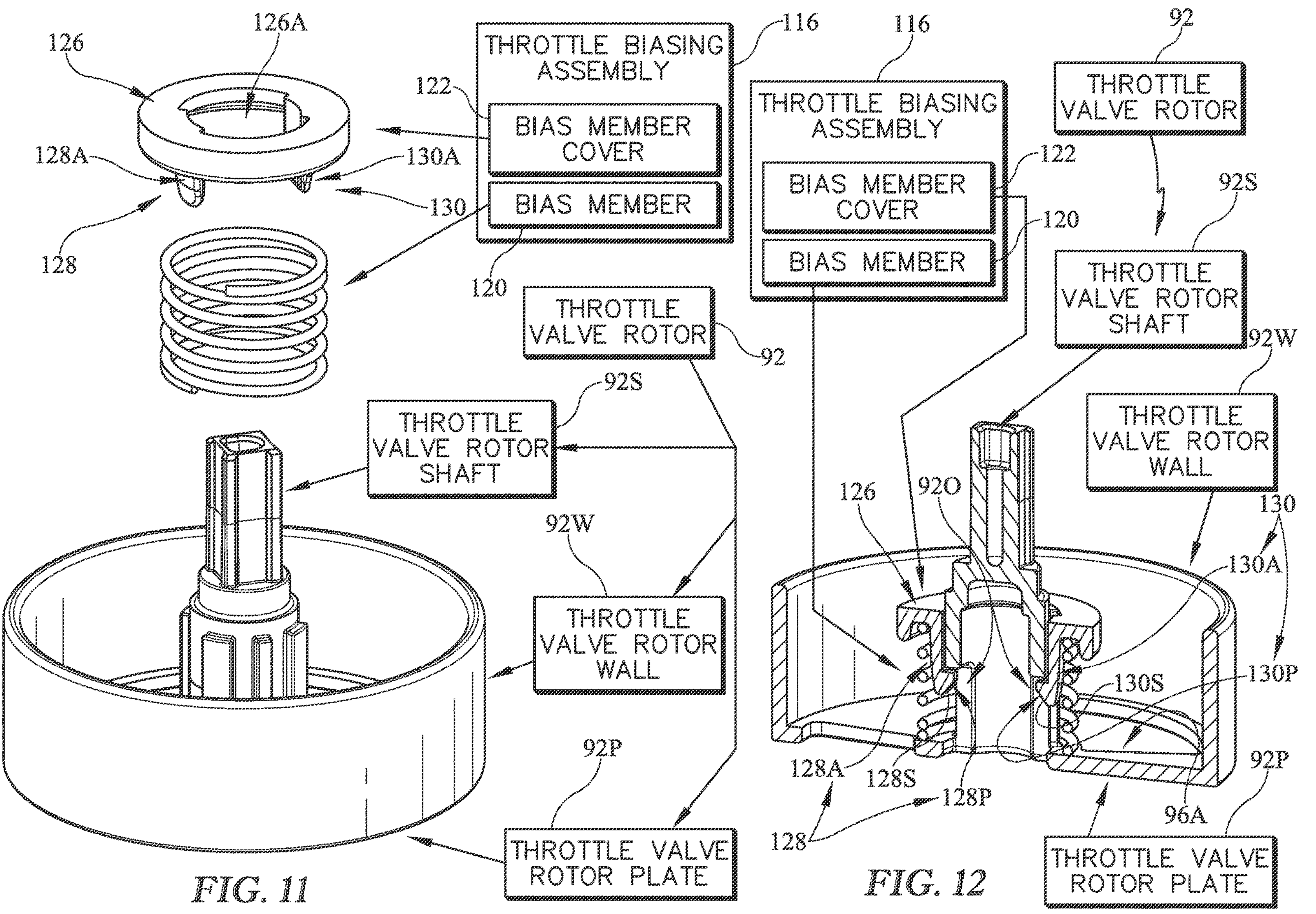
Figure 13:
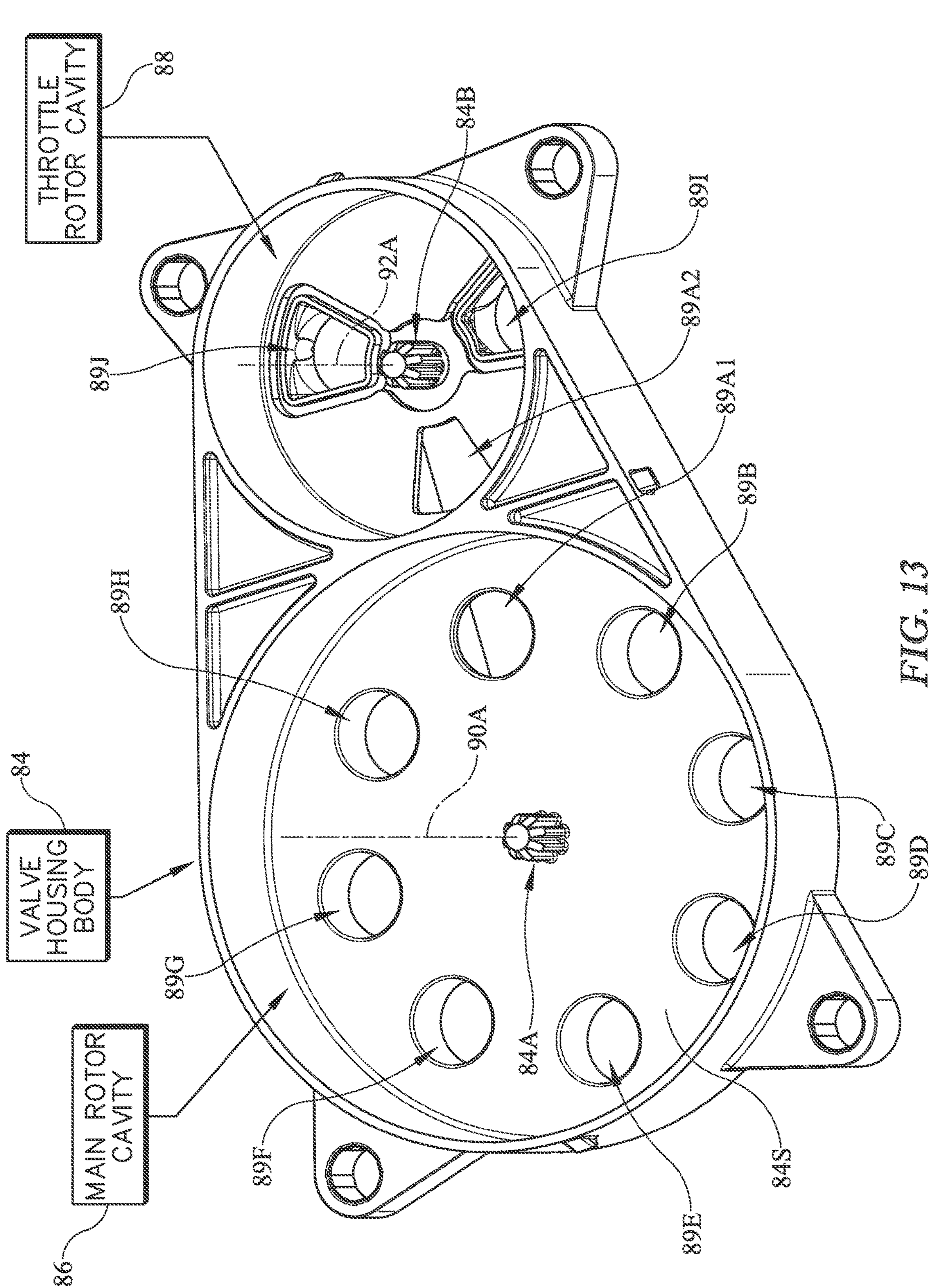
Figure 14:
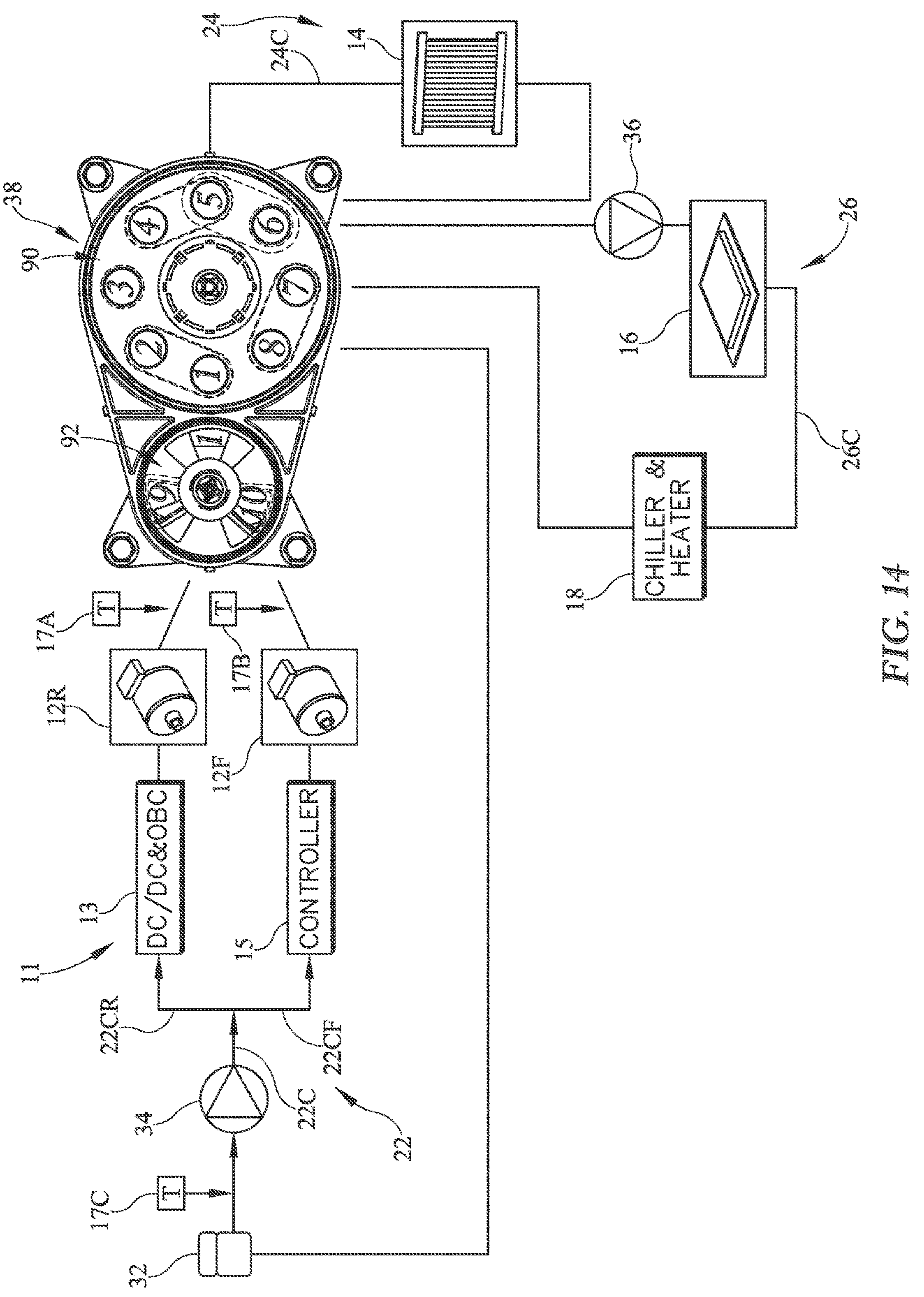
Figure 15A:
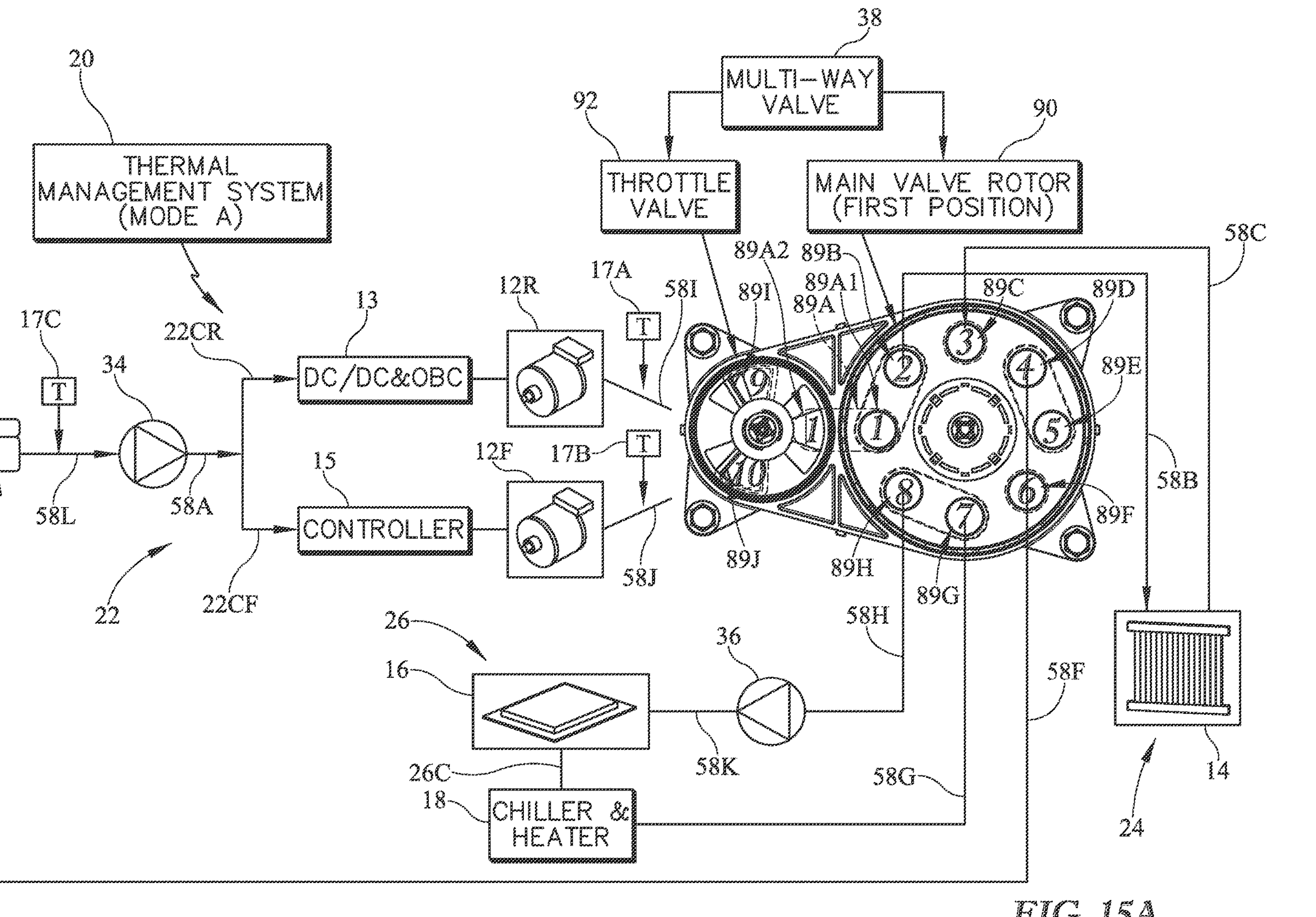
Figure 15B:
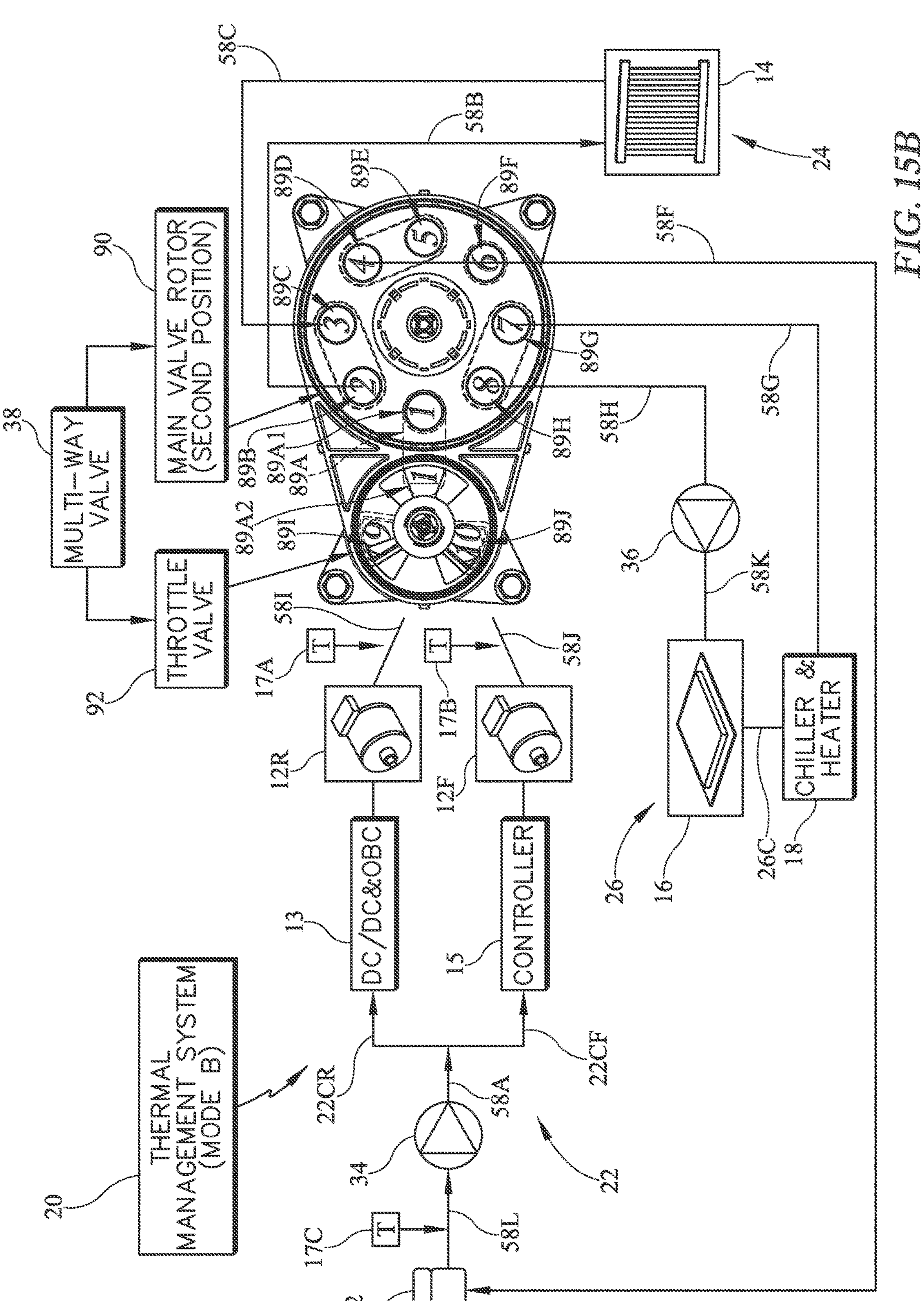
Figure 15C:
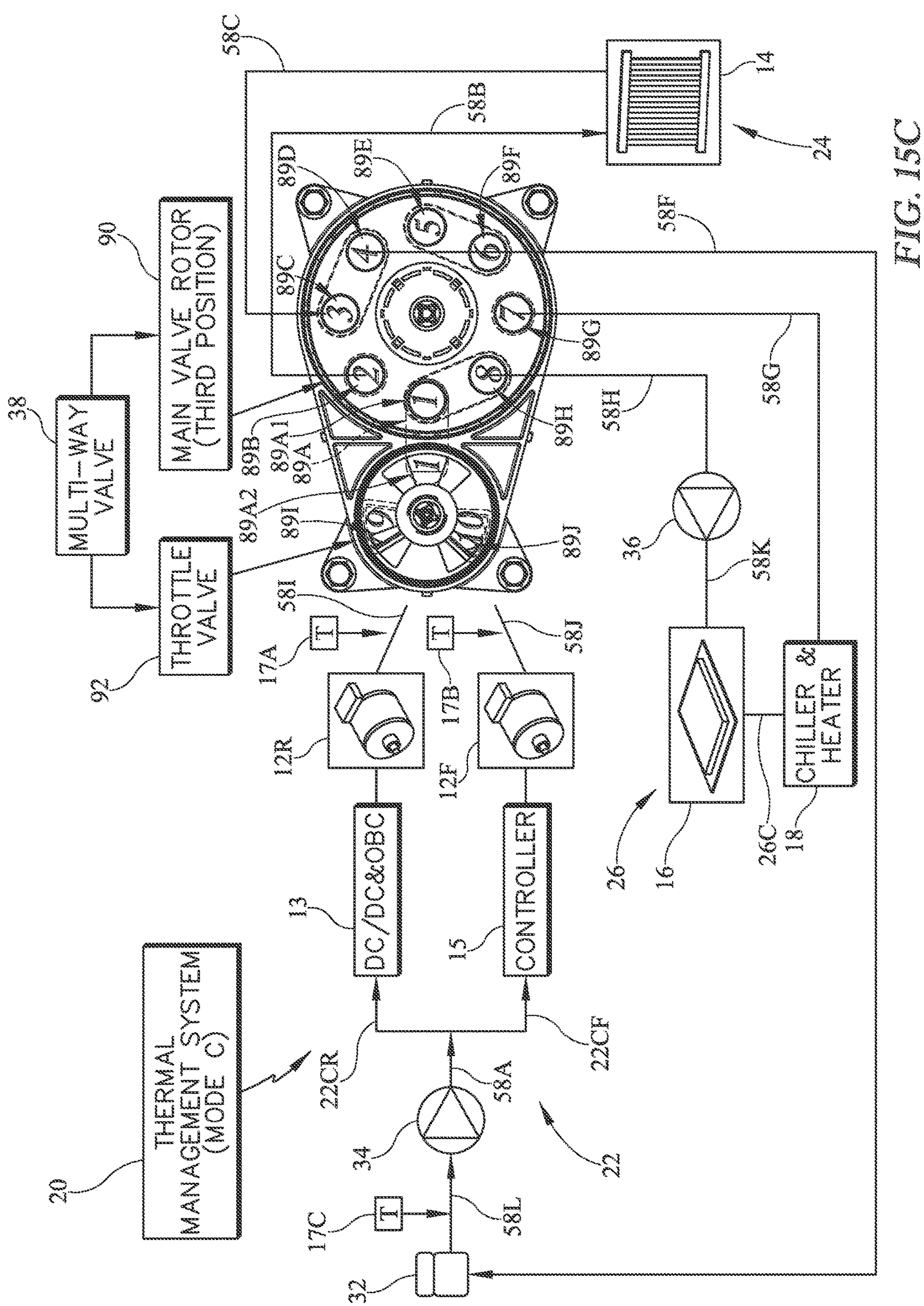
Figure 15D:
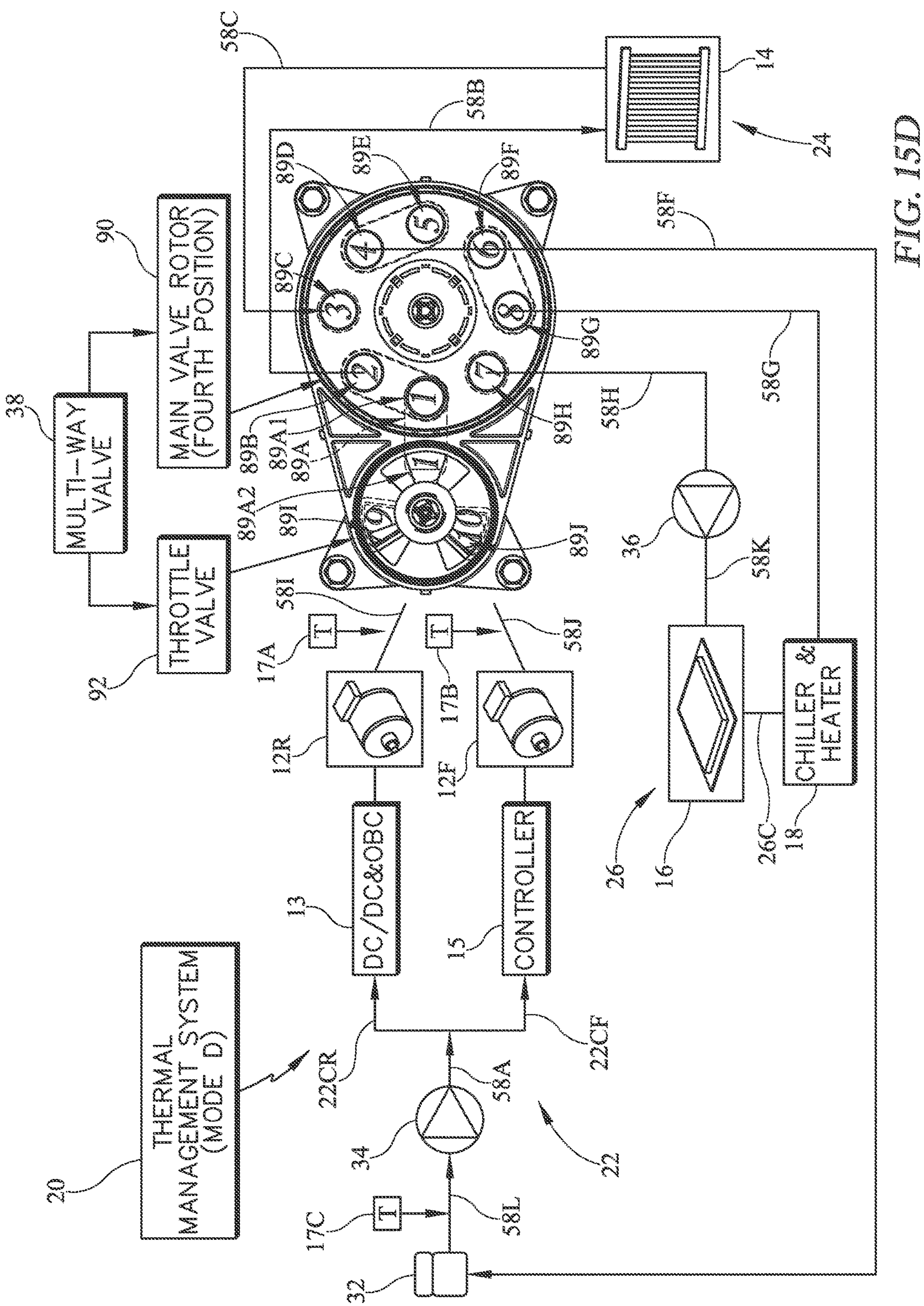
Figure 16:
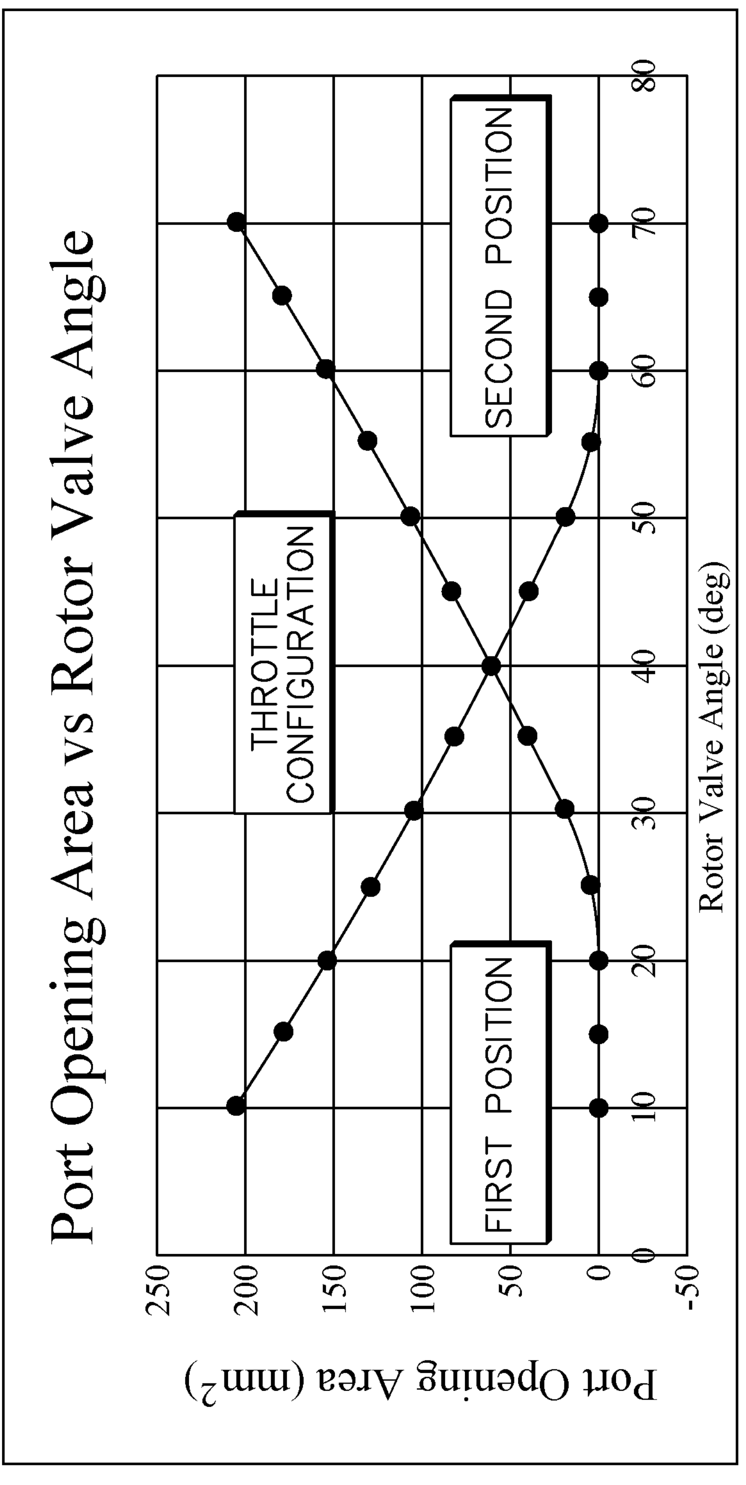
Figure 17A:
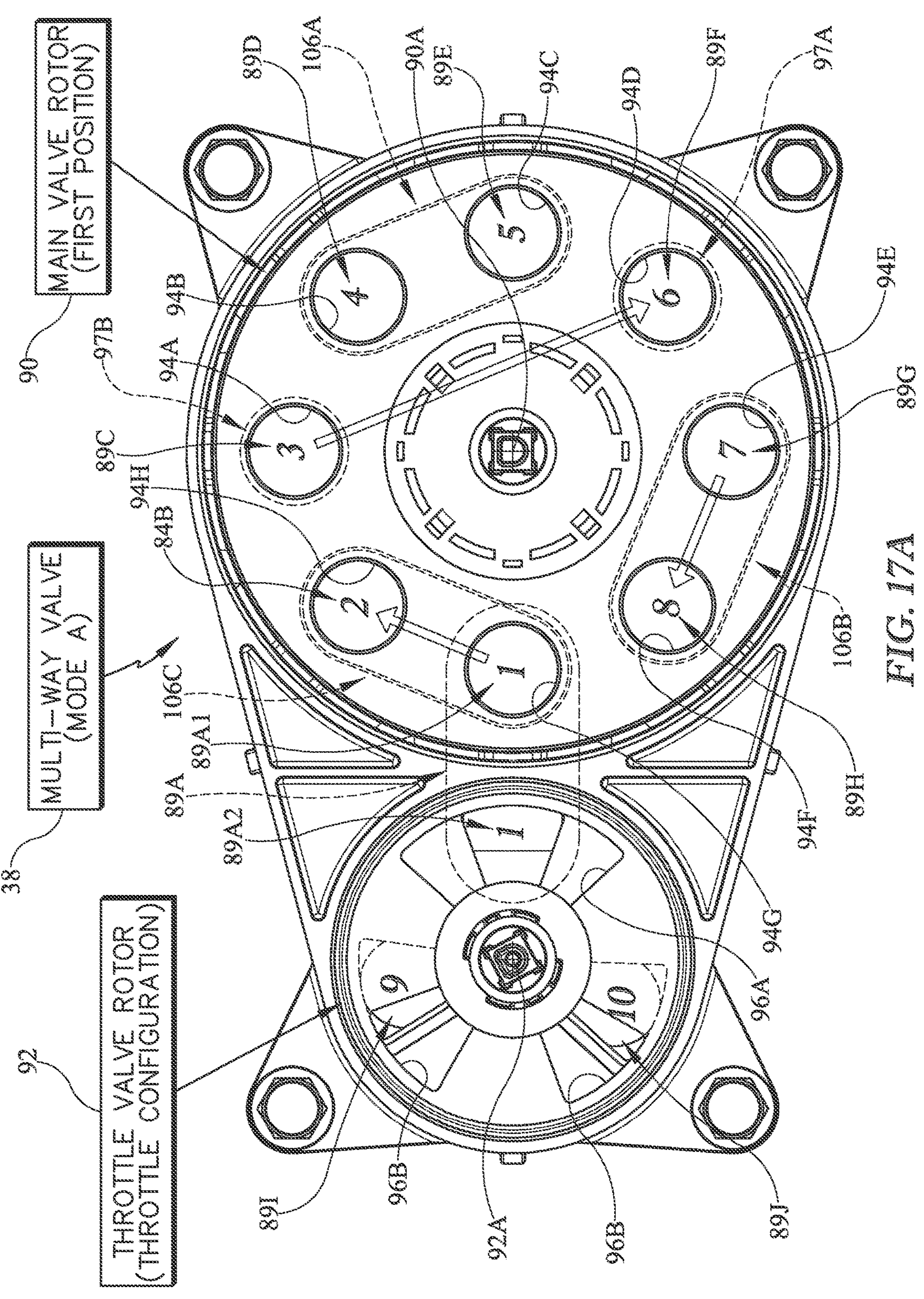
Figure 17B:
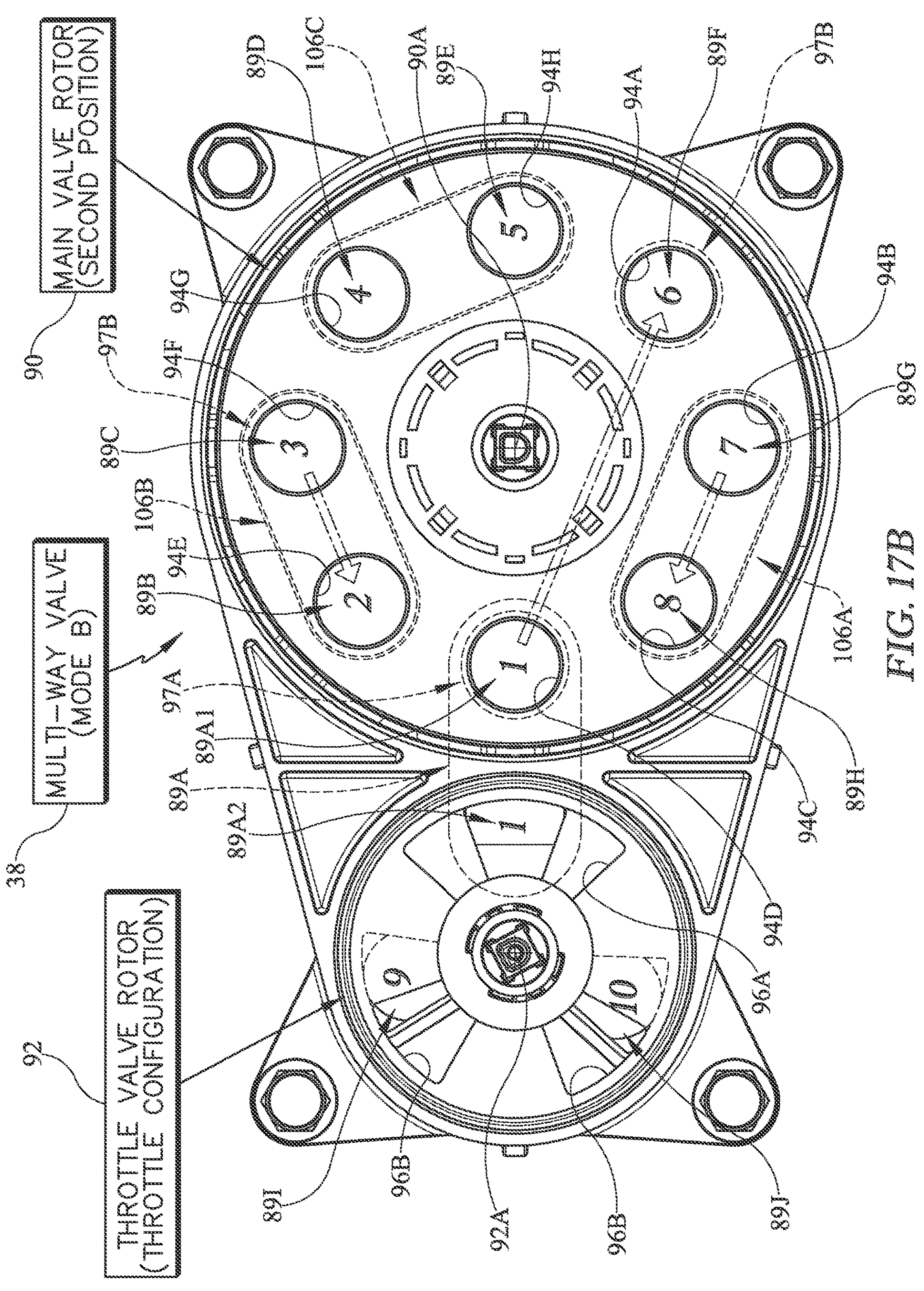
Figure 17C:
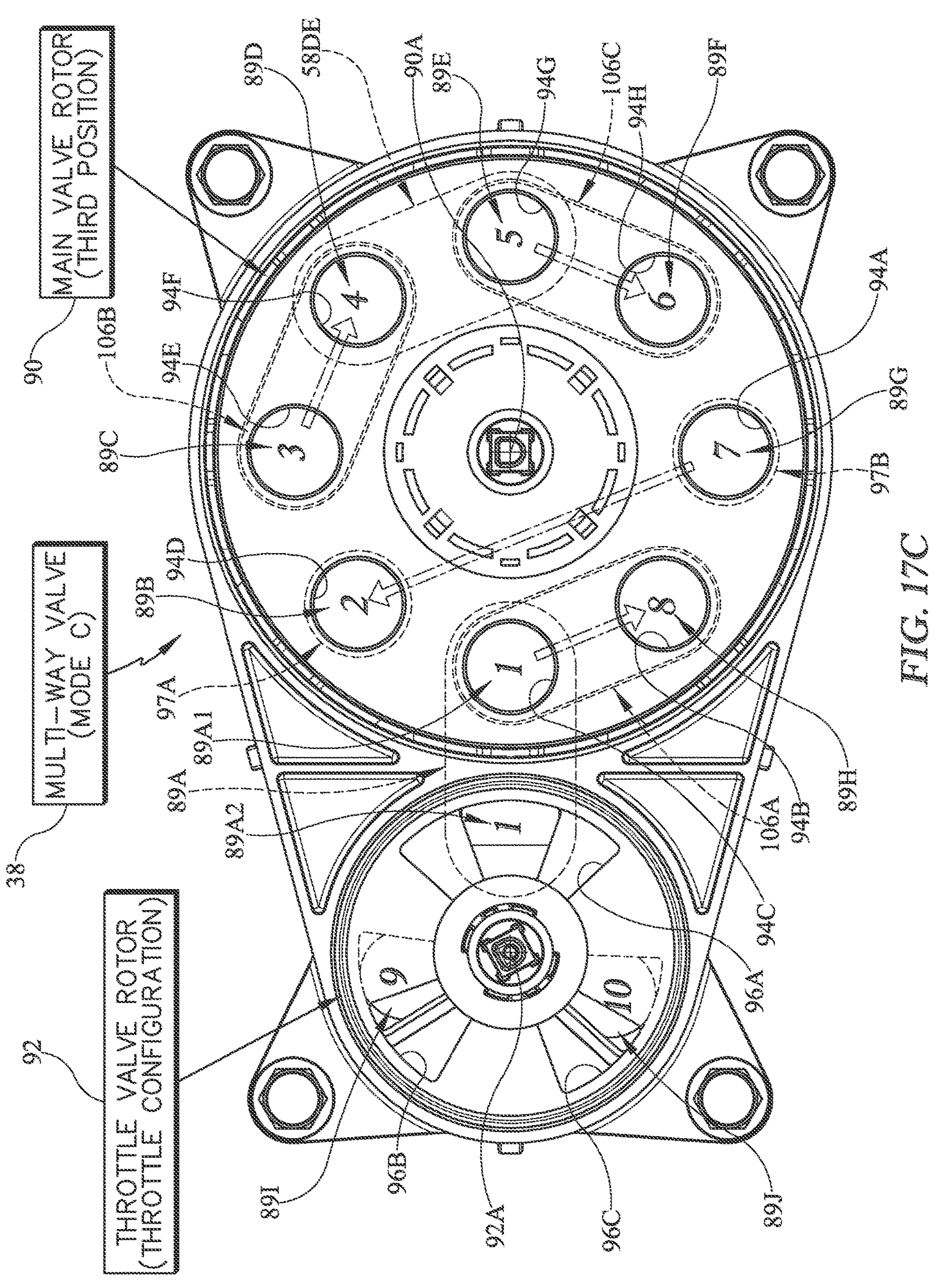
Figure 17D:
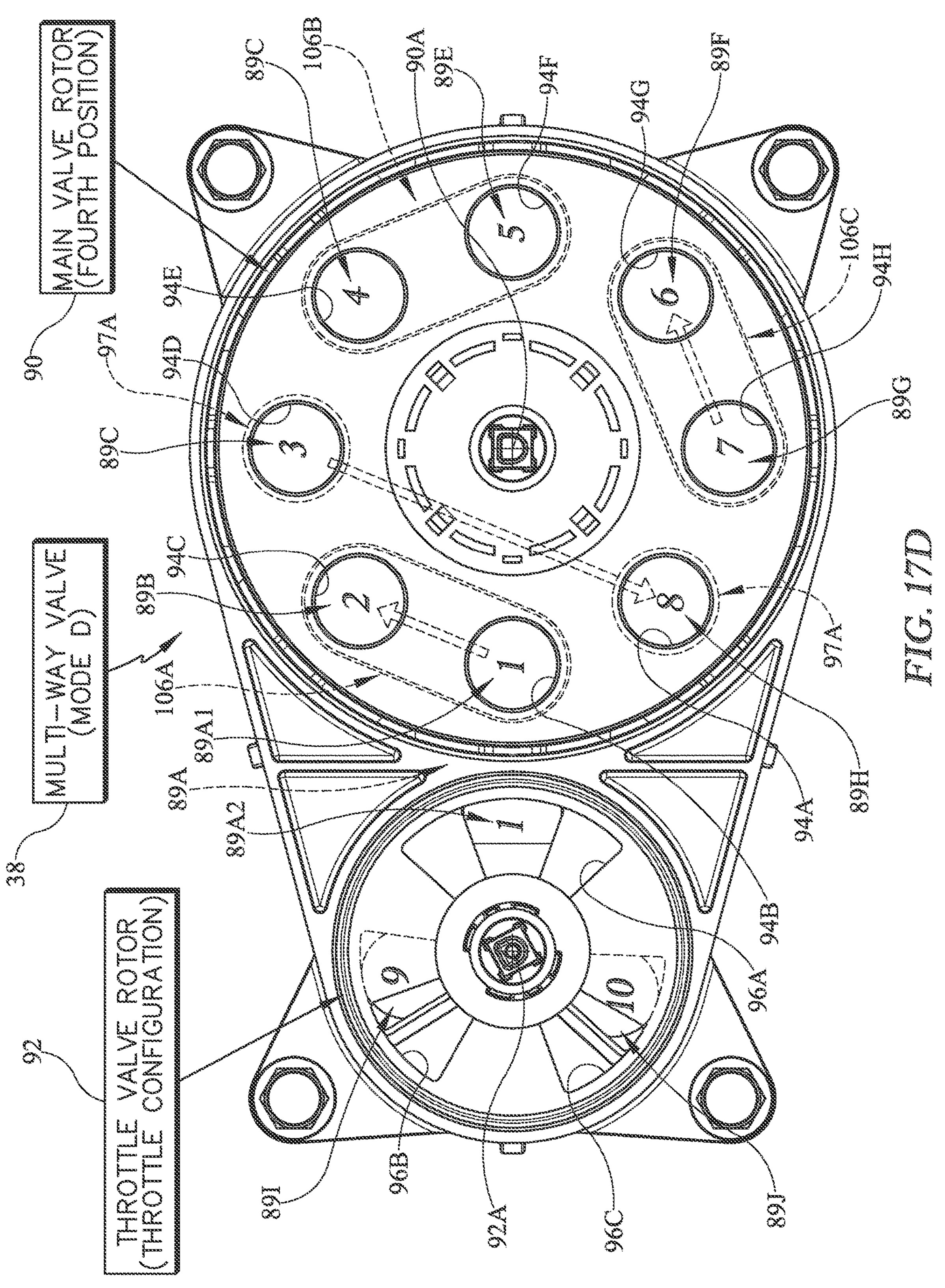
Figure 17E:
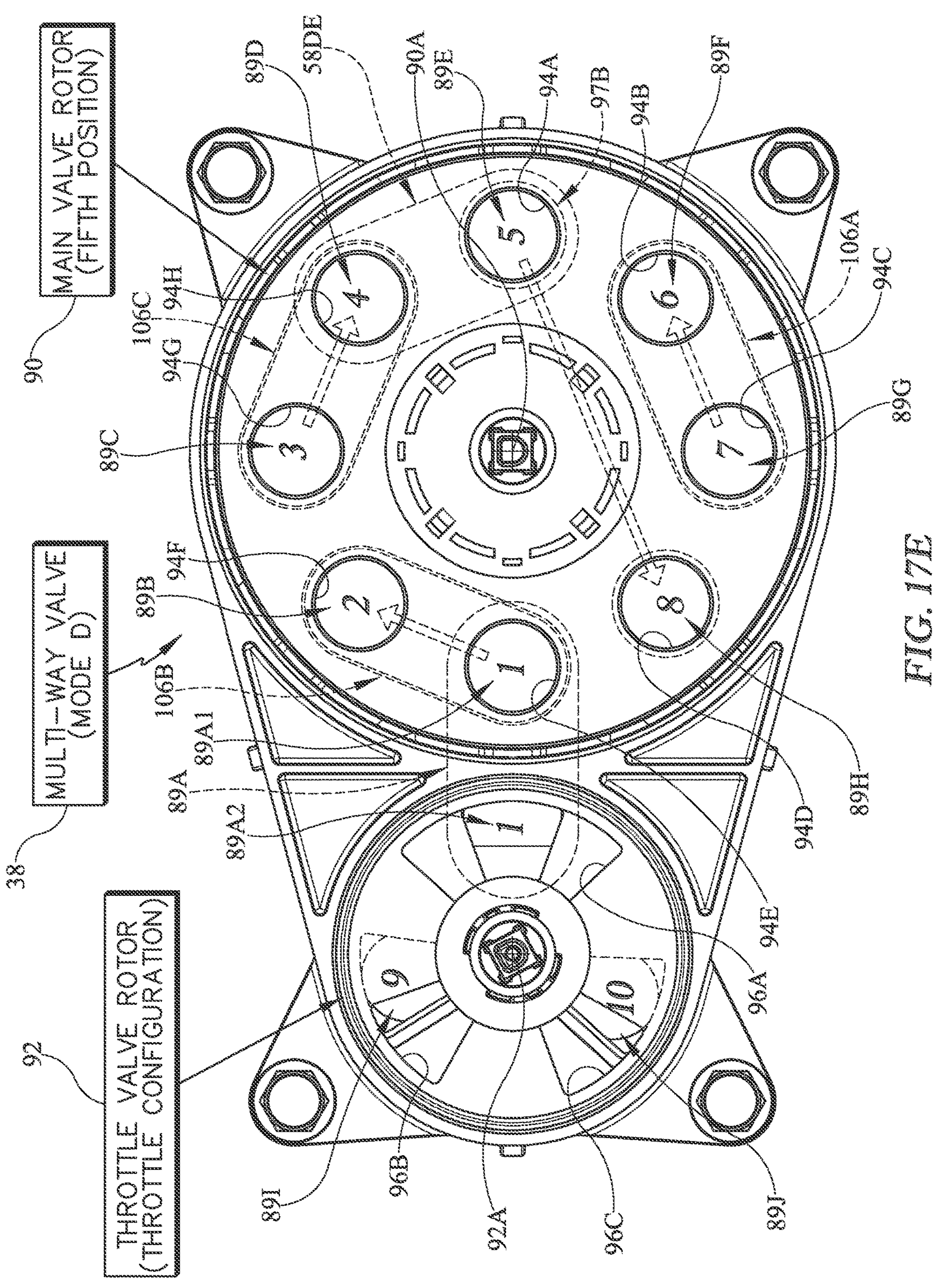

FIG. 6 is an exploded view of the manifold included in the integrated coolant controller of FIG. 3 showing the manifold body of the manifold includes the upper body section and the lower body section that are separate components that are coupled together, and further showing the upper body section of the manifold body is shaped to define the tank dock and the drive pump dock and the lower section is shaped to define the battery pump dock and the valve dock that defines the plurality of valve ports that align with the housing apertures of the multi-way valve when the multi-way valve is coupled to the valve dock of the manifold;

FIG. 7 is an exploded view of the manifold included in the integrated coolant controller of FIG. 4 showing the upper body section and the lower body section of the manifold body have side walls and a plurality of divider walls that extend between the side walls to define the different fluid cavities;

FIG. 8 is an exploded view of the multi-way valve included in the integrated coolant controller of FIG. 3 showing the multi-way valve includes a valve housing, a valve flow controller, and first and second sealing systems configured to seal between the valve housing and the valve rotors of the valve flow controller, the valve housing including a valve housing body with first and second valve cavities, an upper housing cover configured to be coupled to the valve housing body to close the first and second valve cavities, and a lower valve housing cover coupled to the valve housing body opposite the upper valve housing cover to close off a bottom opening of the valve housing body to define a connecting passageway between the first and second valve cavities, the valve flow controller including a first valve rotor—also referred to as a main valve rotor—configured to be arranged in the first valve cavity, a second valve rotor—also referred to as a throttle or proportional valve rotor—configured to be arranged in the second valve cavity, and an actuator that couples to the first and second valve rotors to drive rotation of the first and second valve rotors about the respective rotor axes to form a plurality of flow paths through the valve housing body of the valve housing as suggested in FIGS. 14A-D and 16A-C to control the flow through the different fluid cavities of the manifold so as to adjust which fluid circuits are or are not connected in fluid communication;

FIG. 9 is a perspective view of the multi-way valve of FIG. 8 with the upper housing cover removed to show the main valve rotor arranged in the first valve cavity and the throttle valve rotor arranged in the second valve cavity, and further showing the main valve rotor is formed to define a plurality of main rotor through holes that each extend axially through the main valve rotor to open into one aperture formed in the valve housing body and the throttle valve rotor is formed to define second rotor through holes that each extend axially through the second valve rotor to open into one aperture formed in the valve housing body;

FIG. 9A is a cross-section view of the multi-way valve of FIG. 9 showing the first sealing system includes a first seal member located axially between the first valve rotor body and the first valve rotor cover to provide a seal between the first valve rotor and the valve housing body so that leaks between the first valve rotor and the valve housing body are reduced as fluid flows through the first rotor though hole into the aperture in the valve housing body of the valve housing and a first biasing assembly configured to selectively apply an axial force on the first valve rotor to urge the first valve rotor toward the plurality of apertures formed in the valve housing body so as to engage the first seal member of the first sealing system into engagement with a bottom surface of the valve housing body when the first valve rotor is in one of the different predetermined positions to improve sealing between the first valve rotor and the valve housing body, and further showing the second sealing system includes a second seal member and a second biasing assembly having a bias spring and a spring cover configured to be assembled over the second valve rotor shaft to apply an axial force on the second valve rotor to urge the second valve rotor toward the plurality of apertures formed in the valve housing body when the second valve rotor is in one of the plurality of different predetermined positions to increase sealing between the second valve rotor and the valve housing body;

FIG. 9B is a detail view of FIG. 9A showing the first seal member located axially between the first valve rotor body and the first valve cover extends through one of the first rotor through holes and engages the valve housing body to provide the seal between the main valve rotor and the valve housing body so that leaks between the main valve rotor and the valve housing body are reduced as fluid flows through the first rotor though hole, through the aperture in the valve housing body of the valve housing, and into the manifold;

FIG. 10 is an exploded view of the main valve rotor included in the valve flow controller of the multi-way valve of FIG. 8 showing the main valve rotor includes the main valve rotor body that extends circumferentially about the first rotor axis, a main valve rotor shaft that extends axially away from the main valve rotor body along the first rotor axis, and the main valve rotor cover configured to be coupled to the main valve rotor body so that a plurality of chambers formed in the main valve rotor cover extend around adjacent through holes in the main valve rotor body so as to interconnect the adjacent through holes in fluid communication with each other when the valve rotor cover is coupled to the main valve rotor body, and further showing the main valve rotor body has lock tabs that engage the main valve rotor cover to block axial movement of the main valve rotor cover and the first seal member relative to the main valve rotor body once the main valve rotor cover is located in an engaged position on the main valve rotor body as shown in FIG. 8;

FIG. 11 is an exploded view of the throttle valve rotor included in the valve flow controller of the multi-way valve of FIG. 8 showing the throttle valve rotor includes a throttle valve rotor plate that extends circumferentially about the second rotor axis and is shaped to define the throttle rotor through holes, a throttle valve rotor wall that extends circumferentially around an outer edge of the throttle valve rotor plate and axially away from the throttle valve rotor plate, and a throttle valve rotor shaft that extends away from the throttle valve rotor plate along the second rotor axis in the same direction as the throttle valve rotor wall, and further showing the second biasing assembly of the second sealing system includes a bias spring and a spring cover configured to be assembled over the throttle valve rotor shaft;

FIG. 12 is a cross-section view of the throttle valve rotor with the assembled second biasing assembly of FIG. 7 showing the bias spring is arranged around the throttle valve rotor shaft of the throttle valve rotor so as to apply the axial force on the throttle valve rotor to urge the throttle valve rotor body toward a seal fixed to the valve housing body, and further showing the spring cover extends around the bias spring and couples to the throttle valve rotor for rotation therewith so that the bias spring is located between the spring cover and the throttle valve rotor;

FIG. 13 is a perspective view of the valve housing body included in the valve housing of the multi-way valve of FIG. 8 showing the valve housing body is formed to define the plurality of apertures spaced apart circumferentially about the first valve axis that align with the plurality of main rotor through holes when the main valve rotor is in the different predetermined positions to allow the flow of fluid therethrough;

FIG. 14 is a diagrammatic view of the thermal management system of FIG. 2 showing the multi-way valve controls the flow of coolant fluid through the different thermal fluid circuits by using the throttle valve rotor to vary the flow of coolant fluid into the multi-way valve from the drive pump and using the main valve rotor to switch the connections to the radiator and the chiller and heater for the battery;

FIG. 15 is a table showing the different modes of the multi-way valve of FIG. 9 and the different flow paths created at each of the different modes A-G;

FIG. 15A is a diagrammatic view of the thermal management system in a system cooling mode or mode A as shown in FIG. 15 in which the main valve rotor is in a MAIN VALVE ROTOR FIRST position;

FIG. 15B is a diagrammatic view of the thermal management system in a system heating mode or mode B as shown in FIG. 15 in which the main valve rotor moves to a MAIN VALVE ROTOR SECOND position;

FIG. 15C is a diagrammatic view of the thermal management system in a battery conditioning mode or mode C as shown in FIG. 15 in which the main valve rotor moves to a MAIN VALVE ROTOR THIRD position;

FIG. 15D is a diagrammatic view of the thermal management system in a system cooling mode or mode C as shown in FIG. 15 in which the main valve rotor moves to a MAIN VALVE ROTOR FOURTH position;

Figures 16A, 16B, 16C:
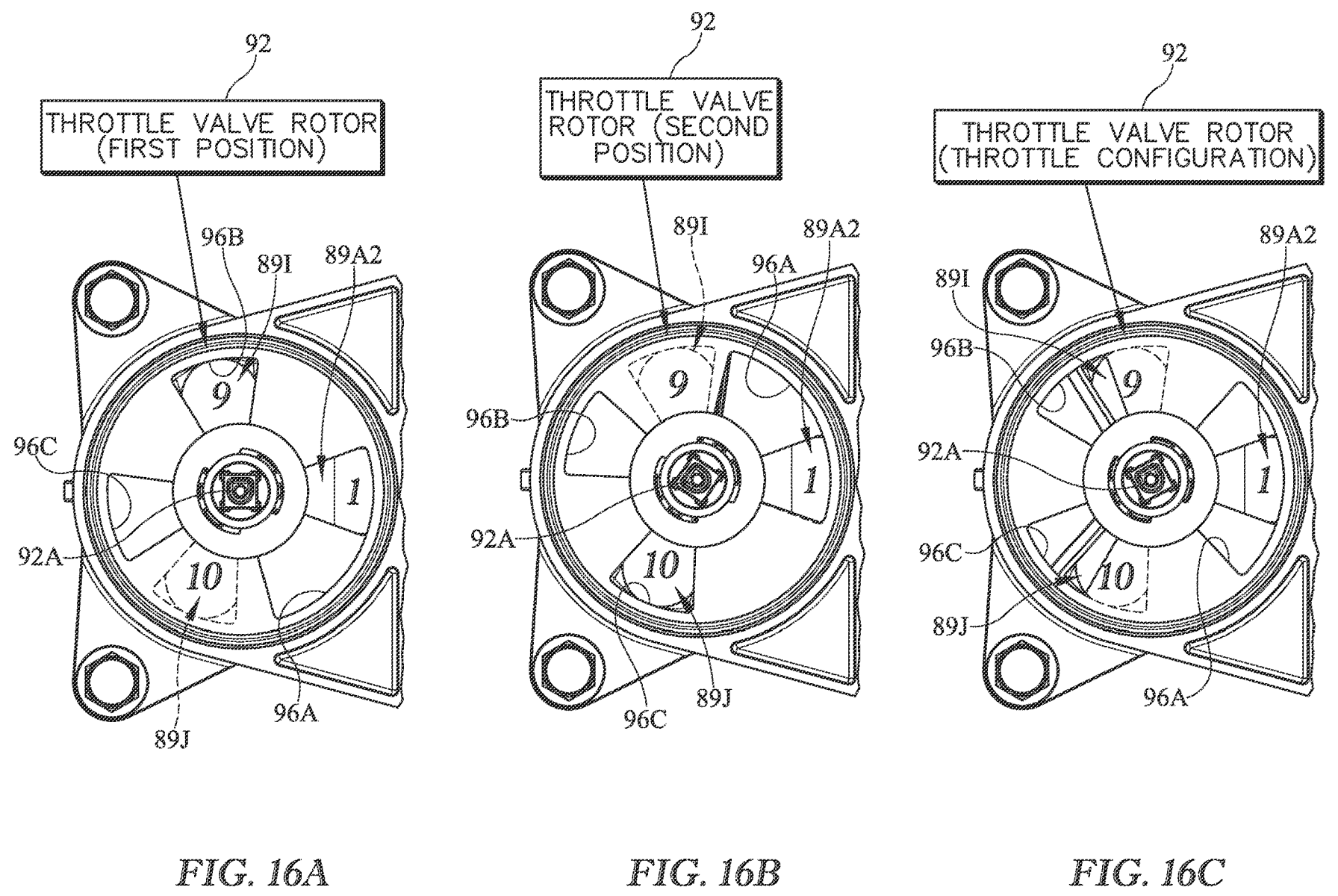

FIG. 16 is a graph showing the opening area of each of the apertures in the valve housing body that open into the second valve cavity as the throttle or proportional valve rotor rotates between the different predetermined positions as shown in FIGS. 16A-C during any one of the modes A-D;

FIG. 16A is a top view of the multi-way valve in which the throttle valve rotor is in a THROTTLE VALVE ROTOR FIRST position;

FIG. 16B is a top view of the multi-way valve in which the throttle valve rotor is in a THROTTLE VALVE ROTOR SECOND position;

FIG. 16C is a top view of the multi-way valve in which the throttle valve rotor is in a THROTTLE configuration;

FIG. 17A is a top view of the multi-way valve when the thermal management system is in mode A showing the main valve rotor in the MAIN VALVE ROTOR FIRST position;

FIG. 17B is a top view of the multi-way valve when the thermal management system is in mode B showing the main valve rotor in the MAIN VALVE ROTOR SECOND position;

FIG. 17C is a top view of the multi-way valve when the thermal management system is in mode C showing the main valve rotor in the MAIN VALVE ROTOR THIRD position;

FIG. 17D is a top view of the multi-way valve when the thermal management system is in mode D showing the main valve rotor in the MAIN VALVE ROTOR FOURTH position; and FIG. 17E is a top view of the multi-way valve when the thermal management system is in mode D showing the main valve rotor may be in a MAIN VALVE ROTOR FIFTH position to achieve the same flow paths to the different circuits as when the main valve rotor is in the MAIN VALVE ROTOR FOURTH position.

DETAILED DESCRIPTION

An illustrative integrated coolant controller 30 is shown in FIGS. 1-5. The integrated coolant controller 30 is adapted for use in a thermal management system 20 as shown in FIG. 2, to control the heating and/or cooling to various components in a vehicle 10.

The integrated coolant controller 30 includes a coolant tank 32, pumps 34. 36, a multi-way valve 38, and a manifold 40 as shown in FIGS. 1-9. The coolant tank 32 is formed to define a coolant reservoir 32R configured to store a coolant fluid. The pumps 34, 36 are configured to pump the coolant fluid through the different fluid circuits of the thermal management system 20 to transfer heat to/from different components on the vehicle 10. The multi-way valve 38 is configured to control the flow of coolant fluid to the different thermal fluid circuits of the thermal management system 20. The manifold 40 is coupled to each of the coolant tank 32, the pumps 34, 36, and the multi-way valve 38 to integrate the components 32, 34, 36, 38 thereby eliminating unnecessary piping or hosing between the coolant tank 32, the pumps 34, 36, and the multi-way valve 38 and reducing the amount of power used by the pumps 34, 36 to supply the coolant fluid through the system 20.

The thermal management system 20 is shown in FIGS. 2, 5, 14, and 15A-D. The thermal management system 20 further includes a plurality of fluid circuits 22, 24, 26 that all flow through the manifold 40 of the integrated coolant controller 30. The integrated coolant controller 30 controls the flow of coolant fluid through the different fluid circuits 22, 24, 26.

Other thermal management systems may include multiple thermal fluid circuits that have different valves and hosing to carry the flow of coolant fluid to the various components. However, there is a need to reduce the large lengths of hose and various connections thereby reducing the flow restrictions and power needed to move the coolant fluid through the thermal management system.

The manifold 40 of the integrated coolant controller 30 integrates the components 32, 34, 36, 38 thereby eliminating unnecessary piping or hosing between the coolant tank 32, the pumps 34, 36, and the multi-way valve 38 and reducing the amount of power used by the pumps 34, 36 to supply the coolant fluid through the system 20. Each of the components 32, 34, 36, 38 is mounted directly the manifold 40 so that inlet/outlet ports on each of the components 32, 34, 36, 38 align with corresponding ports/apertures on the manifold 40. This eliminates any unnecessary piping or hosing there between.

The manifold 40 includes a manifold body 42 and a plurality of pipes 44, 46, 48, 50, 52, 54, 56 that extend from the manifold body 42 as shown in FIGS. 3-7. The manifold body 42 is shaped to form a plurality of fluid cavities 58A-L. Each of the pipes 44, 46, 48, 50, 52, 54, 56 defines a passageway 44P, 46P, 48P, 50P, 52P, 54P, 56P that is in fluid communication with one of the fluid cavities 58A, 58B, 58C, 58DE, 58F, 58G defined by the manifold body 42 to conduit coolant fluid therethrough.

Different fluid cavities 58A-L of the manifold 40 are in fluid communication with inlets/outlets of the components 32, 34, 36, 38 once the components 32, 34, 36, 38 are mounted to the manifold 40. The flow of coolant fluid is conducted through the different fluid cavities 58A-L to the different fluid circuits 22, 24, 26.

The thermal management system 20 includes a plurality of fluid circuits 22, 24, 26 as shown in FIGS. 2-4. The different fluid circuits 22, 24, 26 are adapted to conduct the coolant fluid to different components of the vehicle 10 to transfer heat to/from the components of the vehicle 10 to control the temperature of components. In the illustrative embodiments, the thermal management system 20 includes a main fluid circuit 22, a radiator fluid circuit 24, and a battery fluid circuit 26 as shown in FIGS. 2, 5, 14, and 15A-D. The different fluid circuits 22, 24, 26 all flow through the manifold 40 of the integrated coolant controller 30.

In the illustrative embodiments, the thermal management system 20 includes a main fluid circuit 22 and subsequent fluid circuits 24, 26 as shown in FIGS. 2-4. The main fluid circuit 22 includes a main-circuit conduit 22C configured to conduct coolant fluid therethrough. The subsequent fluid circuits 24, 26 each include a conduit 24C, 26C that is configured to conduct the coolant fluid therethrough.

In some embodiments, the thermal management system 20 may only include two fluid circuits. In some embodiments, the thermal management system 20 may include more than three circuits. The number of circuits may depend on the different components on the vehicle 10 and the heating/cooling needs to those components.

One of the subsequent fluid circuits 24, or sometimes referred to as a radiator fluid circuit 24, includes a radiator-circuit conduit 24C configured to conduct the coolant fluid therethrough and the other subsequent fluid circuit 26, or sometimes referred to as a battery fluid circuit 26, includes a battery-circuit conduit 26C configured to conduct the coolant fluid therethrough in the illustrative embodiment. In some embodiments, the thermal management system 20 may include more than two subsequent fluid circuits. In some embodiments, the thermal management system 20 may include fewer subsequent fluid circuits.

In the illustrative embodiments, the main-circuit conduit 22C is adapted to be in thermal communication with front and rear drives 12F, 12R included in the vehicle 10 to transfer heat between the front and rear drives 12F, 12R and the coolant fluid. The radiator-circuit conduit 24C is adapted to be in thermal communication with a radiator 14 included in the vehicle 10 to transfer heat between the radiator 14 and the coolant fluid. The battery-circuit conduit 26C is adapted to be in thermal communication with batteries 16 and a heat exchanger 18 or a chiller/heater 18 included in the vehicle 10. The battery-circuit conduit 26C is adapted to be in thermal communication with the battery or batteries 16 to transfer heat between the batteries 16 and the coolant fluid. The battery-circuit conduit 26C is adapted to be in thermal communication with the chiller/heater 18 to transfer heat between the coolant fluid and a fluid in the chiller/heater 18.

The manifold 40 includes the manifold body 42 and the plurality of pipes 44, 46, 48, 50, 52, 54, 56 as shown in FIGS. 3-7. The manifold body 42 is shaped to define the plurality of fluid cavities 58A-L. The number of pipes 44, 46, 48, 50, 52, 54, 56 may vary based on the number of fluid cavities 58A-L defined by the manifold body 42 and vice versa. The number of pipes 44, 46, 48, 50, 52, 54, 56 may also vary based on the number of fluid circuits 22, 24, 26 of the thermal management system 20.

Figure 5:
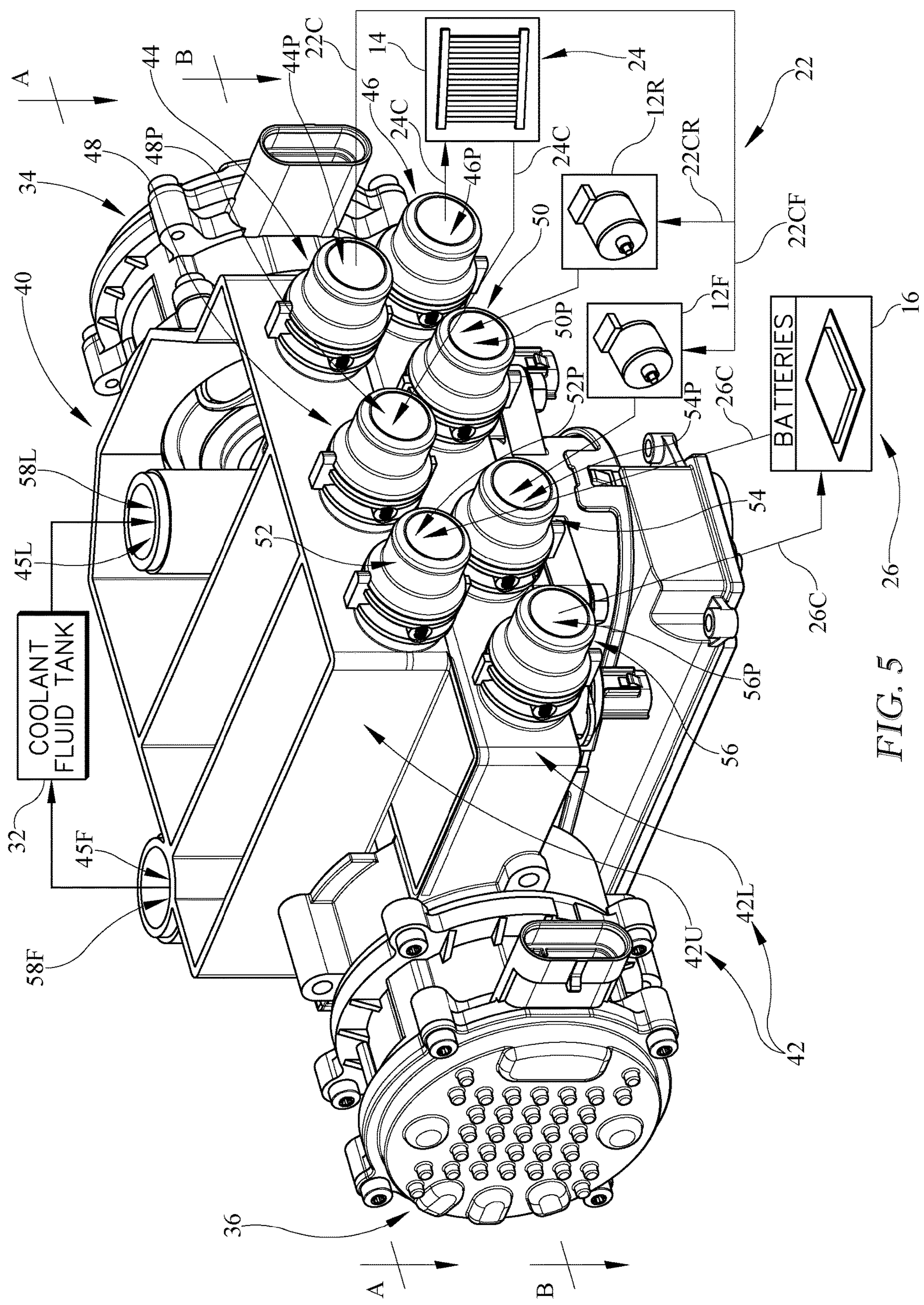
FIG. 5A is a cross-section view of the integrated coolant controller of FIG. 5 taken along line A-A showing the fluid cavities that are defined by an upper body section of the manifold body and showing which fluid circuit is in fluid communication with the corresponding fluid cavity.
FIG. 5B is a cross-section view of the integrated coolant controller of FIG. 5 taken along line B-B showing the fluid cavities that are defined by a lower body section of the manifold body and showing which fluid circuit is in fluid communication with the corresponding fluid cavity.
Figure 5A:
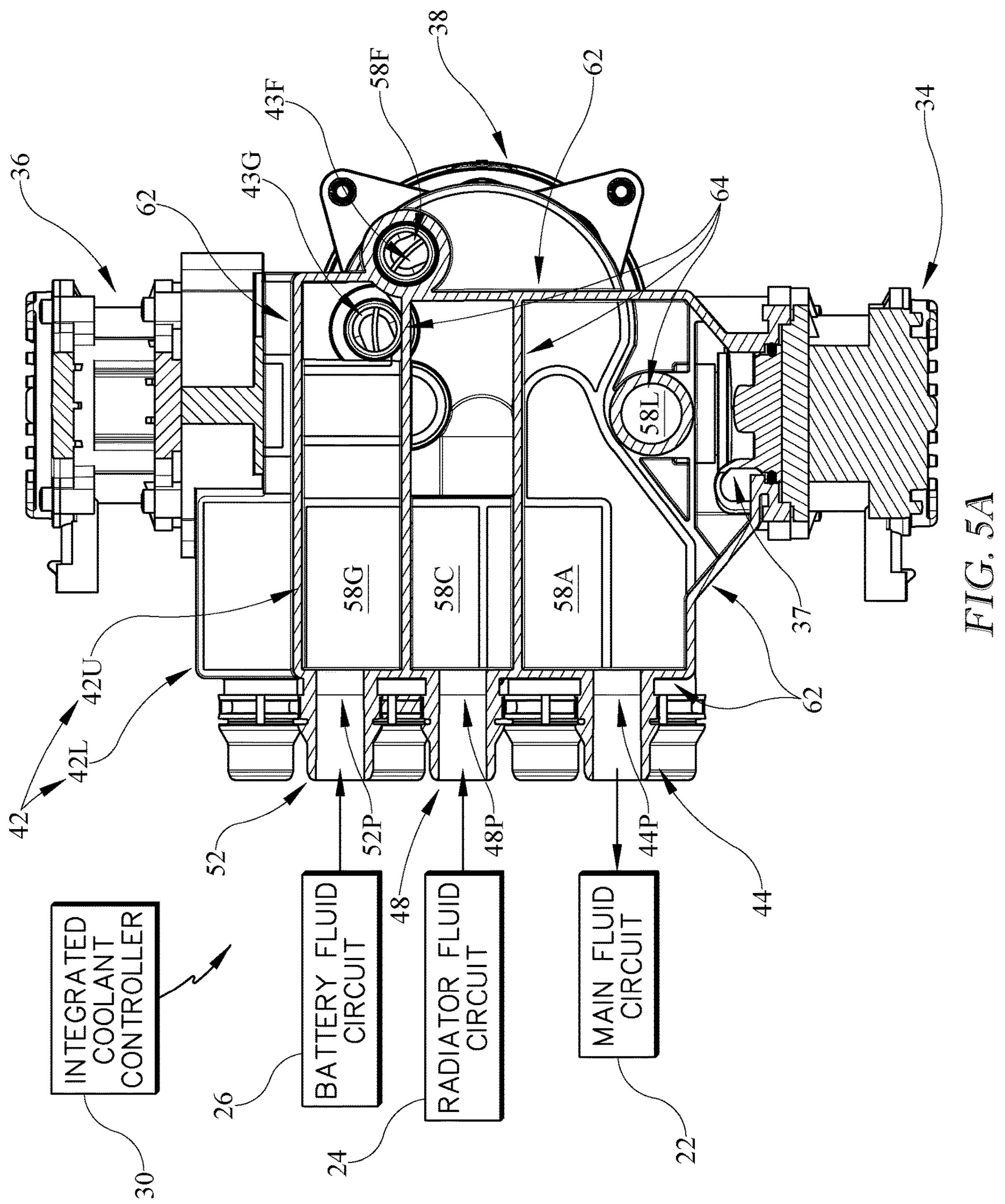
Figure 5B:
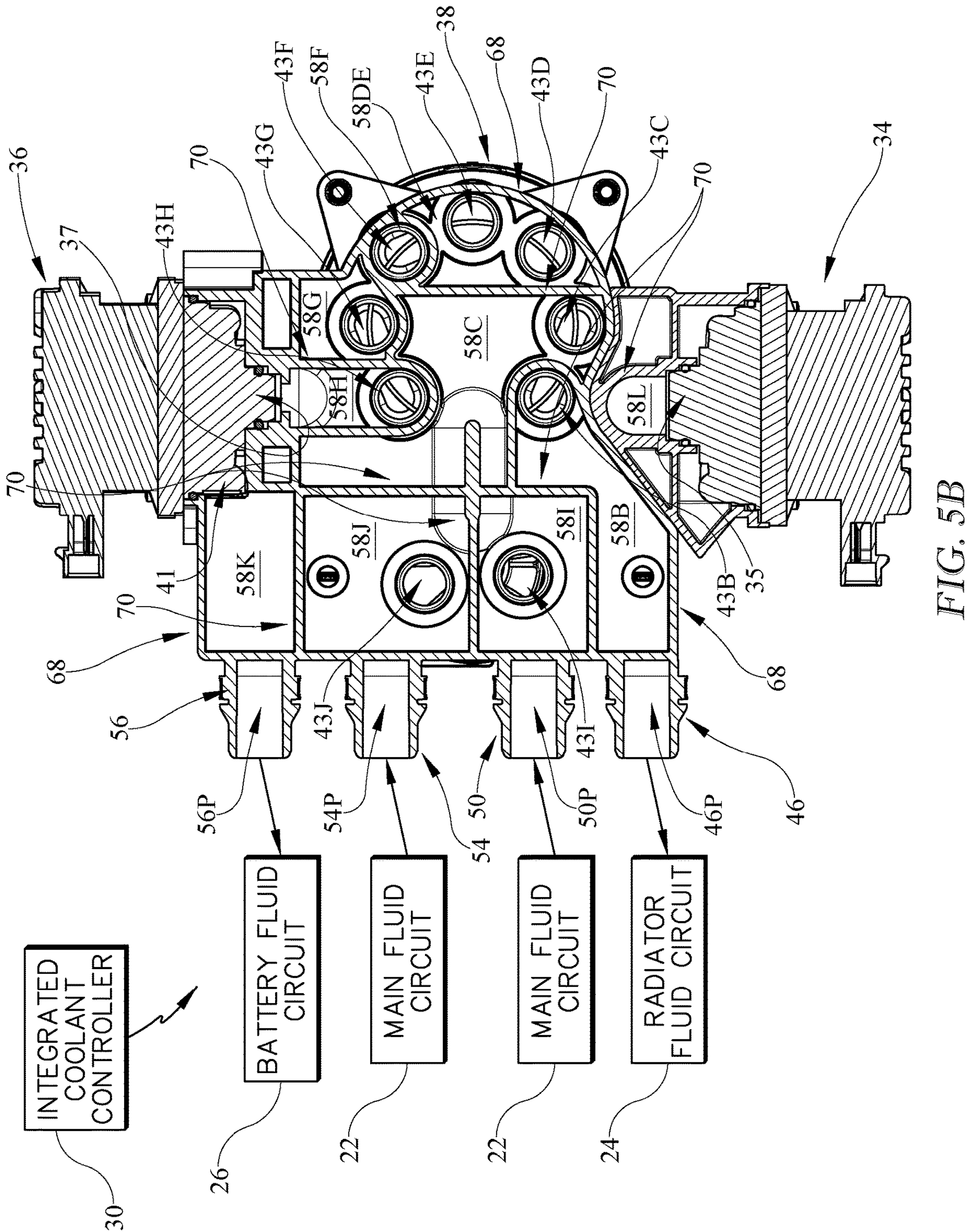

In the illustrative embodiments, the manifold body 42 is shaped to define a first fluid cavity 58A, a second fluid cavity 58B, a third fluid cavity 58C, a fourth fluid cavity 58DE, a fifth fluid cavity 58F, a sixth fluid cavity 58G, a seventh fluid cavity 58H, an eighth fluid cavity 58I, a ninth fluid cavity 58J, a tenth fluid cavity 58K, and a eleventh fluid cavity 58L as shown in FIGS. 5-7. The different fluid cavities 58A-L are configured to conduct the flow of coolant fluid therethrough.

In the illustrative embodiments, the plurality of pipes 44, 46, 48, 50, 52, 54, 56 includes a first pipe 44, a second pipe 46, a third pipe 48, a fourth pipe 50, a fifth pipe 52, a sixth pipe 54, and a seventh pipe 56 as shown in FIGS. 3-7. In the illustrative embodiments, the first pipe 44 is connected to an inlet of the main-circuit conduit 22C, the second pipe 46 is connected to an outlet of the radiator-circuit conduit 24C, the third pipe 48 is connected to an inlet of the radiator-circuit conduit 24C, the fourth pipe 50 is connected to one of the outlets of the main-circuit conduit 22C, the fifth pipe 52 is connected to an outlet of the battery-circuit conduit 26C, the sixth pipe 54 is connected to the other outlet of the main-circuit conduit 22C, the seventh pipe 56 is connected to an inlet of the battery-circuit conduit 26C as shown in FIG. 7.

In the illustrative embodiments, the first passageway 44P of the first pipe 44 is connected in fluid communication with the main-circuit conduit 22C, the second passageway 46P of the second pipe 46 is connected in fluid communication with the radiator-circuit conduit 24C, the third passageway 48P of the third pipe 48 is connected in fluid communication with the radiator-circuit conduit 24C, the fourth passageway 50P of the fourth pipe 50 is connected in fluid communication with the main-circuit conduit 22C, the fifth passageway 52P of the fifth pipe 52 is connected in fluid communication with the battery-circuit conduit 26C, the sixth passageway 54P of the sixth pipe 54 is connected in fluid communication with the main-circuit conduit 22C, and the seventh passageway 56P of the seventh pipe 56 is connected in fluid communication with the battery-circuit conduit 26C as shown in FIGS. 5-7.

In the illustrative embodiments, the first passageway 44P of the first pipe 44 is in fluid communication with the first fluid cavity 58A of the manifold body 42, the second passageway 46P of the second pipe 46 is in fluid communication with the second fluid cavity 58B of the manifold body 42, the third passageway 48P of the third pipe 48 is in fluid communication with the third fluid cavity 58C of the manifold body 42, the fourth passageway 50P of the fourth pipe 50 is in fluid communication with the eighth fluid cavity 58I of the manifold body 42, the fifth passageway 52P of the fifth pipe 52 is in fluid communication with the sixth fluid cavity 58G of the manifold body 42, the sixth passageway 54P of the sixth pipe 54 is in fluid communication with the ninth fluid cavity 58J of the manifold body 42, and the seventh passageway 56P of the seventh pipe 56 is in fluid communication with the a tenth fluid cavity 58K of the manifold body 42 as shown in FIGS. 5-7.

The manifold body 42 of the manifold 40 includes a tank dock 72, a first pump dock 74, a second pump dock 76, and a valve dock 78 as shown in FIGS. 3-7. The tank dock 72 is configured to receive the coolant tank 32 to mount the coolant tank 32 on the manifold 40. The first pump dock 74 is configured to receive the first pump 34 to mount the first pump 34 on the manifold 40. The second pump dock 76 is configured to receive the second pump 36 to mount the second pump 36 on the manifold 40. The valve dock 78 is configured to receive the multi-way valve 38 to mount the multi-way valve 38 on the manifold 40.

Each of the components 32, 34, 36, 38 may be welded to the corresponding dock 72, 74, 76, 78 in some embodiments. In other embodiments, the components 32, 34, 36, 38 may be bolted or fastened to the corresponding dock 72, 74, 76, 78 of the manifold 40. In other embodiments, another method of attachment may be used.

In the illustrative embodiments, the manifold body 42 further includes temperature sensor docks 69A, 69B as shown in FIGS. 3 and 6. The temperature sensor docks 69A, 69B are configured to receive temperature sensors 17 to mount the temperature sensors 17A, 17B in fluid communication with the corresponding fluid cavities 58I, 58J. The temperature sensors 17A, 17B are configured to measure the temperature of the coolant fluid flowing back to the manifold 40 from the main fluid circuit 22 as shown in FIGS. 15A-D.

In the illustrative embodiments, the coolant tank 32 also includes a temperature sensor dock 69C as shown in FIG. 3. In some embodiments, the manifold 40 may include the temperature sensor dock 69C that receives another temperature sensor 17C configured to measure the temperature of the coolant fluid in the coolant tank 32.

The tank dock 72 is configured to receive the coolant tank 32 to mount the coolant tank 32 on the manifold 40 so that inlet and outlet ports 32A, 32B formed in the coolant tank 32 align with tank ports 45F, 45L formed in the manifold 40 as shown in FIGS. 4, 5, and 7. The tank ports 45F, 45L open to corresponding fluid cavities 58F, 58L. The coolant tank 32 is coupled to the manifold 40 on the tank dock 72 so that the inlet port 32A formed in the coolant tank 32 is aligned with the fifth fluid cavity 58F and the outlet port 32B formed in the coolant tank 32 is aligned with the eleventh fluid cavity 58L.

In the illustrative embodiments, the tank dock 72 receives the coolant tank 32 to mount the coolant tank 32 on the manifold 40 so that a lower or bottom wall 32S of the coolant tank 32 closes top openings of the manifold 40. In the illustrative embodiments, the coolant tank 32 is formed to include a lip 32L that extends from the bottom wall 32S of the coolant tank 32 and is shaped to match the upper body section 42U so that the coolant tank 32 fits perfectly with the manifold body 42. In other embodiments, the manifold 40 is not open at the tank dock 72 or rather has an upper wall that defines a portion of the tank dock 72.

In the illustrative embodiments, the coolant tank 32 is welded to the tank dock 72 of the manifold 40. The coolant tank 32 is welded to the tank dock 72 of the manifold 40 along the lip 32L to fix the coolant tank 32 to the manifold 40. In some embodiments, the coolant tank 32 may be integrally formed with the manifold 40 instead of being welded to the manifold 40.

The first pump dock 74 is configured to receive the first pump 34 to mount the first pump 34 on the manifold 40 so that an inlet 35 of the first pump 34 is connected in fluid communication with the coolant reservoir 32R of the coolant tank 32 and an outlet 39 of the first pump 34 is connected in fluid communication with the main fluid circuit 22 through the first fluid cavity 58A as shown in FIGS. 3-7. The first pump dock 74 is a molded shape that defines a receiving space 74R into which the first pump 34 fits neatly into. In the illustrative embodiments, the first pump 34 is mounted to the manifold 40 in the first pump dock 74 so that the inlet 35 of the first pump 34 is in fluid communication with the eleventh fluid cavity 58L, which is in fluid communication with the coolant reservoir 32R through the outlet port 32B, and the outlet 39 of the first pump 34 is in fluid communication with the first fluid cavity 58A, which is in fluid communication with the first passageway 44P.

In this way, the first pump 34 draws a flow of coolant fluid from the coolant tank 32 through the eleventh fluid cavity 58L and conducts the flow of coolant fluid into the first fluid cavity 58A and out through the first passageway 44P to the main fluid circuit 22. The flow of coolant fluid flows through the main-circuit conduit 22C to transfer heat from the different components 12F, 12R, 13, 15 before flowing back to the manifold 40.

In some embodiments, the integrated coolant controller 30 only includes a single pump 34, 36. The single pump 34, 36 may be configured to pump the coolant fluid through all of the fluid circuits 22, 24, 26. In the illustrative embodiments, the integrated coolant controller 30 includes two pumps 34, 36. In some embodiments, the integrated coolant controller 30 may include more than two pumps 34, 36.

The second pump dock 76 is configured to receive the second pump 36 to mount the second pump 36 on the manifold 40 so that an inlet 37 of the second pump 36 is connected in fluid communication with the seventh fluid cavity 58H of the manifold 40 and an outlet 41 of the second pump 36 is connected in fluid communication with the battery fluid circuit 26 through the tenth fluid cavity 58K as shown in FIGS. 3-7. The second pump dock 76 defines a receiving space 76R into which the second pump 36 extends. In the illustrative embodiments, the second pump 36 is mounted to the manifold 40 in the second pump dock 76 so that the inlet 37 of the second pump 36 is in fluid communication with the seventh fluid cavity 58H, which is in fluid communication with an aperture of the multi-way valve 38, and the outlet 41 of the second pump 36 is in fluid communication with the sixth fluid cavity 58G, which is in fluid communication with the seventh passageway 56P.

In this way, the second pump 36 draws a flow of coolant fluid flowing from the multi-way valve 38 into the seventh fluid cavity 32H and conducts the flow of coolant fluid into the sixth fluid cavity 58G and out through the seventh passageway 56P to the battery fluid circuit 26. The flow of coolant fluid flows through the battery-circuit conduit 26C to transfer heat between the batteries 16 and the coolant fluid before flowing back to the manifold 40.

The valve dock 78 is configured to receive the multi-way valve 38 to mount the multi-way valve 38 on the manifold 40 so that a plurality of apertures 89B, 89C, 89D, 89E, 89F, 89G, 89H, 89I, 89J included in the multi-way valve 38 align with valve ports 43B, 43C, 43D, 43E, 43F, 43H, 43I, 43K1, 43K2 formed in the manifold 40 as shown in FIGS. 3 and 6. The valve ports 43B, 43C, 43D, 43E, 43F, 43G, 43H, 43I, 43J open to corresponding fluid cavities 58B, 58C, 58DE, 58F, 58G, 58H, 58I, 58J.

In the illustrative embodiments, the plurality of apertures 89B, 89C, 89D, 89E, 89F, 89G, 89H, 89I, 89J are defined by the valve housing 80 of the multi-way valve 38. In the illustrative embodiments, the valve housing 80 has valve housing pipes 80P that extend from the valve housing 80 and are configured to fit into the respective valve ports 43B, 43C, 43D, 43E, 43F, 43G, 43H, 43I, 43J when the multi-way valve 38 is mounted on the valve dock 78.

In the illustrative embodiments, a plurlatiy of O-ring seals may be included to seal between the multi-way valve 38 and the valve dock 78 of the manifold 40 as shown in FIG. 9A. Each seal may extend around one of the valve housing pipes 80P so that the corresponding seal is located between the valve housing 80 and the manifold 40.

In the illustrative embodiments, the manifold body 42 is made up of two separate body sections 42U, 42L that are coupled together. The manifold body 42 has an upper body section 42U, also referred to as a first body section 42U, and a lower body section 42L, also referred to as a second body section 42L, that is separate from the upper body section 42U and coupled to the upper body section 42U. The first, third, and fifth pipes 44, 48, 52 extend from the upper body section 42U of the manifold body 42, while the second, fourth, sixth, and seventh pipes 46, 50, 54, 56 extend from the lower body section 42L of the manifold body 42. In the illustrative embodiments, the upper body section 42U of the manifold defines the tank dock 72 and the first pump dock 74 and the lower body section 42L of the manifold 40 defines the second pump dock 76 and the valve dock 78 as shown in FIGS. 3-7.

In the illustrative embodiments, the upper and lower body sections 42U, 42L cooperate with each other to define the different fluid cavities 58A-L. The upper body section 42U is shaped to define the first fluid cavity 58A, a portion of the third fluid cavity 58C, a portion of the fifth fluid cavity 58F, a portion of the sixth fluid cavity 58G, and a portion of the eleventh fluid cavity 58L in the illustrative embodiment. The lower body section 42L is shaped to define the second fluid cavity 58B, a portion of the third fluid cavity 58C, the fourth fluid cavity 58DE, a portion of the fifth fluid cavity 58F, a portion of the sixth fluid cavity 58G, the seventh fluid cavity 58H, the eighth fluid cavity I, the ninth fluid cavity 58J, and the tenth fluid cavity 58K in the illustrative embodiment.

The upper body section 42U includes a upper wall 60, side walls 62, a plurality of divider walls 64 that extend between the upper wall 60 and the side walls 62 to define the different fluid cavities 58A, 58C, 58G, 58F, 58L therebetween, the tank dock 72, and the first pump dock 74 as shown in FIGS. 3-7. The number and shape of flow divider walls 64 depends on the number of fluid cavities 58A-L and may be tuned depending on the system.

The lower body section 42U includes a lower wall 66, side walls 68, and a plurality of divider walls 70 that extend between the lower wall 66 and the side walls 68 to define the different fluid cavities 58B, 58C, 58DE, 58F, 58G, 58H, 58I, 58J, 58K therebetween, the second pump dock 76, and the valve dock 78 as shown in FIGS. 3-7. The number and shape of flow divider walls 70 depends on the number of fluid cavities 58A-L and may be tuned depending on the system.

In the illustrative embodiments, the upper body section 42U is coupled to the lower body section 42L to close off top openings to the fluid cavities 58B, 58DE, 58H, 58I, 58J, 58K. The coolant tank 32 is coupled to the upper body section 42U to close off top openings to the fluid cavities 58A, 58C, 58G in the illustrative embodiment. In some embodiments, the upper body section 42U may be formed integrally with the lower body section 42L.

In some embodiments, the upper body section 42U may be integrally formed with the coolant tank 32 such that upper body section 42U and the coolant tank 32 are a single-piece component. In some embodiments, the upper body section 42U, the lower body section 42L, and the coolant tank 32 may be a single-piece component. The manifold 40 may be a single-piece component made of molded or extruded plastic material.

The multi-way valve 38 is shown in FIGS. 8-13. The multi-way valve 38 may be like the multi-way valve like as described in U.S. Application Ser. No. 63/454,447, filed Mar. 24, 2023, titled "MULTI-WAY VALVE" and U.S. Application Ser. No. 63/414,205, filed Oct. 7, 2022, titled "MULTI-WAY VALVE," which are hereby incorporated herein by reference in its entirety for its disclosure relative to the multi-way valve.

In the illustrative embodiments, multi-way valve 38 includes a valve housing 80 and a valve flow controller 82 as shown in FIGS. 8-13. The valve flow controller 82 is arranged in the valve housing 80 to control flow through the valve housing 80.

The valve housing 80 includes a valve housing body 84 and an upper valve housing cover 85 as shown in FIGS. 8 and 9. The valve housing body 84 is formed to define a first valve cavity 86, a second valve cavity 88, and a plurality of apertures 89A1, 89A2, 89B, 89C, 89D, 89E, 89F, 89G, 89H, 89I, 89J in fluid communication with at least one of the first valve cavity 86 and the second valve cavity 88. The valve housing body 84 is coupled to the valve dock 78 of the manifold 40 so that certain apertures 89B, 89C, 89D, 89E, 89F, 89H, 89I, 89J align with valve ports 43B, 43C, 43D, 43E, 43F, 43H, 43I, 43K1, 43K2 in the manifold 40 to connect the multi-way valve 38 in fluid communication with the different valve cavities 58B, 58C, 58DE, 58F, 58H, 58I, 58K. The upper valve housing cover 85 is coupled to the valve housing body 84 to close top openings of the first and second valve cavities 86, 88.

The valve housing body 84 is formed to include a plurality of housing apertures 89A1, 89A2, 89B, 89C, 89D, 89E, 89F, 89G, 89H, 89I, 89J as shown in FIGS. 4, 13, and 17A-D. The plurality of housing apertures 89B, 89C, 89D, 89E, 89F, 89G, 89H, 89I, 89J are in fluid communication with the different fluid circuits 22, 24, 26. The plurality of housing apertures 89A1, 89A2, 89B, 89C, 89D, 89E, 89F, 89G, 89H, 89I, 89J are in fluid communication with at least one of the first valve cavity 86 and the second valve cavity 88 of the valve housing body 84. In the illustrative embodiments, the apertures 89B, 89C, 89D, 89E, 89F, 89G, 89H are in fluid communication with the first valve cavity 86 and the apertures 89I, 89J are in fluid communication with the second valve cavity 88. The apertures 89A1, 89A2 are in fluid communication with both the first and second valve cavities 86, 88 through a connecting passageway 89A defined by the valve housing 80.

In the illustrative embodiments, the housing aperture 89B is aligned with the valve port 43B which opens to the second fluid cavity 58B. The housing aperture 89B is aligned with the valve port 43B when the valve housing body 84 is coupled to the valve dock 78 of the manifold body 42.

In the illustrative embodiments, the housing aperture 89C is aligned with the valve port 43C which opens to the third fluid cavity 58C. The housing aperture 89C is aligned with the valve port 43C when the valve housing body 84 is coupled to the valve dock 78 of the manifold body 42.

In the illustrative embodiments, the housing aperture 89D is aligned with the valve port 43D and the housing aperture 89E is aligned with the valve port 43E. The valve ports 43D, 43E both open to the fourth fluid cavity 58DE. The housing aperture 89D is aligned with the valve port 43D and the housing aperture 89E is aligned with the valve port 43E when the valve housing body 84 is coupled to the valve dock 78 of the manifold body 42.

In the illustrative embodiments, the housing aperture 89F is aligned with the valve port 43F which opens to the fifth fluid cavity 58F. The housing aperture 89F is aligned with the valve port 43F when the valve housing body 84 is coupled to the valve dock 78 of the manifold body 42.

In the illustrative embodiments, the housing aperture 89G is aligned with the valve port 43G which opens to the sixth fluid cavity 58G. The housing aperture 89G is aligned with the valve port 43G when the valve housing body 84 is coupled to the valve dock 78 of the manifold body 42.

In the illustrative embodiments, the housing aperture 89H is aligned with the valve port 43H which opens to the seventh fluid cavity 58H. The housing aperture 89H is aligned with the valve port 43H when the valve housing body 84 is coupled to the valve dock 78 of the manifold body 42.

In the illustrative embodiments, the housing aperture 89I is aligned with the valve port 43I which opens to the eighth fluid cavity 58I. The housing aperture 89I is aligned with the valve port 43I when the valve housing body 84 is coupled to the valve dock 78 of the manifold body 42.

In the illustrative embodiments, the housing aperture 89J is aligned with the valve port 43J which opens to the ninth fluid cavity 58J. The housing aperture 89J is aligned with the valve port 43J when the valve housing body 84 is coupled to the valve dock 78 of the manifold body 42.

In the illustrative embodiments, the valve housing 80 further includes a plurality of valve housing pipes 80P as shown in FIGS. 8 and 9. Each of the valve housing pipes 80P extends axially from the valve housing body 84. Each pipe 80P defines one of the housing apertures 89B, 89C, 89D, 89E, 89F, 89G, 89H, 89I, 89J. When the multi-way valve 38 is coupled to the valve dock 78, Each pipe 80P extends into one of the valve ports 43B-J defined by the valve dock 78 of the manifold 40.

In the illustrative embodiments, the valve housing 80 includes a separate lower valve housing cover 87 that couples to the valve housing body 84 opposite the upper valve housing cover 85 to close off a bottom opening to form the connecting passageway 89A between the first and second valve cavities 86, 88 as shown in FIG. 8. The flow of coolant fluid is able to flow from the second valve cavity 88 through the aperture 89A2, through the connecting passageway 89A, and through the aperture 89A1 into the first valve cavity 86. In some embodiments, the valve housing body 84 defines the connecting passageway 89A.

In some embodiments, the manifold 40 may cooperates with the valve housing body 84 to form the connecting passageway 89A between the first and second valve cavities 86, 88. The manifold 40 cooperates with the valve housing body 84 to close off a bottom opening to form the connecting passageway 89A between the first and second valve cavities 86, 88 when the multi-way valve 38 is coupled to the valve dock 78 of the manifold body 42.

In some embodiments, the upper valve housing cover 85 and the lower valve housing cover 87 are each laser welded to the valve housing body 84. In some embodiments, the upper valve housing cover 85 and the lower valve housing cover 87 may be secured to the valve housing body 84 using another suitable method.

The valve flow controller 82 includes a first valve rotor 90 arranged in a first valve cavity 86—also referred to as the main rotor cavity 86—formed by the valve housing 80, a second valve rotor 92 arranged in a second valve cavity 88—also referred to as the throttle rotor cavity 88 —formed by the valve housing 80, and an actuator 93 as shown in FIGS. 8-12. The first valve rotor 90 is configured to rotate relative to the valve housing 80 about a first rotor axis 90A and the second valve rotor 92 is configured to rotate relative to the valve housing 80 about a second rotor axis 92A. The second rotor axis 92A is parallel to the first rotor axis 90A. The actuator 93 is coupled to the first and second valve rotors 90, 92 to drive rotation of the first and second valve rotors 90, 92 about the respective rotor axes 90A, 92A.

The first and second valve rotors 90, 92 cooperate to define a plurality of flow paths through the valve housing 80 to change between the different fluid circuits 22, 24, 26. As the first and second valve rotors 90, 92 are rotated about the respective rotor axes 90A, 92A to different set positions, the first and second valve rotors 90, 92 form different flow paths to control a flow of fluid through the valve housing 80 to the different fluid circuits 22, 24, 26.

The different modes A-D of the thermal management system 20 are shown in FIGS. 14, 15, and 15A-D. The first and second valve rotors 90, 92 are in different predetermined positions in each of the different modes A-D to form the different flow paths through the valve housing 80 as shown in FIGS. 15A-D and 17A-D, which changes the flow paths through the manifold 40. The multi-way valve 38 and/or the actuator(s) 93 may include a control unit that is preprogrammed with the different modes A-D.

The actuator 93 may be coupled to the controller 15 or have its own controller in the illustrative embodiment. The temperature sensors 17A, 17B, 17C are coupled to the controller 15 to send temperature measurement data to the controller 15. The controller 15 uses the temperature sensor data to determine which mode the thermal management system 20 should be in and to control the multi-way valve 38 to switch between the different modes based on the temperature sensor data. The controller 15 may also use other data to control the thermal management system 20.

The first valve rotor 90 is formed to include a plurality of first rotor through holes 94A-H and the second valve rotor 92 is formed to include a plurality of second rotor through holes 96A-C as shown in FIGS. 9 and 17A-D. The first rotor through holes 94—also referred to as the main valve rotor through holes—each extend axially through the first valve rotor 90 relative to the first rotor axis 90A and are spaced apart circumferentially around the first rotor axis 90A. The second rotor through holes 96A-C—also referred to as the throttle valve rotor through holes—each extend axially through the second valve rotor 92 relative to the second rotor axis 92A and are spaced apart circumferentially around the second rotor axis 92A.

The main valve rotor 90 includes a main valve rotor body 90B, a main valve rotor shaft 90S, and a main valve rotor cover 90C as shown in FIGS. 9-10. The main valve rotor body 90B extends circumferentially about the first rotor axis 90A. The main valve rotor shaft 90S extends axially away from the main valve rotor body 90B along the first rotor axis 90A and couples to the actuator 93. In the illustrative embodiments, the valve housing body 84 defines a first rod 84A that extends axially from the bottom surface 84S of the valve housing body 84 into the main valve rotor shaft 90S to position and center the main valve rotor 90 in the first valve cavity 86. The main valve rotor cover 90C is coupled to the main valve rotor body 90B for rotation therewith.

The main valve rotor body 90B is shaped to include the plurality of main rotor through holes 94A-H and the main valve rotor cover 90C is shaped to define a plurality of chambers 95A-C and a plurality of cover through holes 97A, 97B as shown in FIGS. 8-10 and 17A-D. The cover chambers 95A-C each extend around adjacent through holes 94A-H in the main valve rotor body 90B when the main valve rotor cover 90C is coupled to the main valve rotor body 90B so as to interconnect the adjacent through holes 94A-H in fluid communication with each other. The cover through holes 97A, 97B each align with one of the main rotor through holes 94A-H when the main valve rotor cover 90C is coupled to the main valve rotor body 90B.

In the illustrative embodiments, the main valve rotor cover 90C has three cover chambers 95A-C and two cover through holes 97A, 97B. In some embodiments, the number of cover chambers 95A-C and the number of cover through holes may be different depending on the number of circuits 22, 24, 26.

The main valve rotor body 90B includes a main body plate 98, an outer wall 100, and an inner wall 102 as shown in FIGS. 8-10. The main body plate 98 extends circumferentially about the first rotor axis 90A and shaped to define the plurality of main rotor through holes 94A-H that extend axially therethrough. The outer wall 100 extends circumferentially around an outer edge of the main body plate 98. The outer wall 100 extends axially from the outer edge of the main body plate 98 in the same direction as the main valve rotor shaft 90S. The inner wall 102 extends circumferentially about the first rotor axis 90A and axially away from the main body plate 98 at a location radially inward of the outer wall 100.

The main valve rotor cover 90C includes a cover plate 104 and flow divider shells 106A-C as shown in FIGS. 8-10. The cover plate 104 extends circumferentially about the first rotor axis 90A. Each of the flow divider shells 106A-C defines one of the cover chambers 95A-C and is configured to extend around at least two through holes 94 in the main body plate 98. The first flow divider shell 106A defines the first cover chamber 95A, the second flow divider shell 106B defines the second cover chamber 95B, and the third flow divider shell 106C defines the third cover chamber 95C as shown in FIGS. 8-10.

As the main valve rotor 90 rotates, the main body plate 98 and the main valve rotor cover 90C cooperate to control the flow to each aperture 89A1, 89B, 89C, 89D, 89E, 89F, 89G, 89H included in the housing apertures 89A1, 89A2, 89B, 89C, 89D, 89E, 89F, 89G, 89H, 89I, 89J as shown in FIGS. 15A-D and 17A-D. The main body plate 98 controls the flow to each aperture 89A1, 89B, 89C, 89D, 89E, 89F, 89G, 89H by aligning different first rotor through holes 94A-H with different apertures 89A1, 89B, 89C, 89D, 89E, 89F, 89G, 89H in the different predetermined positions. The cover chambers 95A-C of the main valve rotor cover 90C each connect adjacent through holes 94A-H in fluid communication so that the flow of fluid may only flow therebetween. The cover chambers 95A-C of the flow divider shells 106A-C interconnect the adjacent through holes 94, but block direct fluid communication to the first valve cavity 86.

In the illustrative embodiments, the main valve rotor cover 90C is a separate component that is coupled to the main valve rotor body 90B. The main valve rotor body 90B has locking means for selectively fixing the main valve rotor cover 90C to the main valve rotor body 90B in an engaged position on the main valve rotor body 90B so that the main valve rotor cover 90C is blocked from axial movement relative to the main valve rotor body 90B once the main valve rotor cover 90C is located in the engaged position as shown in FIGS. 9 and 9A.

In the illustrative embodiments, each of the outer wall 100 and the inner wall 102 of the main valve rotor body 90B defines the locking means for selectively fixing the main valve rotor cover 90C to the main valve rotor body 90B in the engaged position on the main valve rotor body 90B as shown in FIGS. 9-10. The locking means of the main valve rotor body 90B includes deflectable lock tabs 100T on the outer wall 100 and deflectable lock tabs 102T on the inner wall 102 of the main valve rotor body 90B as shown in FIGS. 9-10. Each deflectable lock tab 100T, 102T is configured to engage the main valve rotor cover 90C when the main valve rotor cover 90C is in the engaged position on the main valve rotor body 90B to block axial movement of the main valve rotor cover 90C relative to the main valve rotor body 90B once the main valve rotor cover 90C is located in the engaged position on the main valve rotor body 90B.

Each deflectable lock tab 100T, 102T includes a deflectable lock arm 100A, 102A and a protrusion 100P, 102P as shown in FIG. 9A. The deflectable lock arm 100A extends axially from the outer wall 100 toward the main body plate 98, while the deflectable lock arm 102A extends axially from the main body plate 98 at the inner wall 102. The protrusions 100P, 102P extend radially from the corresponding deflectable lock arm 100A, 102A towards each other.

Each protrusions 100P, 102P defines a guide ramp 100S, 102S that engages the main valve rotor cover 90C as the main valve rotor cover 90C is moved into the engaged position to cause the deflectable lock arms 100A, 102A to deflect from a normal position to a deflected position so that the main valve rotor cover 90C may move past the protrusions 100P, 102P. Once the main valve rotor cover 90C moves past the terminal ends of the protrusions 100P. 102P, the deflectable lock arms 100A, 102A move back to the normal positions so that the protrusions 100P, 102P engage an upper surface 104S of the cover plate 104 to block axial movement of the main valve rotor cover 90C to fix the main valve rotor cover 90C with the main valve rotor body 90B.

The throttle valve rotor 92 includes a throttle valve rotor plate 92P, a throttle valve rotor wall 92W, and a throttle valve rotor shaft 92S as shown in FIGS. 8-9 and 11-12. The throttle valve rotor plate 92P extends circumferentially about the second rotor axis 92A. The throttle valve rotor wall 92W extends circumferentially around an outer edge of the throttle valve rotor plate 92P. The throttle valve rotor wall 92W extends axially from the outer edge of the throttle valve rotor plate 92P. The throttle valve rotor shaft 92S extends away from the throttle valve rotor plate 92P along the second rotor axis 92A in the same direction as the throttle valve rotor wall 92W. In the illustrative embodiments, the valve housing body 84 defines a second rod 84B that extends axially from the bottom surface 84S of the valve housing body 84 into the throttle valve rotor shaft 92S to position and center the throttle valve rotor 92 in the second valve cavity 88.

The throttle valve rotor plate 92P is formed to define the plurality of throttle rotor through holes 96A-C as shown in FIGS. 9-9A and 11-12. Each of the throttle valve rotor through holes 96A-C extends axially through the throttle valve rotor plate 92P and circumferentially partway about the second rotor axis 92A.

As the throttle valve rotor 92 rotates, the throttle valve rotor plate 92P controls the amount of fluid flowing through the apertures 89A2, 89I, 89J included in the plurality of housing apertures 89A1, 89A2, 89B, 89C, 89D, 89E, 89F, 89G, 89H, 89I, 89J. The throttle valve rotor plate 92P partially opens, fully opens, or closes the apertures 89A2, 89I, 89J in the different predetermined positions to control the flow of fluid therethrough. The throttle valve rotor plate 92P partially opens or closes the apertures 89A2, 89I, 89J in the different predetermined positions by partially or fully covering the apertures 89A2, 89I, 89J. In some positions, a portion of the throttle valve rotor plate 92P covers the apertures 89A2, 89I, 89J to block the flow of fluid therethrough.

In the illustrative embodiments, the multi-way valve 38 further includes a first sealing system 81 and a second sealing system 83 as shown in FIGS. 8-12. The first sealing system 81 is configured to seal between the valve housing 80 and one of the valve rotors 90 included in the valve flow controller 82. The second sealing system 83 is configured to seal between the valve housing 80 and the other valve rotor 92 included in the valve flow controller 82.

The first sealing system 81, also referred to as the main sealing system 81, includes a first biasing assembly 108 and a first seal member 110 as shown in FIGS. 8-10. The first seal member 110 is coupled to the first valve rotor 90 for rotation therewith. The first seal member 110 engages with the axially facing surface 84S of the valve housing body 84. The first biasing assembly 108 is configured to selectively apply an axial force on the main valve rotor 90 to urge the main valve rotor 90 toward the plurality of apertures 89A1, 89A2, 89B, 89C, 89D, 89E, 89F, 89G, 89H, 89I, 89J formed in the valve housing body 84 so as to force the first seal members 110 toward the valve housing body 84 and into engagement with a bottom surface 84S of the valve housing body 84 when the main valve rotor 90 is in one of the different predetermined positions to improve sealing between the main valve rotor 90 and the valve housing body 84.

In the illustrative embodiments, the first seal member 110 is a single seal member 110. The first seal member 110 extends into each through hole 94A-H in the main valve rotor body 90B.

In some embodiments, the first sealing system 81 includes a plurality of seal members 110. The plurality of seal members 110 may be overmolded onto the main valve rotor body 90B of the first valve rotor 90. In other embodiments, the first seal members 110 may be another suitable seal coupled to the first valve rotor 90. In some embodiments, the first seal members 110 may be press-fit seals. In some embodiments, the first seal members 110 may be O-ring seals. In other embodiments, the first seal members 110 may be another suitable seal.

In some embodiments, the first sealing system 81 includes a plurality of seal members 110 that extend around a single through hole 94A, 94D and others that extend around adjacent through holes 94B, 94C, 94E, 94F, 94G, 94H in the main valve rotor body 90B. In some embodiments, the first sealing system 81 may include a plurality of seal members 110 that extend around adjacent through holes 94B, 94C, 94E, 94F, 94G, 94H form a perimeter seal around the corresponding through holes 94B, 94C, 94E, 94F, 94G, 94H that matches up with the corresponding flow divider shell 106A-C when the main valve rotor cover 90C is coupled to the main valve rotor body 90B so that the cover chambers 95A-C are separately sealed off from the first valve cavity 86.

The first biasing assembly 108 includes cam ramps 112 formed on an axially facing surface 85S of the upper valve housing cover 85 of the valve housing 80 and a cam surface 114 formed on the main valve rotor 90 as shown in FIG. 9-10. The cam surface 114 formed on the main valve rotor 90 is configured to engage the cam ramps 112 on the upper valve housing cover 85 as the main valve rotor 90 rotates about the first rotor axis 90A to the different predetermined positions so that the main valve rotor 90 is urged toward the plurality of apertures 89A1, 89A2, 89B, 89C, 89D, 89E, 89F, 89G, 89H formed in the valve housing body 84 at the different predetermined positions.

In this way, the cam ramps 112 and cam surface 114 act to reduce the torque needed to turn the main valve rotor 90 between the different predetermined positions. Other valves use a constant torque in that the rotor is always loaded. The constant torque may adversely affect the longevity of the valve. The main valve rotor 90 includes the first biasing assembly 108 so that the main valve rotor 90 is loaded and unloaded as it rotates between the different predetermined positions.

The cam ramps 112 are formed on the axially facing surface 85S of the upper valve housing cover 85, while the cam surface 114 is defined by an edge of the outer wall 100 of the main valve rotor body 90B as shown in FIGS. 9-10. Each of the cam ramps 112 is raised from the surface 85S at about 45-degree intervals around the first rotor axis 90A. The cam surface 114 is also raised at about 45-degree intervals around the first rotor axis 90A. In some embodiments, the cam ramps 112 may be formed by the edge of the outer wall 100 of the main valve rotor body 90B, while the cam surface 114 is defined by the axially facing surface 85S of the upper valve housing cover 85.

Each of the cam ramps 112 is circumferentially aligned with one of the apertures 89A1, 89B, 89C, 89D, 89E, 89F, 89G, 89H of the valve housing body 84, while the raised sections of the cam surface 114 are aligned with the through holes 94A-H. In this way, the axial force F will be applied at the different predetermined positions so as to seal around the corresponding apertures. Then as the main valve rotor 90 rotates about the first rotor axis 90A, the raised portions 114P of the cam surface 114 disengage the cam ramps 112 so that at least a portion of the axial force is removed and the torque needed to rotate the main valve rotor 90 is reduced.

The cam ramps 112 are fixed on the upper valve housing cover 85. The cam surface 114 on the main valve rotor 90 rides against the cam ramps 112 in a circular manner and applies downward axial force to the main valve rotor 90 when aligned with the high points 114P of the cam surface 114 as shown in FIG. 9A. This axial force generates a contact pressure between the first seal members with the bottom surface 84S of the valve housing body 84. The increased contact pressure and resulting increase in friction are only generated in the predetermined positions of the different modes A-J. As the main valve rotor 90 rotates, the cam ramps 112 are disengaged with the high points 114P of the cam surface 114 so that the axial force is removed or reduced such that the main valve rotor 90 is unloaded. This reduces friction and torque on the actuator during movement between seal points.

The second sealing system 83, also referred to as the throttle sealing system 83, includes a second biasing assembly 116 and a second seal member 118 as shown in FIGS. 8, 9A, 11, and 12. The second biasing assembly 116 is configured to apply an axial force on the second valve rotor 92 to urge the second valve rotor 92 toward the second seal member 118 and the bottom surface 84S of the valve housing body 84 and into engagement with the second seal member 118.

The second biasing assembly 116 includes a bias member 120, a bias member cover 122, and a flange 124 formed on the upper valve housing cover 85 as shown in FIGS. 11-13. The bias member 120 is configured to be assembled over the throttle valve rotor shaft 92S. The bias member cover 122 is arranged over the bias member 120 when the bias member 120 extends around the throttle valve rotor shaft 92S. The bias member cover 122 is coupled to the throttle valve rotor 92 for rotation therewith. The flange 124 formed on the upper valve housing cover 85 engages the bias member cover 122 when the upper valve housing cover 85 is coupled to the valve housing body 84 to load the second biasing assembly 116 when the throttle valve rotor 92 is arranged in the second valve cavity 88.

With the bias member 120 and the bias member cover 122 assembled on the throttle valve rotor 92, the throttle valve rotor 92 may be arranged in the second valve cavity 88 as shown in FIGS. 9 and 9A. The upper valve housing cover 85 defines the flange 124 that extends axially toward and engages the bias member cover 122 so that the bias member 120 is compressed. This causes the bias member 120 to apply an axial force on the throttle valve rotor 92 thereby urging the throttle valve rotor 92 toward the plurality of apertures 89A2, 89I, 89J formed in the valve housing body 84 to increase sealing between the throttle valve rotor 92 and the valve housing body 84.

In the illustrative embodiments, the second biasing assembly 116 applies a constant axial force to the throttle valve rotor 92. The second biasing assembly 116 constantly loads the throttle valve rotor 92. In other embodiments, the second biasing assembly 116 may include cam features like the main valve rotor 90 to selectively apply the axial force or reduce the force applied to the throttle valve rotor 92 so that the throttle valve rotor 92 is loaded and unloaded as it rotates between the different predetermined positions.

The bias member cover 122 includes a ring 126 and a pair of deflectable attachment tabs 128, 130 as shown in FIGS. 11 and 12. The ring 126 extends circumferentially about the second rotor axis 92A. The throttle valve rotor shaft 92S extends through a hole 126A formed in the ring 126 of the bias member cover 122. The deflectable attachment tabs 128, 130 each extend axially from the ring 126. The deflectable attachment tabs 128, 130 each extend into openings 920 on opposite sides of the throttle valve rotor shaft 92S to couple the bias member cover 122 to the throttle valve rotor 92.

In the illustrative embodiments, the bias member 120 is located axially between the throttle valve rotor plate 92P and the ring 126 of the bias member cover 122 as shown in FIG. 12. The deflectable attachment tabs 128, 130 extend axially from the ring 126 so that the attachment tabs 128, 130 are located radially between the bias member 120 and the throttle valve rotor shaft 92S.

Each deflectable attachment tab 128, 130 includes a deflectable attachment arm 128A, 130A and a protrusion 128P, 130P as shown in FIGS. 7 and 8. The deflectable attachment arms 128A, 130A extend axially from the ring 126 on opposite sides of the ring 126. The protrusions 128P, 130P extend radially from the corresponding deflectable attachment arm 128A, 130A towards each other.

Each protrusion 128P, 130P defines a guide ramp 128S, 130S that engages the throttle valve rotor shaft 92S as the bias member cover 122 is moved into an engaged position to cause the deflectable attachment arms 128A, 130A to deflect from a normal position to a deflected position so that the bias member cover 122 may be moved into the engaged position on the throttle valve rotor shaft 92S. Once the terminal ends of the protrusions 128P, 130P move past an edge of the openings 920 in the throttle valve rotor shaft 92S, the deflectable attachment arms 128A, 130A move back to the normal positions so that each of the protrusions 128P, 130P engage the edge of the corresponding openings 920 to block axial movement of the bias member cover 122 off the throttle valve rotor shaft 92S.

In the illustrative embodiments, the second seal member 118 is a gasket arranged axially between the valve housing body 84 and the second valve rotor 92 as shown in FIGS. 8 and 9A. The second seal member 118 extends around the apertures 89I, 89J in the illustrative embodiment. In some embodiments, the second seal member 118 extends around the apertures 89A2, 89I, 89J.

In some embodiments, the second seal member 118 may be another suitable seal type. In some embodiments, the second seal member 118 may be a press-fit seal. In some embodiments, the second seal member 118 may be an O-ring seal. In some embodiments, the second seal member 118 may be a plurality of seal members 118 arranged around each aperture 89A2, 89I, 89J.

The different modes of the thermal management system 20 are shown in FIG. 15. The first mode or mode A is shown in FIG. 15A. The second mode or mode B is shown in FIG. 15B. The third mode or mode C is shown in FIG. 15C. The fourth mode or mode D is shown in FIG. 15D. In the illustrative embodiments, the thermal management system 20 has four modes A-D. In some embodiments, the thermal management system 20 may have more or less than four modes depending on the number of circuits 22, 24, 26 or the thermal needs of the system 20.

In the illustrative embodiments, the coolant fluid refers to a heat transfer fluid configured to absorb and transfer heat between the different components on the vehicle 10. The coolant fluid may be any suitable cooling/heating fluid configured to to absorb/transfer heat to cool or heat the different components on the different thermal fluid circuits 22, 24, 26.

In mode A, or the system cooling mode, the main fluid circuit 22 is connected in fluid communication with the radiator fluid circuit 24 and the battery fluid circuit 26 is isolated from the other circuits 22, 24 as shown in FIG. 15A. The main fluid circuit 22 is connected to the radiator fluid circuit 24 so that the e-drive system 11, including the front and rear drives 12F, 12R and electrical components 13, 15, is cooled by the coolant fluid and the heat is rejected by flowing the coolant fluid through the radiator 14. The battery fluid circuit 26 is isolated from the other circuits 22, 24 and the batteries 16 are cooled by coolant fluid and the heat is rejected by flowing the coolant fluid through the chiller/heater 18.

As shown in FIG. 15A, a flow of coolant fluid is drawn from the coolant tank 32 through the eleventh fluid cavity 58L and pumped into the first fluid cavity 58A by the first pump 34, which is connected to the main fluid circuit 22. The main-circuit conduit 22C is in thermal communication with the DC/DC converter and on board charger (OBC) 13 and the controller 15 to transfer heat between the components 13, 15. The main-circuit conduit 22C may diverge into sections that flow to different components 13, 15, 12F, 12R. In the illustrative embodiments, splits into a first main-circuit conduit section 22CF so the main-circuit conduit 22C is in thermal communication with the front drive 12F and the a second main-circuit conduit section 22CR so that the main-circuit conduit 22C is in fluid communication with the rear drive 12R as shown in FIG. 15A.

The first main-circuit conduit section 22CF conducts the coolant fluid from the front drive 12F back to the manifold 40 and the second main-circuit conduit section 22CR conducts the coolant fluid from the rear drive 12R back to the manifold 40 as shown in FIG. 15A. The first main-circuit conduit section 22CF of the main fluid circuit 22 is coupled in fluid communication with the eighth fluid cavity 58I. The second main-circuit conduit section 22CR of the main fluid circuit 22 is coupled in fluid communication with the ninth fluid cavity 58J. In the illustrative embodiments, the front and rear drives 12F, 12R may be on different sections of the main-circuit conduit 22C such that the coolant fluid flowing from the front drive 12F flows to the ninth fluid cavity 58J and the coolant fluid flowing from the rear drive 12R flows to the eighth fluid cavity 58I.

The throttle valve rotor 92 controls the flow of coolant fluid from each fluid cavity 58I, 58J through the corresponding housing apertures 89I, 89J by changing between a THROTTLE VALVE ROTOR FIRST position as shown in FIG. 16A, a THROTTLE VALVE ROTOR SECOND position as shown in FIG. 16B, and a THROTTLE configuration as shown in FIG. 16C. The combined flows from each aperture 89I, 89J into the second valve cavity 88 then flows out the first throttle-cavity aperture 89A2, through the connecting passageway 89A, and through the first main-cavity aperture 89A1 into the first valve cavity 86 as shown in FIGS. 15A and 17A.

In the THROTTLE VALVE ROTOR FIRST position, the throttle valve rotor 92 connects the first throttle-cavity aperture 89A2 with the first main-cavity aperture 89A1 and the ninth aperture 89I, while blocking flow through the tenth aperture 89J as shown in FIG. 16A. In the THROTTLE VALVE ROTOR FIRST position, the first through hole 96A in the throttle valve rotor 92 is aligned with the first throttle-cavity aperture 89A2 so that the first valve cavity 86 is in fluid communication with the second valve cavity 88 through the connecting passageway 89A as shown in FIG. 16A. In the THROTTLE VALVE ROTOR FIRST position, the throttle valve rotor 92 also aligns the second through hole 96B with the ninth aperture 89I to connect the first throttle-cavity aperture 89A2 with the ninth aperture 89I and covers the tenth aperture 89J to block flow therethrough as shown in FIG. 16A.

In the THROTTLE VALVE ROTOR SECOND position, the throttle valve rotor 92 connects the first throttle-cavity aperture 89A2 with the first main-cavity aperture 89A1 and the tenth aperture 89J, while blocking flow through the ninth aperture 89I as shown in FIG. 16B. In the THROTTLE VALVE ROTOR SECOND position, the first through hole 96A in the throttle valve rotor 92 remains aligned with the first throttle-cavity aperture 89A2 so that the first valve cavity 86 is in fluid communication with the second valve cavity 88 through the connecting passageway 89A as shown in FIG. 16B. However, in the THROTTLE VALVE ROTOR SECOND position, the throttle valve rotor 92 aligns the third through hole 96C with the tenth aperture 89J to connect the first throttle-cavity aperture 89A2 with the tenth aperture 89J and covers the ninth aperture 89I to block flow therethrough as shown in FIG. 16B.

In the THROTTLE configuration, the first through hole 96A in the throttle valve rotor 92 remains aligned with the first throttle-cavity aperture 89A2 so that the first valve cavity 86 is in fluid communication with the second valve cavity 88 through the connecting passageway 89A as shown in FIG. 16C. However, in the THROTTLE configuration, both through holes 96B, 96C are partially aligned with the respective ninth and tenth apertures 89I, 89J as shown in FIGS. 16C and 17A-D.

Both through holes 96B, 96C are partially aligned with the respective ninth and tenth apertures 89I, 89J so that the first throttle-cavity aperture 89A2 is in fluid communication with the ninth and tenth apertures 89I, 89J. In the THROTTLE configuration, the throttle valve rotor 92 can rotate about the second rotor axis 92A to vary, or throttle, the flow through the ninth and tenth apertures 89I, 89J. The first through hole 96A extends circumferentially partway about the second rotor axis 92A so that as the throttle valve rotor 92 toggles in the THROTTLE configuration, the first through hole 96A in the throttle valve rotor 92 remains aligned with the first throttle-cavity aperture 89A2. As the throttle valve rotor 92 rotates, the corresponding through holes 96B, 96C vary the flow through the ninth and tenth apertures 89I, 89J. The toggling of the throttle valve rotor 92 is shown in FIG. 16. As shown in FIG. 16, the area of the aperture or port opening 89I, 89J may be varied by rotating the throttle valve rotor 92.

In mode A, the main valve rotor 90 of the multi-way valve 38 is in a MAIN VALVE ROTOR FIRST position as shown in FIGS. 15A and 17A. In the MAIN VALVE ROTOR FIRST POSITION, the main valve rotor 90 connects the first main-cavity aperture 89A1 to the second aperture 89B, connects the third aperture 89C to the sixth aperture 89F, connects the fourth aperture 89D to the fifth aperture 89E, and connects the seventh aperture 89G to the eighth aperture 89H as shown in FIGS. 15A and 17A.

In the MAIN VALVE ROTOR FIRST POSITION, the rotor through hole 94G aligns with the first main-cavity aperture 89A1, the rotor through hole 94H aligns with the second aperture 89B, and the third flow divider shell 106C defining the third chamber 95C extends around the first main-cavity aperture 89A1 and the second aperture 89B to connect the first main-cavity aperture 89A1 and the second aperture 89B in fluid communication as shown in FIG. 17A. In this way, the fluid flowing through the first main-cavity aperture 89A1 flows into the third chamber 95C defined by the third flow divider shell 106C, which directs the flow of fluid through the second housing aperture 89B as shown in FIGS. 15A and 17A. The fluid flowing through the first main-cavity aperture 89A1 flows into the third chamber 95C defined by the third flow divider shell 106C, and out through the second housing aperture 89B as suggested by the arrow in FIG. 17A. The fluid flows into the second fluid cavity 58B that is coupled in fluid communication with the second housing aperture 89B.

From the second fluid cavity 58B, the fluid flows out the second passageway 46P to the radiator fluid circuit 24. The radiator-circuit conduit 24C is in thermal communication with the radiator 14 to reject heat from the coolant fluid out through the radiator 14 when the thermal management system 20 is in the mode A. The radiator-circuit conduit 24C conducts the coolant fluid back to the manifold 40 and into the third fluid cavity 58C. The fluid flows from the third fluid cavity 58C through the third aperture 89C.

In the MAIN VALVE ROTOR FIRST POSITION, the rotor through hole 94A and the cover through hole 97B are aligned with the third aperture 89C, while the rotor through hole 94D and the cover through hole 97A are aligned with the sixth aperture 89F so as to connect the third aperture 89C and the sixth aperture 89F in fluid communication as shown in FIG. 17A. The coolant fluid flows into the first valve cavity 86 through the rotor through hole 94A and the cover through hole 97B and out of the first fluid cavity 86 through the rotor through hole 94D and the cover through hole 97A as suggested by the arrow in FIG. 17A. The coolant fluid flowing out of the first fluid cavity 86 flows through the sixth aperture 89F, through the fifth fluid cavity 58F in fluid communication with the sixth aperture 89F, and back into the coolant tank 32 as shown in FIG. 15A.

The second pump 36 conducts coolant fluid from the seventh fluid cavity 58H to the tenth fluid cavity 58K, which is fluid communication with the battery fluid circuit 26 as shown in FIG. 15A. The battery-circuit conduit 26C is in thermal communication with the batteries 16 to transfer heat from the batteries 16. The battery-circuit conduit 26C is in thermal communication with the chiller/heater 18 to reject heat from the coolant fluid when the thermal management system is in the mode A. The coolant fluid flows back from the battery fluid circuit 26 to the sixth fluid cavity 58G as shown in FIG. 15A.

In the MAIN VALVE ROTOR FIRST POSITION, the rotor through hole 94E aligns with the seventh aperture 89G, the rotor through hole 94F aligns with the eighth aperture 89H, and the second flow divider shell 106B defining the second chamber 95B extends around the seventh aperture 89G and the eighth aperture 89H to connect the seventh aperture 89G and the eighth aperture 89H in fluid communication as shown in FIG. 17A. In this way, the coolant fluid flowing into sixth fluid cavity 58G of the manifold 40 is directed back out of the manifold 40 through the seventh fluid cavity 58H as suggested by the arrow in FIG. 17A. The second pump 36 conducts the coolant fluid from the seventh fluid cavity 58H to the tenth fluid cavity 58K creating a loop when coolant only flows through the battery fluid circuit 26.

In the MAIN VALVE ROTOR FIRST POSITION, the rotor through hole 94B aligns with the fourth aperture 89D, the rotor through hole 94C aligns with the fifth aperture 89E, and the first flow divider shell 106A defining the first chamber 95A extends around the fourth aperture 89D and the fifth aperture 89E to connect the fourth aperture 89D and the fifth aperture 89E in fluid communication as shown in FIG. 17A. Both the fourth aperture 89D and the fifth aperture 89E are in fluid communication with the fourth fluid cavity 58DE such that this section of the manifold 40 is isolated from the other fluid cavities 58A-L.

In mode B, or the system heating mode, the different fluid circuits 22, 24, 26 are isolated from each other as shown in FIGS. 15B and 17B. The main fluid circuit 22 is isolated from the other fluid circuits 24, 26 so that the e-drive system 11 is heats up, i.e. the lubricant in the front and rear drive units 12F, 12R increases in temperature, which will allow for immediate heating of the battery 16 in extreme cold conditions. The radiator fluid circuit 24 is isolated from the other fluid circuits 22, 26 so that the radiator 14 is bypassed. The battery fluid circuit 26 is isolated from the other fluid circuits 22, 24 so that the battery 16 may be heated.

As shown in FIG. 15B, a flow of coolant fluid is drawn from the coolant tank 32 through the eleventh fluid cavity 58L and pumped into the first fluid cavity 58A by the first pump 34, which is connected to the main fluid circuit 22. The main-circuit conduit 22C is in thermal communication with the DC/DC converter and on board charger (OBC) 13 and the controller 15 to transfer heat between the components 13, 15. The main-circuit conduit 22C may diverge into sections that flow to different components 13, 15, 12F, 12R. In the illustrative embodiments, splits into a first main-circuit conduit section 22CF so the main-circuit conduit 22C is in thermal communication with the front drive 12F and the a second main-circuit conduit section 22CR so that the main-circuit conduit 22C is in fluid communication with the rear drive 12R as shown in FIG. 15B.

The first main-circuit conduit section 22CF conducts the coolant fluid from the front drive 12F back to the manifold 40 and the second main-circuit conduit section 22CR conducts the coolant fluid from the rear drive 12R back to the manifold 40 as shown in FIG. 15B. The first main-circuit conduit section 22CF of the main fluid circuit 22 is coupled in fluid communication with the eighth fluid cavity 58I. The second main-circuit conduit section 22CR of the main fluid circuit 22 is coupled in fluid communication with the ninth fluid cavity 58J.

The throttle valve rotor 92 controls the flow of coolant fluid from each fluid cavity 58I, 58J through the corresponding housing apertures 89I, 89J by changing between the THROTTLE VALVE ROTOR FIRST position as shown in FIG. 16A, the THROTTLE VALVE ROTOR SECOND position as shown in FIG. 16B, and the THROTTLE configuration as shown in FIG. 16C. The combined flows from each aperture 89I, 89J into the second valve cavity 88 then flows out the first throttle-cavity aperture 89A2, through the connecting passageway 89A, and through the first main-cavity aperture 89A1 into the first valve cavity 86 as shown in FIGS. 15B and 17B.

In mode B, the main valve rotor 90 has moved to a MAIN VALVE ROTOR SECOND position as shown in FIGS. 15B and 17B. In the MAIN VALVE ROTOR SECOND position, the main valve rotor 90 connects the first main-cavity aperture 89A1 to the sixth aperture 89F, connects the second aperture 89B to the third aperture 89C, connects the fourth aperture 89D to the fifth aperture 89E, and connects the seventh aperture 89G to the eighth aperture 89H as shown in FIGS. 15B and 17B.

In the MAIN VALVE ROTOR SECOND position, the rotor through hole 94A and the cover through hole 97B are aligned with the sixth aperture 89F, while the rotor through hole 94D and the cover through hole 97A are aligned with the first main-cavity aperture 89A1 so as to connect the sixth aperture 89F and the first main-cavity aperture 89A1 in fluid communication as shown in FIG. 17B. In this way, the fluid flowing through the first main-cavity aperture 89A1 flows through the rotor through hole 94D and the cover through hole 97A into the first valve cavity 86 and out of the first fluid cavity 86 through the rotor through hole 94A and the cover through hole 97B as suggested by the arrow in FIG. 17B. The coolant fluid in the first valve cavity 86 flows through the sixth aperture 89F, which is aligned with the rotor through hole 94A and the cover through hole 97B, through the fifth fluid cavity 58F in fluid communication with the sixth aperture 89F, and back into the coolant tank 32 as shown in FIGS. 15B and 17B. The main valve rotor 90 isolates the other fluid circuits 24, 26 by surrounding adjacent apertures 89B, 89C, 89G, 89H with the flow divider shells 106B, 106A to block flow to the other circuits 24, 26 when the main valve rotor is in the MAIN VALVE ROTOR SECOND position as shown in FIG. 17B.

In the MAIN VALVE ROTOR SECOND position, the rotor through hole 94E aligns with the second aperture 89B, the rotor through hole 94F aligns with the third aperture 89C, and the second flow divider shell 106B defining the second chamber 48B extends around the second aperture 89B and the third aperture 89C to connect the second aperture 89B and the third aperture 89C in fluid communication as shown in FIG. 17B. In this way, the coolant fluid flowing into third fluid cavity 58C of the manifold 40 is directed back out of the manifold 40 through the second fluid cavity 58B as suggested by the arrow in FIG. 17B and the radiator fluid circuit 24 is bypassed.

The second pump 36 conducts coolant fluid from the seventh fluid cavity 58H to the tenth fluid cavity 58K, which is fluid communication with the battery fluid circuit 26 as shown in FIG. 15B. The battery-circuit conduit 26C is in thermal communication with the batteries 16 to transfer heat from the batteries 16. The battery-circuit conduit 26C is in thermal communication with the chiller/heater 18 to reject heat from the coolant fluid when the thermal management system is in the mode A. The coolant fluid flows back from the battery fluid circuit 26 to the sixth fluid cavity 58G as shown in FIG. 15B.

In the MAIN VALVE ROTOR SECOND position, the rotor through hole 94B aligns with the seventh aperture 89G, the rotor through hole 94C aligns with the eighth aperture 89H, and the first flow divider shell 106A defining the first chamber 48A extends around the seventh aperture 89G and the eighth aperture 89H to connect the seventh aperture 89G and the eighth aperture 89H in fluid communication as shown in FIG. 17B. In this way, the coolant fluid flowing into sixth fluid cavity 58G of the manifold 40 is directed back out of the manifold 40 through the seventh fluid cavity 58H as suggested by the arrow in FIG. 17B. The second pump 36 conducts the coolant fluid from the seventh fluid cavity 58H to the tenth fluid cavity 58K creating a loop when coolant only flows through the battery fluid circuit 26.

In the MAIN VALVE ROTOR SECOND position, the rotor through hole 94G aligns with the fourth aperture 89D, the rotor through hole 94H aligns with the fifth aperture 89E, and the third flow divider shell 106C defining the third chamber 95C extends around the fourth aperture 89D and the fifth aperture 89E to connect the fourth aperture 89D and the fifth aperture 89E in fluid communication as shown in FIG. 17B. Both the fourth aperture 89D and the fifth aperture 89E are in fluid communication with the fourth fluid cavity 58DE such that this section of the manifold 40 is isolated from the other fluid cavities 58A-L.

In mode C, or the battery conditioning mode, the fluid circuits 22, 24, 26 are connected in fluid communication with each other so that the flow of coolant fluid flows from the main fluid circuit 22 to the battery fluid circuit 26, from the battery fluid circuit 26 to the radiator fluid circuit 24, and then from the radiator fluid circuit 24 back to the main fluid circuit 22 as shown in FIG. 11C. The flow of coolant fluid is heated by the e-drive system 11 and the heat recovered from the e-drive system 11 may be routed to the batteries 16. The battery fluid circuit 26 utilizes the recovered heat to heat the batteries 16 without needing to use the chiller/heater 18. The flow of coolant fluid flows from the battery fluid circuit 26 to the radiator fluid circuit 24 before flowing back to the coolant tank 32.

In more moderate heating conditions, the multi-way valve 38 allows recovery of waste heat from drive units 12F, 12R. The coolant fluid is mixed by throttle valve rotor 92 and routed to the battery fluid circuit 26 to heat the battery 16 without using heater 18. This allows heater power to be conserved.

As shown in FIG. 15C, a flow of coolant fluid is drawn from the coolant tank 32 through the eleventh fluid cavity 58L and pumped into the first fluid cavity 58A by the first pump 34, which is connected to the main fluid circuit 22. The main-circuit conduit 22C is in thermal communication with the DC/DC converter and on board charger (OBC) 13 and the controller 15 to transfer heat between the components 13, 15. The main-circuit conduit 22C may diverge into sections that flow to different components 13, 15, 12F, 12R. In the illustrative embodiments, splits into a first main-circuit conduit section 22CF so the main-circuit conduit 22C is in thermal communication with the front drive 12F and the a second main-circuit conduit section 22CR so that the main-circuit conduit 22C is in fluid communication with the rear drive 12R as shown in FIG. 15B.

The first main-circuit conduit section 22CF conducts the coolant fluid from the front drive 12F back to the manifold 40 and the second main-circuit conduit section 22CR conducts the coolant fluid from the rear drive 12R back to the manifold 40 as shown in FIG. 15C. The first main-circuit conduit section 22CF of the main fluid circuit 22 is coupled in fluid communication with the eighth fluid cavity 58I. The second main-circuit conduit section 22CR of the main fluid circuit 22 is coupled in fluid communication with the ninth fluid cavity 58J.

The throttle valve rotor 92 controls the flow of coolant fluid from each fluid cavity 58I, 58J through the corresponding housing apertures 89I, 89J by changing between the THROTTLE VALVE ROTOR FIRST position as shown in FIG. 16A, the THROTTLE VALVE ROTOR SECOND position as shown in FIG. 16B, and the THROTTLE configuration as shown in FIG. 16C. The combined flows from each aperture 89I, 89J into the second valve cavity 88 then flows out the first throttle-cavity aperture 89A2, through the connecting passageway 89A, and through the first main-cavity aperture 89A1 into the first valve cavity 86 as shown in FIGS. 15C and 17C.

In mode C, the main valve rotor 90 has moved to a MAIN VALVE ROTOR THIRD position as shown in FIGS. 15C and 17C. In the MAIN VALVE ROTOR THIRD position, the main valve rotor 90 connects the first main-cavity aperture 89A1 to the eighth aperture 89H, connects the second aperture 89B to the seventh aperture 89G, connects the third aperture 89C to the fourth aperture 89D, and connects the fifth aperture 89E to the sixth aperture 89F as shown in FIGS. 15C and 17C.

In the MAIN VALVE ROTOR THIRD position, the rotor through hole 94B aligns with the eighth aperture 89H, the rotor through hole 94C aligns with the first main-cavity aperture 89A1, and the first flow divider shell 106A defining the first chamber 95A extends around the eighth aperture 89H and the first main-cavity aperture 89A1 to connect the eighth aperture 89H and the first main-cavity aperture 89A1 in fluid communication as shown in FIG. 17C. In this way, the fluid flowing through the first main-cavity aperture 89A1 flows into the first chamber 95A defined by the first flow divider shell 106A, which directs the flow of fluid through the eighth aperture 89H as shown in FIGS. 15C and 17C. The fluid flowing through the first main-cavity aperture 89A1 flows into the first chamber 95A defined by the first flow divider shell 106A, and out through the eighth aperture 89H as suggested by the arrow in FIG. 17C. The fluid flows into the seventh fluid cavity 58H that is coupled in fluid communication with the eighth housing aperture 89H.

The second pump 36 conducts coolant fluid from the seventh fluid cavity 58H to the tenth fluid cavity 58K, which is fluid communication with the battery fluid circuit 26 as shown in FIG. 15C. The battery-circuit conduit 26C is in thermal communication with the batteries 16 to transfer the recovered heat from the e-drive system 11 to the batteries 16 to heat to the batteries 16 in mode C. The coolant fluid flows back from the battery fluid circuit 26 to the sixth fluid cavity 58G as shown in FIG. 15C.

In the MAIN VALVE ROTOR THIRD position, the rotor through hole 94A and the cover through hole 97B are aligned with the seventh aperture 89G, while the rotor through hole 94D and the cover through hole 97A are aligned with the second aperture 89B so as to connect the seventh aperture 89G and the second aperture 89B in fluid communication as shown in FIG. 17C. In this way, the fluid flowing through seventh aperture 89G flows through the rotor through hole 94A and the cover through hole 97B into the first valve cavity 86 and out of the first fluid cavity 86 through the rotor through hole 94D and the cover through hole 97A as suggested by the arrow in FIG. 17C. The coolant fluid in the first valve cavity 86 flows through the second aperture 89B, which is aligned with the rotor through hole 94D and the cover through hole 97A, through the second fluid cavity 58B in fluid communication with the radiator fluid circuit 24 as shown in FIGS. 15C and 17C.

In the MAIN VALVE ROTOR THIRD position, the rotor through hole 94E aligns with the third aperture 89C, the rotor through hole 94F aligns with the fourth aperture 89D, and the second flow divider shell 106B defining the second chamber 95B extends around the third aperture 89C and the fourth aperture 89D to connect the third aperture 89C and the fourth aperture 89D in fluid communication as shown in FIG. 17C. In this way, the coolant fluid returning from the radiator fluid circuit 24 flows into the third fluid cavity 58C, through the third aperture 89C, and into the second chamber 95B defined by the flow divider shell 106B, which directs the flow of fluid to the fourth aperture 89D as suggested by the arrow in FIG. 17C. The fluid flowing out through the fourth aperture 89D flows into the fourth fluid cavity 58DE, which is in fluid communication with the fifth aperture 89E so that the coolant fluid flows back into the multi-way valve 38 through the fifth aperture 89E as shown in FIGS. 15C and 17C.

In the MAIN VALVE ROTOR THIRD position, the rotor through hole 94G aligns with the fifth aperture 89E, the rotor through hole 94H aligns with the sixth aperture 89F, and the third flow divider shell 106C defining the third chamber 95C extends around the fifth aperture 89E and the sixth aperture 89F to connect the fifth aperture 89E and the sixth aperture 89F in fluid communication as shown in FIG. 17C. In this way, the coolant fluid flowing into the third chamber 95C defined by the third flow divider shell 106C flows to the sixth aperture 89F to flow through the fifth fluid cavity 58F back to the coolant tank 32 as suggested by the arrow in FIGS. 15C and 17C.

In mode D, or the system cooling mode, the fluid circuits 22, 24, 26 are connected in fluid communication with each other so that the flow of coolant fluid flows from the main fluid circuit 22 to the radiator fluid circuit 24, from the radiator fluid circuit 24 to the battery fluid circuit 26, and then from the battery fluid circuit 26 back to the main fluid circuit 22 as shown in FIG. 15D. The flow of coolant fluid is heated by the e-drive system 11 and the heat recovered from the e-drive system 11 is rejected out through the radiator 14 to cool the coolant fluid before flowing to the battery fluid circuit 26. The flow of coolant fluid flows through the battery fluid circuit 26 to cool the battery 16 so that the power of the chiller 18 is conserved. In more moderate cooling conditions, both the battery 16 and drive units 12F, 12R of the e-drive system 11 utilize the radiator 14 only to maintain thermal control, which allows chiller power to be conserved.

In mode D, the main valve rotor 90 has moved to a MAIN VALVE ROTOR FOURTH position as shown in FIGS. 15D and 17D. In the MAIN VALVE ROTOR FOURTH position, the main valve rotor 90 connects the first main-cavity aperture 89A1 to the second aperture 89B, connects the third aperture 89C to the eighth aperture 89H, connects the fourth aperture 89D to the fifth aperture 89E, and connects the sixth aperture 89F to the seventh aperture 89G as shown in FIGS. 15D and 17D.

As shown in FIG. 15D, a flow of coolant fluid is drawn from the coolant tank 32 through the eleventh fluid cavity 58L and pumped into the first fluid cavity 58A by the first pump 34, which is connected to the main fluid circuit 22. The main-circuit conduit 22C is in thermal communication with the DC/DC converter and on board charger (OBC) 13 and the controller 15 to transfer heat between the components 13, 15. The main-circuit conduit 22C may diverge into sections that flow to different components 13, 15, 12F, 12R. In the illustrative embodiments, splits into a first main-circuit conduit section 22CF so the main-circuit conduit 22C is in thermal communication with the front drive 12F and the a second main-circuit conduit section 22CR so that the main-circuit conduit 22C is in fluid communication with the rear drive 12R as shown in FIG. 15D.

The first main-circuit conduit section 22CF conducts the coolant fluid from the front drive 12F back to the manifold 40 and the second main-circuit conduit section 22CR conducts the coolant fluid from the rear drive 12R back to the manifold 40 as shown in FIG. 15D. The first main-circuit conduit section 22CF of the main fluid circuit 22 is coupled in fluid communication with the eighth fluid cavity 58I. The second main-circuit conduit section 22CR of the main fluid circuit 22 is coupled in fluid communication with the ninth fluid cavity 58J.

The throttle valve rotor 92 controls the flow of coolant fluid from each fluid cavity 58I, 58J through the corresponding housing apertures 89I, 89J by changing between the THROTTLE VALVE ROTOR FIRST position as shown in FIG. 16A, the THROTTLE VALVE ROTOR SECOND position as shown in FIG. 16B, and the THROTTLE configuration as shown in FIG. 16C. The combined flows from each aperture 89I, 89J into the second valve cavity 88 then flows out the first throttle-cavity aperture 89A2, through the connecting passageway 89A, and through the first main-cavity aperture 89A1 into the first valve cavity 86 as shown in FIGS. 15D and 17D.

In the MAIN VALVE ROTOR FOURTH position, the rotor through hole 94B aligns with the first main-cavity aperture 89A1, the rotor through hole 94C aligns with the second aperture 89B, and the first flow divider shell 106A defining the first chamber 95A extends around the first main-cavity aperture 89A1 and the second aperture 89B to connect the first main-cavity aperture 89A1 and the second aperture 89B in fluid communication as shown in FIG. 17D. In this way, the fluid flowing through the first main-cavity aperture 89A1 flows into the first chamber 95A defined by first flow divider shell 106A, which directs the flow of fluid through the second aperture 89B as shown in FIGS. 15D and 17D. The fluid flowing through the first main-cavity aperture 89A1 flows into the first chamber 95A defined by first flow divider shell 106A, and out through the second aperture 89B as suggested by the arrow in FIG. 17D. The fluid flows into the second fluid cavity 58B that is coupled in fluid communication with the second housing aperture 89B.

The flow of coolant fluid flows from the second fluid cavity 58B to the radiator fluid circuit 24 and returns to the manifold 40 through the third fluid cavity 58C as shown in FIG. 15D. In the MAIN VALVE ROTOR FOURTH position, the rotor through hole 94A and the cover through hole 97B are aligned with the eighth aperture 89H, while the rotor through hole 94D and the cover through hole 97A are aligned with the third aperture 89C so as to connect the eighth aperture 89H and the third aperture 89C in fluid communication as shown in FIG. 17D. In this way, the fluid flowing through third aperture 89C flows through the rotor through hole 94D and the cover through hole 97A into the first valve cavity 86 and out of the first fluid cavity 86 through the rotor through hole 94A and the cover through hole 97B as suggested by the arrow in FIG. 17D. The coolant fluid in the first valve cavity 86 flows through the eighth aperture 89H, which is aligned with the rotor through hole 94A and the cover through hole 97B, through the seventh fluid cavity 58H in fluid communication with the battery fluid circuit 26 as shown in FIGS. 15D and 17D.

The coolant fluid flows through the battery fluid circuit 26 and returns to the manifold 40 through the sixth fluid cavity 58G as shown in FIG. 15D. The sixth fluid cavity 58G is in fluid communication with the seventh housing aperture 89G so the fluid flowing through the sixth fluid cavity 58G flows through the seventh housing aperture 89G of the multi-way valve 38. In the MAIN VALVE ROTOR FOURTH position, the rotor through hole 94G aligns with the sixth aperture 89F, the rotor through hole 94H aligns with the seventh aperture 89G, and the third flow divider shell 106C defining the third chamber 95C extends around the sixth aperture 89F and the seventh aperture 89G to connect the sixth aperture 89F and the seventh aperture 89G in fluid communication as shown in FIG. 17D. In this way, the fluid flowing through the seventh aperture 89G flows into the third chamber 95C of the third flow divider shell 106C, which directs the flow of fluid through the sixth aperture 89F as suggested by the arrow in FIG. 17D. The coolant fluid flows to the sixth aperture 89F to flow through the fifth fluid cavity 58F back to the coolant tank 32 as suggested by the arrow in FIGS. 15D and 17D.

In the MAIN VALVE ROTOR FOURTH position, the rotor through hole 94E aligns with the fourth aperture 89D, the rotor through hole 94F aligns with the fifth aperture 89E, and the second flow divider shell 106B defining the second chamber 95B extends around the fourth aperture 89D and the fifth aperture 89E to connect the fourth aperture 89D and the fifth aperture 89E in fluid communication as shown in FIG. 17D. Both the fourth aperture 89D and the fifth aperture 89E are in fluid communication with the fourth fluid cavity 58DE such that this section of the manifold 40 is isolated from the other fluid cavities 58A-L.

In some embodiments, the main valve rotor 90 may be in another suitable position to achieve the desired for flow path in the different modes. For example, in some embodiments, the main valve rotor 90 may be in a MAIN VALVE ROTOR FIFTH position, when the thermal management system 20 is in the mode D as shown in FIG. 17E. While the main valve rotor 90 is in a different position, the same flow paths to the different circuits 22, 24, 26 is achieved, but the flow path through the main valve rotor 90 is slightly different.

In the MAIN VALVE ROTOR FIFTH position, the main valve rotor 90 connects the first main-cavity aperture 89A1 to the second aperture 89B, connects the third aperture 89C to the fourth aperture 89D, connects the fifth aperture 89E to the eighth aperture 89H, and connects the sixth aperture 89F to the seventh aperture 89G as shown in FIG. 17E. In the MAIN VALVE ROTOR FIFTH position, the coolant fluid flows through the fourth and fifth apertures 89D, 89E using the fourth fluid cavity 58DE as part of the fluid flow path.

In the MAIN VALVE ROTOR FIFTH position, the rotor through hole 94E aligns with the first main-cavity aperture 89A1, the rotor through hole 94F aligns with the second aperture 89B, and the second flow divider shell 106B defining the second chamber 95B extends around the first main-cavity aperture 89A1 and the second aperture 89B to connect the first main-cavity aperture 89A1 and the second aperture 89B in fluid communication as shown in FIG. 17E. In this way, the fluid flowing through the first main-cavity aperture 89A1 flows into the second chamber 95B defined by the second flow divider shell 106B, which directs the flow of fluid through the second aperture 89B as shown in FIG. 17E. The fluid flowing through the first main-cavity aperture 89A1 flows into the second chamber 95B defined by the second flow divider shell 106B, and out through the second aperture 89B as suggested by the arrow in FIG. 17E. The fluid flows into the second fluid cavity 58B that is coupled in fluid communication with the second housing aperture 89B.

The flow of coolant fluid flows from the second fluid cavity 58B to the radiator fluid circuit 24 and returns to the manifold 40 through the third fluid circuit 58C as shown in FIG. 15D. In the MAIN VALVE ROTOR FIFTH position, the rotor through hole 94G aligns with the third aperture 89C, the rotor through hole 94H aligns with the fourth aperture 89D, and the third flow divider shell 106C defining the third chamber 95C extends around the third aperture 89C and the fourth aperture 89D to connect the third aperture 89C and the fourth aperture 89D in fluid communication as shown in FIG. 17E. The flow of coolant fluid returning from the radiator fluid circuit 24 flows through the third fluid cavity 58C, through the third aperture 89C, and into the third chamber 95C defined by the third flow divider shell 106C. The fluid flowing through the third aperture 89C flows into the third chamber 95C defined by the third flow divider shell 106C which directs the flow of fluid out through the fourth aperture 89D as suggested by the arrow in FIG. 17E. The fluid flowing out through the fourth aperture 89D flows into the fourth fluid cavity 58DE, which is in fluid communication with the fifth aperture 89E so that the coolant fluid flows back into the multi-way valve 38 through the fifth aperture 89E as shown in FIG. 17E.

In the MAIN VALVE ROTOR FIFTH position, the rotor through hole 94A and the cover through hole 97B are aligned with the fifth aperture 89E, while the rotor through hole 94D and the cover through hole 97A are aligned with the eighth aperture 89H so as to connect the fifth aperture 89E and the eighth aperture 89H in fluid communication as shown in FIG. 17E. In this way, the fluid flowing through fifth aperture 89E flows through the rotor through hole 94A and the cover through hole 97B into the first valve cavity 86 and out of the first fluid cavity 86 through the rotor through hole 94D and the cover through hole 97A as suggested by the arrow in FIG. 17E. The coolant fluid in the first valve cavity 86 flows through the eighth aperture 89H, which is aligned with the rotor through hole 94D and the cover through hole 97A, through the seventh fluid cavity 58H in fluid communication with the battery fluid circuit 26 as shown in FIG. 17E.

The coolant fluid flows through the battery fluid circuit 26 and returns to the manifold 40 through the sixth fluid cavity 58G as shown in FIG. 15D. The sixth fluid cavity 58G is in fluid communication with the seventh housing aperture 89G so the fluid flowing through the sixth fluid cavity 58G flows through the seventh housing aperture 89G of the multi-way valve 38. In the MAIN VALVE ROTOR FIFTH position, the rotor through hole 94B aligns with the sixth aperture 89F, the rotor through hole 94C aligns with the seventh aperture 89G, and the first flow divider shell 106A defining the first chamber 95A extends around the sixth aperture 89F and the seventh aperture 89G to connect the sixth aperture 89F and the seventh aperture 89G in fluid communication as shown in FIG. 17E. The coolant fluid flows to the sixth aperture 89F to flow through the fifth fluid cavity 58F back to the coolant tank 32 as suggested by the arrow in FIGS. 15D and 17D.

The invention claimed is:

1. A thermal management system adapted for use in a vehicle, the thermal management system comprising:

a main fluid circuit including a main conduit configured to conduct coolant fluid through the main fluid circuit and adapted to be in thermal communication with front and rear drives included in the vehicle to transfer heat between the front and rear drives and the coolant fluid, a radiator fluid circuit including a radiator-circuit conduit configured to conduct the coolant fluid through the radiator fluid circuit and adapted to be in thermal communication with a radiator included in the vehicle to transfer heat between the radiator and the coolant fluid, a battery fluid circuit including a battery-circuit conduit configured to conduct the coolant fluid through the battery fluid circuit and adapted to be in thermal communication with batteries included in the vehicle to transfer heat between the batteries and the coolant fluid and a heat exchanger in fluid communication with the battery-circuit conduit to transfer heat between the coolant fluid and a fluid in the heat exchanger, and an integrated coolant controller comprising a coolant tank formed to define a coolant reservoir configured to store the coolant fluid, a first pump configured to pump a flow of the coolant fluid from the coolant tank through the main fluid circuit, a second pump configured to pump a flow of the coolant fluid through the battery fluid circuit, a multi-way valve configured to control the flow of the coolant fluid through the main fluid circuit, the radiator fluid circuit, and the battery fluid circuit, and a manifold coupled to each of the coolant tank, the first and second pumps, and the multi-way valve to integrate the coolant tank, the first and second pumps, and the multi-way valve so that the main fluid circuit, the radiator fluid circuit, and the battery fluid circuit flow through the manifold to eliminate the need for piping between the coolant tank, the first and second pumps, and the multi-way valve and to reduce the amount of power used by the pumps to supply the coolant fluid through the main fluid circuit, the radiator fluid circuit, and the battery fluid circuit, wherein the manifold includes a manifold body and a plurality of pipes that each extend from the manifold body, the manifold body shaped to define a plurality of fluid cavities and a plurality of valve ports that each open to one fluid cavity of the plurality of fluid cavities, and the plurality of pipes each defining a pipe passageway in fluid communication with one of the fluid cavity of the plurality of fluid cavities and one of the main conduit of the main fluid circuit, the radiator-circuit conduit of the radiator fluid circuit, and the battery-circuit conduit of the battery fluid circuit, wherein the manifold body includes a first body section and a second body section that is separate from the first body section and coupled to the first body section, and wherein the first and second body sections of the manifold body cooperate with each other to define the plurality of fluid cavities so that some fluid cavities included in the plurality of fluid cavities are only a part of one of the first body section and the second body section while the other fluid cavities included in the plurality of fluid cavities extend across both the first body section and the second body section.

2. The thermal management system of claim 1, wherein the manifold is shaped to include a plurality of temperature sensor docks each configured to receive a temperature sensor to mount the temperature sensor in fluid communication with one of the plurality of fluid cavities to measure the temperature of the flow of coolant fluid.

3. The thermal management system of claim 1, wherein the manifold includes a tank dock configured to receive the coolant tank to mount the coolant tank on the manifold so that the coolant tank closes a top opening of the manifold and inlet and outlet ports included in the coolant tank align with tank ports on the manifold.

4. The thermal management system of claim 3, wherein the coolant tank is welded to the tank dock of the manifold.

5. The thermal management system of claim 1, wherein the manifold includes a first pump dock configured to receive the first pump to mount the first pump on the manifold so that an inlet of the first pump is connected in fluid communication with the coolant reservoir of the coolant tank and an outlet of the first pump is connected in fluid communication with the main fluid circuit.

6. The thermal management system of claim 1, wherein the manifold further includes a second pump dock configured to receive the second pump to mount the second pump on the manifold so that an inlet of the second pump is connected in fluid communication with the multi-way valve and an outlet of the second pump is connected in fluid communication with battery fluid circuit.

7. The thermal management system of claim 1, wherein the manifold includes a valve dock configured to receive the multi-way valve to mount the multi-way valve on the manifold so that a plurality of apertures included in the multi-way valve align with the plurality of valve ports on the manifold, and wherein each valve port of the plurality of valve ports is in the fluid communication with one of the fluid cavities of the plurality of fluid cavities.

8. The thermal management system of claim 1, wherein the coolant tank is integrally formed with the manifold so that the coolant tank and the manifold are a single-piece component.

9. The thermal management system of claim 1, wherein the manifold comprises:

a tank dock configured to receive the coolant tank to mount the coolant tank on the manifold so that the coolant tank closes a top opening of the manifold and inlet and outlet ports included in the coolant tank align with tank ports on the manifold, a first pump dock configured to receive the first pump to mount the first pump on the manifold so that an inlet of the first pump is connected in fluid communication with the coolant reservoir of the coolant tank and an outlet of the first pump is connected in fluid communication with the main fluid circuit, a second pump dock configured to receive the second pump to mount the second pump on the manifold so that an inlet of the second pump is connected in fluid communication with the multi-way valve and an outlet of the second pump is connected in fluid communication with battery fluid circuit, and a valve dock configured to receive the multi-way valve to mount the multi-way valve on the manifold so that a plurality of apertures included in the multi-way valve align with the plurality of valve ports on the manifold.

10. The thermal management system of claim 9, wherein the first body section of the manifold defines the coolant tank dock and the first pump dock, and wherein the second body section of the manifold defines the second pump dock and the valve dock.

11. The thermal management system of claim 1, wherein the manifold body is shaped to define a first fluid cavity, a second fluid cavity, a third fluid cavity, a fourth fluid cavity, a fifth fluid cavity, a sixth fluid cavity, a seventh fluid cavity, an eighth fluid cavity, a ninth fluid cavity, a tenth fluid cavity, and a eleventh fluid cavity, wherein the first body section is shaped to define the first fluid cavity, a portion of the third fluid cavity, a portion of the fifth fluid cavity, a portion of the sixth fluid cavity, and a portion of the eleventh fluid cavity, and wherein the lower body section is shaped to define the second fluid cavity, a portion of the third fluid cavity, the fourth fluid cavity, a portion of the fifth fluid cavity, a portion of the sixth fluid cavity, the seventh fluid cavity, the eighth fluid cavity, the ninth fluid cavity, and the tenth fluid cavity.

12. The thermal management system of claim 1, wherein the multi-way valve includes a valve housing and a valve flow controller arranged in the valve housing to control the flow of the coolant fluid through a plurality of apertures formed in the valve housing to change the thermal management system between different modes.

13. The thermal management system of claim 12, wherein the different modes include:

(i) a system cooling mode in which the main fluid circuit is connected in fluid communication with the radiator fluid circuit so that the front and rear drives are cooled by the coolant fluid and heat is rejected by flowing the coolant fluid through the radiator and the battery fluid circuit is isolated from the main and radiator fluid circuits so that the batteries are cooled by the coolant fluid and heat is rejected by flowing the coolant fluid through the heat exchanger;

(ii) a system heating mode in which the main fluid circuit, the radiator fluid circuit, and the battery fluid circuit are isolated from each other so that the front and rear drives in thermal communication with the man fluid circuit are heated, the radiator in the radiator fluid circuit is bypassed, and the batteries of the battery fluid circuit are heated;

(iii) a battery conditioning mode in which the main fluid circuit, the radiator fluid circuit, and the battery fluid circuit are connected in fluid communication with each other so that the flow of coolant fluid flows from the main fluid circuit to the battery fluid circuit, from the battery fluid circuit to the radiator fluid circuit, and then from the radiator fluid circuit back to the main fluid circuit; and (iv) a system cooling mode in which the main fluid circuit, the radiator fluid circuit, and the battery fluid circuit are connected in fluid communication with each other so that the flow of coolant fluid flows from the main fluid circuit to the radiator fluid circuit, from the radiator fluid circuit to the battery fluid circuit, and then from the battery fluid circuit back to the main fluid circuit.

14. A thermal management system adapted for use in a vehicle, the thermal management system comprising:

a plurality of fluid circuits that each includes a conduit configured to conduct coolant fluid through the plurality of fluid circuits, and an integrated coolant controller comprising:

a coolant tank formed to define a coolant reservoir configured to store the coolant fluid, the cooling tank including a plurality of outer walls and a bottom wall that extends between and interconnects the plurality of outer walls and is formed to define an inlet port and an outlet port, a first pump configured to pump a flow of the coolant fluid from the coolant tank through the plurality of fluid circuits, a multi-way valve configured to control the flow of the coolant fluid through the plurality of fluid circuits, and a manifold coupled to each of the coolant tank, the first pump, and the multi-way valve to integrate the coolant tank, the first pump, and the multi-way valve so that each fluid circuit of the plurality of fluid circuits flows through the manifold to eliminate the need for piping between the coolant tank, the first pump, and the multi-way valve and to reduce the amount of power used by the first pump to supply the coolant fluid through the plurality of fluid circuits, wherein the manifold comprises a tank dock configured to receive the coolant tank to mount the coolant tank on the manifold so that the bottom wall of the coolant tank closes a top opening of the manifold and the inlet and outlet ports formed in the bottom wall of the coolant tank align with tank ports on the manifold.

15. The thermal management system of claim 14, wherein the manifold includes a manifold body shaped to define a plurality of fluid cavities and a plurality of pipes that each extend from the manifold body, wherein the plurality of pipes each define a pipe passageway in fluid communication with one of the fluid cavities included in the plurality of fluid cavities and one conduit of the plurality of fluid circuits.

16. The thermal management system of claim 15, wherein the manifold is shaped to include a plurality of temperature sensor docks each configured to receive a temperature sensor to mount the temperature sensor in fluid communication with one of the plurality of fluid cavities to measure the temperature of the flow of coolant fluid.

17. The thermal management system of claim 14, wherein the coolant tank is welded to the tank dock of the manifold.

18. The thermal management system of claim 15, wherein the manifold includes a first pump dock configured to receive the first pump to mount the first pump on the manifold so that an inlet of the first pump is connected in fluid communication with the coolant reservoir of the coolant tank and an outlet of the first pump is connected in fluid communication with one of the plurality of fluid circuits.

19. The thermal management system of claim 15, wherein the manifold includes a valve dock configured to receive the multi-way valve to mount the multi-way valve on the manifold so that a plurality of apertures included in the multi-way valve align with valve ports on the manifold, and wherein each of the valve ports is in the fluid communication with one of the fluid cavities of the plurality of fluid cavities.

20. The thermal management system of claim 14, wherein the manifold comprises:

a first pump dock configured to receive the first pump to mount the first pump on the manifold so that an inlet of the first pump is connected in fluid communication with the coolant reservoir of the coolant tank and an outlet of the first pump is connected in fluid communication with one of the plurality of fluid circuits, and a valve dock configured to receive the multi-way valve to mount the multi-way valve on the manifold so that a plurality of apertures included in the multi-way valve align with valve ports on the manifold.

21. The thermal management system of claim 15, wherein the coolant tank is formed to include a lip that extends from the bottom wall of the coolant tank and is shaped to match the manifold body so that the coolant tank fits with the manifold body.

22. An integrated coolant controller adapted for use in a thermal management system, the integrated coolant controller comprising:

a coolant tank formed to define a coolant reservoir configured to store a coolant fluid, a first pump configured to pump a flow of the coolant fluid through the thermal management system, a second pump configured to pump a flow of the coolant fluid through the thermal management system, a multi-way valve configured to control the flow of the coolant fluid to different thermal fluid circuits of the thermal management system, the multi-way valve including a valve housing and a valve flow controller arranged in the valve housing to control the flow of the coolant fluid through a plurality of apertures formed in the valve housing to change the thermal management system between different modes, and a manifold coupled to each of the coolant tank, the first pump, the second pump, and the multi-way valve to integrate the coolant reservoir of the coolant tank, the first pump, the second pump, and the multi-way valve in fluid communication with one another to eliminate the need for piping between the coolant tank, the first pump, the second pump, and the multi-way valve and to reduce the amount of power used by the first pump and the second pump to supply the coolant fluid through different fluid circuits of the thermal management system, wherein the manifold includes a manifold body and a plurality of pipes that each extend from the manifold body, the manifold body shaped to define a plurality of fluid cavities and a plurality of valve ports that each open to one fluid cavity of the plurality of fluid cavities, and the plurality of pipes each defining a pipe passageway in fluid communication with one fluid cavity of the plurality of fluid cavities and the different fluid circuits, and wherein the manifold includes a valve dock configured to receive the multi-way valve to mount the multi-way valve on an exterior of the manifold so that the plurality of apertures included in the valve housing of the multi-way valve align with the plurality of valve ports on the manifold.

23. The integrated coolant controller of claim 22, wherein the manifold is shaped to include a plurality of temperature sensor docks each adapted to receive a temperature sensor to mount the temperature sensor in fluid communication with the flow of coolant fluid to measure the temperature of the flow of coolant fluid.

24. The integrated coolant controller of claim 22, wherein the manifold includes a tank dock configured to receive the coolant tank to mount the coolant tank on the manifold so that the coolant tank closes a top opening of the manifold and inlet and outlet ports included in the coolant tank align with tank ports on the manifold.

25. The integrated coolant controller of claim 22, wherein the manifold includes a first pump dock configured to receive the first pump to mount the first pump on the manifold so that an inlet of the first pump is connected in fluid communication with the coolant reservoir of the coolant tank and an outlet of the first pump is connected in fluid communication with one of the different fluid circuits.

26. The integrated coolant controller of claim 22, wherein the manifold includes a second pump dock configured to receive the second pump to mount the second pump on the manifold so that an inlet of the second pump is connected in fluid communication with the multi-way valve and an outlet of the second pump is connected in fluid communication one of the different fluid circuits.

27. The integrated coolant controller of claim 22, wherein the valve housing of the multi-way valve defines a first valve cavity, a second valve cavity, and the plurality of apertures in fluid communication with at least one of the first valve cavity and the second valve cavity, wherein the valve flow controller includes a first valve rotor arranged in the first valve cavity of the valve housing to rotate relative to the valve housing about a first valve axis and a second valve rotor arranged in the second valve cavity of the valve housing to rotate relative to the valve housing about a second valve axis parallel to the first valve axis, and wherein the first valve rotor and the second valve rotor cooperate to define a plurality of different flow paths through the valve housing and the manifold to change the thermal management system between the different modes.

28. The integrated coolant controller of claim 27, wherein the first valve cavity and the second valve cavity are in in fluid communication through a connecting passageway defined by the valve housing.

* * * * *